United States Patent
Pflasterer et al.

(10) Patent No.: US 7,436,951 B2
(45) Date of Patent: Oct. 14, 2008

(54) PORTABLE INTERCONNECTION SYSTEM FOR INCOMPATIBLE AUDIO COMMUNICATION NETWORKS

(75) Inventors: Peter W. Pflasterer, Raleigh, NC (US); Kenneth H. Marks, Raleigh, NC (US); Roger D. Williams, Wake Forest, NC (US); Douglas D. Hall, Raleigh, NC (US); John D. Van Valkenburgh, Raleigh, NC (US)

(73) Assignee: JPS Communications, Inc., Raleigh, NC (US)

(*) Notice: Subject to any disclaimer, the term of this patent is extended or adjusted under 35 U.S.C. 154(b) by 983 days.

(21) Appl. No.: 10/792,479

(22) Filed: Mar. 3, 2004

(65) Prior Publication Data
US 2005/0195969 A1 Sep. 8, 2005

(51) Int. Cl.
H04M 1/00 (2006.01)
H04M 9/00 (2006.01)

(52) U.S. Cl. .................. 379/419; 379/428.01

(58) Field of Classification Search ......... 379/419, 379/428.01–428.03, 433.09, 441, 442, 37, 379/90.01, 93.05
See application file for complete search history.

(56) References Cited

U.S. PATENT DOCUMENTS
5,223,844 A * 6/1993 Mansell et al. ......... 342/357.07

OTHER PUBLICATIONS
Installation and Operation Manual entitled "ACU-1000 Intelligent Interconnect System." JPS Communications, Inc.; Revision 2.21; Jan. 2003; 148 pages.

* cited by examiner

Primary Examiner—Curtis Kuntz
Assistant Examiner—Tuan D Nguyen
(74) Attorney, Agent, or Firm—Coats & Bennett, P.L.L.C.

(57) ABSTRACT

A portable interconnection system has a housing having and a plurality of communications ports adapted for connection to a plurality of audio communication networks; electronics substantially enclosed by the housing; the electronics including at least interconnection electronics operative to selectively establish a plurality of independent connection sets, each connection set interconnecting at least a plurality of the communications ports for communications between a plurality of audio communication units operating in at least two different and incompatible ones of the audio communication networks; a user interface connected to the interconnection electronics and operative to control the interconnection electronics; wherein a combined weight of the housing and the electronics is not more than fifteen pounds. A display may show an interconnection status of the plurality of audio communication units for a plurality of the independent connection sets simultaneously.

17 Claims, 4 Drawing Sheets

PORTABLE INTERCONNECTION SYSTEM FOR INCOMPATIBLE AUDIO COMMUNICATION NETWORKS

BACKGROUND OF THE INVENTION

The present invention is directed generally to interconnection systems for otherwise incompatible audio communication networks, and more particularly to a portable interconnection system for such audio communication networks convenient for use by for police, fire, and other emergency services.

Within a given geographic area, it is common for the various police, sheriff, fire, and other emergency services to each have independent audio communication networks. Within such audio communication networks, the various personnel typically have portable audio communications devices, such as two-way radios, that handle the communication of audio signals with one or more dispatch centers. Thus, the various personnel within one particular emergency service are able to talk with others in their emergence service over their dedicated audio communication network. However, these audio communication networks are typically not able to communicate with the audio communication networks of the other emergency services. For example, the city police may be able to have talk directly with other city police, but cannot talk directly with the county constables, the city fire department, or the local hazardous material response team. Of course, the various emergency services can, if necessary, resort to using the public switched telephone network to call and talk with each other, but such an arrangement leads to obvious time delays and increases the likelihood of miscommunications. Thus, the ability of the combined emergency services to coordinate a response to various emergencies, particularly large scale emergencies, is hindered by the lack of easy audio communications.

In view of the above, some interconnect products for audio communication networks have been introduced with an eye toward emergency services. In particular, JPS Communications, Inc. of Raleigh, N.C. offers an interconnection product sold under the brand name ACU-1000. The ACU-1000 interconnection product allows two or more audio communication networks to be interconnected so that personnel in one audio communication network may talk with personnel in the other audio communication network. While such a product has greatly increased the ability of emergency services personnel to talk during emergencies, by allowing for interconnection of their otherwise independent and incompatible audio communication networks, there is a certain level of advance work and planning that must be completed before the benefits can be realized. For instance, for the ACU-1000 product, each of the relevant audio communication networks must be linked to the ACU-1000 hub, which resides in a relatively large computer rack at a fixed location. As such, the ability of the ACU-1000 product to adapt to some types of changing needs, or to be set-up for interconnection with a new audio communication network (e.g., belonging to a new emergency service), is somewhat limited by its size. For example, if a large-scale emergency occurs near the boundary of a jurisdiction, multiple emergency services of each type (e.g., police, fire, etc.) may need to respond to the same event. Absent significant planning effort and advance work, it is likely that some of the emergency services at the emergency site may be interconnected for audio communications using the ACU-1000, but others will unable to do so. Such a situation is less than ideal. Further, the ACU-1000 requires a separate personal computer with a CRT display to be attached to its controller in order to see and understand the various audio signal interconnections established by the ACU-1000. The size of the ACU-1000 components and their associated rack, the need to run cables to a fixed location, and the requirement of a separate personal computer to determine the interconnection status, render the ACU-1000 difficult, time consuming, and complex to move. As such, the ACU-1000 is considered a "fixed" solution, not a mobile or transportable solution.

Thus, while various types of interconnection systems for otherwise independent and incompatible audio communication networks have been proposed, there remains a need for alternative approaches.

SUMMARY OF THE INVENTION

The present invention is directed to a portable interconnection system, which in one embodiment comprises a housing having an integral externally accessible user interface and a plurality of communications ports adapted for connection to a plurality of audio communication networks; electronics substantially enclosed by the housing; the electronics including at least interconnection electronics operative to selectively establish a plurality of independent connection sets, each connection set interconnecting at least a plurality of the communications ports for communications between a plurality of audio communication units operating in at least two different and incompatible ones of the audio communication networks; the user interface connected to the interconnection electronics and operative to control the interconnection electronics; wherein a combined weight of the housing and the electronics is not more than fifteen pounds. The housing may further comprise a display operative to show at least one interconnection status of the plurality of audio communication units, and preferably an interconnection status of the plurality of audio communication units for a plurality of the independent connection sets simultaneously. The display may display the interconnection status in an array format. The portable interconnection system may further comprise a carrying handle connected to the housing and operative to supply the entirety of the vertical support necessary for a user to carry the housing. The electronics may further comprise a power supply having a battery charger. At least a portion of the interconnection electronics may be contained in a plurality of interface cards removably supported by the housing. The interconnection electronics may be further operative to be responsive to commands supplied via DTMF tones to alter at least one of the connection sets and/or to digitally enhance audio communication signals supplied to the interconnection electronics via the connection ports. The combined weight of the housing and the electronics may be less than fifteen pounds, such as not more than ten pounds, and the housing may have a volume of 750 cubic inches or less, advantageously 600 cubic inches or less.

In another embodiment, a portable interconnection system is disclosed that comprises a housing having an integral externally accessible user interface and at least four communications ports adapted for connection to a plurality of audio communication networks; electronics substantially enclosed by the housing; the electronics including at least interconnection electronics operative to selectively establish a plurality of independent connection sets, each connection set interconnecting at least a plurality of the communications ports for communications between a plurality of audio communication units operating in at least two different and incompatible ones of the audio communication networks; wherein at least a portion of the interconnection electronics are contained in a plurality of interface cards removably supported by the housing; the user interface connected to the interconnection electronics and operative to control the interconnection electronics; the electronics further comprises a power supply having a battery charger; the housing further comprising a display operative to show an interconnection status of the plurality of audio communication units for a plurality of the independent connection sets simultaneously; and wherein a combined weight of the housing and the electronics is not more than ten pounds and wherein the housing has a volume of 600 cubic inches or less. Further, such a portable interconnection system may have a carrying handle connected to the housing and operative to supply the entirety of the vertical support necessary for a user to carry the housing. The interconnection electronics may be further operative to be responsive to commands supplied via DTMF tones to alter at least one of the connection sets and/or to digitally enhance audio communication signals supplied to the interconnection electronics via the connection ports.

DETAILED DESCRIPTION OF AN EMBODIMENT OF THE INVENTION

The present invention provides a portable interconnection system for audio communication networks that can be taken to a field location and easily set up to allow interconnection between the various otherwise independent and incompatible audio communication networks present. While the following discussion may be in the context of audio communication networks for emergency services due to the particular applicability of the present invention to the needs of emergency services, the present invention is not so limited and may be used to interconnect a wide variety of audio communication networks.

Figure 1:
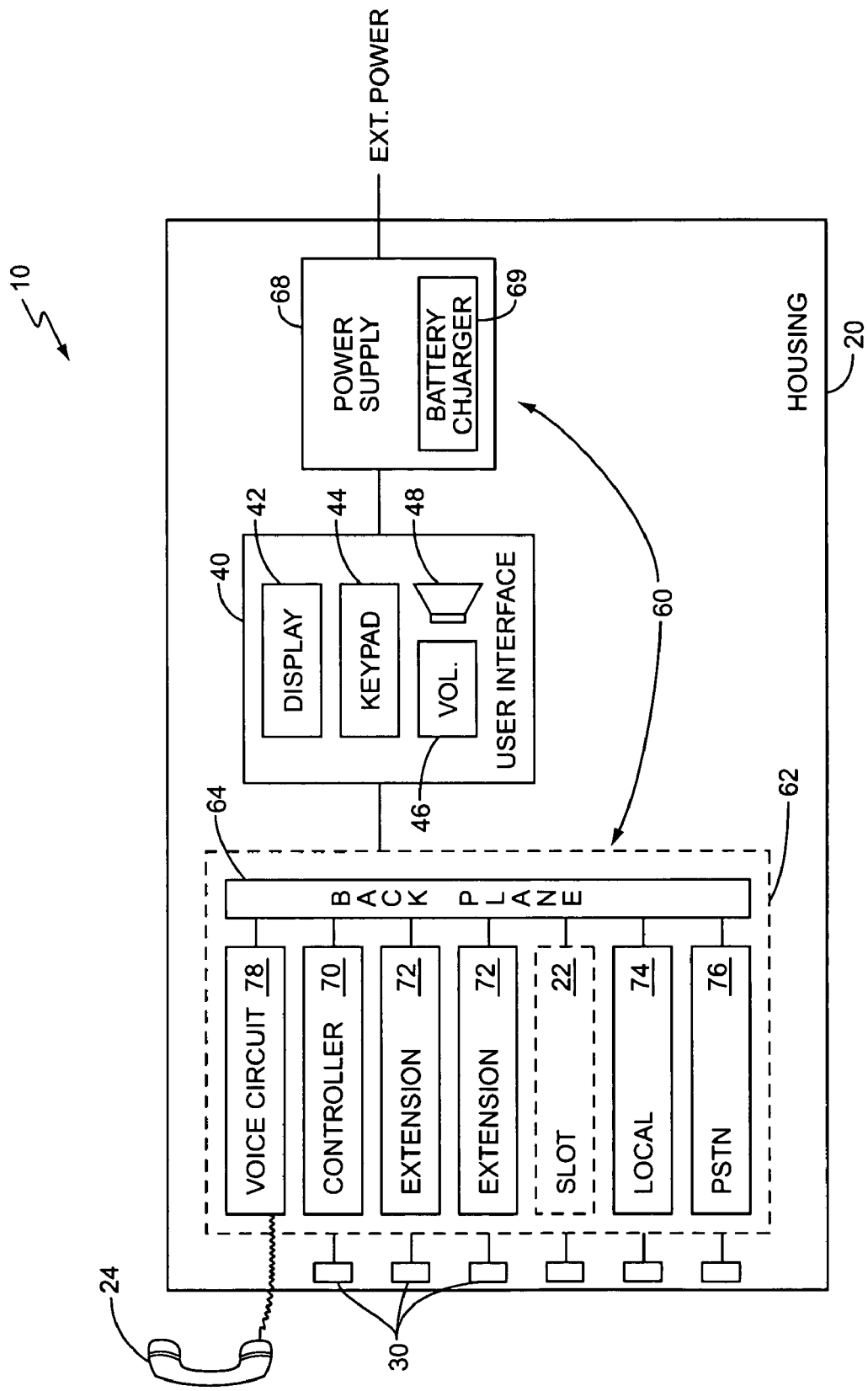
FIG. 1 shows a schematic representation of a portable interconnection system in accordance with one embodiment of the present invention.

The portable interconnection system 10 is illustrated in FIG. 1 and generally indicated at 10. The portable interconnection system 10 includes electronics 60 in a housing 20, and it is intended that the combined housing 20 and electronics 60 be small and light enough to be carried by a single individual to desired field location.

The electronics 60 include a power supply 68 and interconnect electronics 62. The power supply 68 may include a battery charger 69, power conditioning circuits, fuses, and the like, so that the power supply 68 may operate on conventional external power and optionally recharge batteries. The power supply 68 supplies power to the rest of the electronics 60 in a conventional fashion. The interconnect electronics 62 include a backplane 64, a controller circuit 70, extension circuits 72, an optional local extension circuit 74, and an optional landline or PSTN circuit 76. The controller circuit 70, extension circuits 72, local extension circuit 74, and landline circuit 76 may advantageously be designed to be in the form of removable modules 66 that insert into one of the module slots 22 provided on the housing 20 (described further below). These modules 66 mate with the backplane 64 in a conventional fashion, and the backplane 64 provides a convenient means for exchanging audio and control signals between the modules 66. The controller circuit 70 oversees the overall operation of the portable interconnection system 10, and may include a conventional microprocessor, PAL, ASIC, or the like programmed with suitable controller software. The extension circuits 72 interface the communications devices to the portable interconnection system 10 so that the various communications devices can communicate with each other. The extension circuits 72 advantageously include a digital signal processor operating under appropriate software so as to provide Voice Operated Transmit (VOX), Voice Modulation Recognition (VMR), audio delay, digital noise reduction, tone keying functions. Most of the extension circuits 72 are designed and optimized for operation with various radio communication devices, such as High Frequency (HF) devices, Narrow Band FM (NBFM), Land Mobile Radios (LMR), and satellite units. However, an optional form of extension circuit, referred to as a PSTN extension circuit 76, may be configured to connect to the conventional landline phone system of the Public Switched Telephone Network (PSTN). In addition, the optional local extension circuit 74 allows the portable interconnection system 10 to function as communication unit itself, using the speaker/microphone 48 of the user interface 40, discussed further below. Further, a voice circuit 78 may be included that co-operates with the user interface 40 to allow the local user-operator to be prompted to enter commands, receive voice instructions, and otherwise control the local speaker 48.

The actual interconnection of two or more extension circuits 72 to form a communications set operates as follows: Whenever a communications set is to be set up, controller circuit 70 is given the number (address) of the extension 72 requesting the interconnection and the address(es) of the extension(s) 72 to be made part of the communications set. The controller circuit 70 then assigns a set of audio buses on backplane 64 to the extensions 72 that are part of the communications set. The audio buses assigned are for the exclusive use of that communications set and allow audio signals to flow between all extension circuits 72 that are part of that communications set. When the communications set is no longer needed and dissolved by the controller circuit 70, the audio connections between the extensions 72 that were formerly a part of the communications set are switched off and the audio buses are returned to an unassigned state. In addition to audio signals, when a communications set is set up, certain control signals also flow among the extensions 72 that are part of the communications set. The controller circuit 72 manages these control signals as well as the audio buses.

For further details of the controller circuit 70, extension circuits 72, local extension circuit 74, and landline circuit 76, and voice circuit 78, attention is directed to JPS document 5030-200200, revision 1.0, entitled "ACU-T Tactical Interconnect System," included in the attached Appendix and considered a part of this disclosure. Further, it should be noted that the controller circuit 70, extension circuits 72, local extension circuit 74, landline circuit 76, and voice circuit 78 may be generally configured and operated like the analogous circuits in the prior art ACU-1000 fixed interconnection system. Likewise, the controller software and extension software may also be generally as in the prior art ACU-1000 fixed interconnection system 10. Attention is directed to the ACU-1000 technical manual, found at www.jps.com/downloads/support/ACUMan2-21.pdf, which is incorporated herein by reference, for additional details.

The housing 20 substantially encloses, and optionally completely encloses, the power 68 supply and interconnect electronics 62. The housing 20 includes a rugged shell 20s, a user interface 40, and a plurality of communications ports 30. The shell 20s is preferably metallic and advantageously includes a drip-proof top with suitable indicators (power on, battery charge, etc.). The elements of the user interface 40 may be located on the top of the shell 20s, the communication ports 30 on one side, power connections at the rear, and a plurality of module slots 22 at the front. The module slots 22 of the shell 20s allow access to the backplane 64 and provide a convenient means of adding and/or removing the modules

66. The communications ports 30 connect the relevant communications devices to the extension circuits 72, etc. via the backplane 64. The communications ports 30 may take any suitable form known in the art, but are advantageously uniform and of a circular quick disconnect type, such as that known as CPC connectors available from AMP, Inc. of Harrisburg, Pa. Advantageously, there are at least four communications port 30, such as shown in the Figures. The user interface 40 shown in FIG. 1 includes a keypad 44, a speaker/microphone 48, a volume control 46, and a display 42. The user interface 40 allows the user to control the interconnect electronics 62, such as making appropriate settings, establishing interconnection sets, etc., with the relevant control commands typically entered via the keypad 44. The speaker/microphone 48 allows the portable interconnection system 10 to function as a local audio communications unit and may also allow for audio assistance in the entry of commands. Alternatively, a handset 24 may be connected to the portable interconnection system 10 via a suitable connector on the voice circuit module 78 to serve this function. The volume control 46 controls the volume of the audio output by the speaker 48, and the speaker 48 may be disabled by an on-off switch (not labeled). The display 42 functions to display the interconnection status of the various audio communications units connected to the portable interconnection system 10, as discussed further below.

The primary purpose of the portable interconnection system 10 is to allow the various audio communications units to communicate with each other when using different and otherwise incompatible audio communication networks. Thus, the portable interconnection system 10 allows audio communications between a plurality of audio communication units operating in at least two different and incompatible audio communication networks. To do so, the portable interconnection system 10 creates an connection between selected ones of the audio communications units, referred to herein as a connection set, that allows for audio signals and audio control signals (such as transmit initialization authorization) to be communicated between the plurality of audio communication units within the communication set. Thus, the connection set is a group of a plurality of communications units that are in audio communication with each other via the portable interconnection system 10, with at least two of the communication units operating in different and otherwise incompatible communication networks. While the portable interconnection system 10 may create a single connection set, the portable interconnection system 10 is preferably capable of creating a plurality of independent connection sets. For example audio communication units from the independent communication networks of fire group A, fire group B, and police C may be interconnected by the portable interconnection system 10 in connection set Alpha, while the audio communication units from the independent communication networks of fire group B, police D, and federal response team E may be simultaneously interconnected by the portable interconnection system 10 in connection set Beta. In order to facilitate the creation and control of the connection sets, the display 42 is advantageously adapted to display the connection status of the various connection sets simultaneously. While a complex CRT-like display may serve this function, a simpler embodiment of the display 42 formed by a matrix of LED's is also possible. For example, assuming that fire group A is connected to communication port one, fire group B connected to communication port two, police C connected to communications port three, police D connected to communications port four, and federal response team E is connected to communications port five, the display 42 may show the interconnection status as shown in the array form of FIG. 4, where connection set Alpha corresponds to net one and connection set Beta corresponds to net two. Further, assuming the portable interconnection system 10 is also functioning as a local audio communications unit, designated as HSP and participating in connection set Alpha but not connection set Beta, the interconnection status may be displayed on display 42 as shown in FIG. 5. By supplying the portable interconnection system 10 user-operator with a ready indication of interconnection and connection set status, the display 42 greatly enhances the ability of the portable interconnection system 10 operator to set up and operate the portable interconnection system 10 in stressful or rapidly-changing environments.

One prime function of the portable interconnection system 10 of the present invention is to be portable. As mentioned above, commercially available units, such as the ACU-1000, allow similar interconnection capability, but at a fixed location. The portable interconnection system 10 of the present invention is intended to be taken to a variety of field locations; thus, mobility is an important concern. As such, the portable interconnection system 10 is made to be relatively small and lightweight. According to preferred embodiments of the present invention, the portable interconnection system 10 occupies a volume of 750 cubic inches or less, and preferably 600 cubic inches or less. In addition, the portable interconnection system 10 of preferred embodiments of the present invention has a weight, including all electronics 60 when all slots 22 are full, of fifteen pounds or less, more preferably about ten pounds or less, and more preferably of about eight pounds or less. Accordingly, the portable interconnection system 10 may advantageously include a carrying handle 50 connected to the housing 20 that, when supporting the entire weight of the housing 20 (with electronics 60 included), carries a weight of fifteen pounds or less, more preferably about ten pounds or less, and more preferably of about eight pounds or less. With such an arrangement, a single human can easily carry the portable interconnection system 10 of the present invention to a field location using the carrying handle 50, and still have a hand free for carrying other items, such as emergency supplies.

In general, the discussion above has assumed that the portable interconnection system 10 is controlled through the user interface 40. However, it should be noted that the portable interconnection system 10 may, in some embodiments, also be controlled remotely. For example, the portable interconnection system 10 may be programmed to accept remotely generated commands to set-up, alter, or otherwise modify one or more of the interconnection sets. Such remote commands may be issued via an audio communication unit in communication with the portable interconnection system 10, such as through the use of DTMF tones or the like. As such, the portable interconnection system 10 advantageously includes a suitable DTMF detector, such as in extension circuit 72, local extension circuit 74, or voice circuit 78.

As used herein, the phrase "showing the interconnection status of a plurality of audio communication units" and like phrases means showing, at a minimum, which audio communication units are communicatively connected to which other audio communication units through the portable interconnection system 10, which is necessarily more than merely showing which audio communications unit may be connected to the portable interconnection system 10.

The present invention may, of course, be carried out in other specific ways than those herein set forth without departing from the essential characteristics of the invention. The present embodiments are, therefore, to be considered in all respects as illustrative and not restrictive, and all changes coming within the meaning and equivalency range of the appended claims are intended to be embraced therein.

APPENDIX

Raytheon
JPS Communications

ACU-T
Tactical Interconnect System

Designed and Manufactured by:
JPS Communications, Inc.
5800 Departure Drive
Raleigh, NC 27616
Email: jps@jps.com JPS 5030-200200
Revision 1.0
June 2003

Raytheon
JPS Communications

Warranty

JPS Communications, Inc. warrants its manufactured equipment to be free from defects in materials and workmanship, and to conform to published specifications for a period of 18 months from the date of shipment from the factory or 12 months from installation, whichever occurs first.

JPS warrants its service work performed in connection with this warranty to be free from defects in materials and workmanship for a period of 90 days from the date the work is performed.

If a defect occurs within the warranty period, the buyer shall notify JPS immediately. JPS will repair or replace the equipment at its option, upon return of the equipment; shipping prepaid, to the JPS facility in Raleigh, North Carolina, USA.

This warranty does not apply to damage caused by accidents, abuse or improper installation.

NO OTHER WARRANTY, EXPRESSED OR IMPLIED, INCLUDING BUT NOT LIMITED TO THE IMPLIED WARRANTIES OF MERCHANTABILITY AND FITNESS FOR A PARTICULAR PURPOSE, SHALL APPLY.

NOTICE

JPS Communications, Inc. reserves the right to make changes to the equipment and specifications without prior notice.

PROPRIETARY STATEMENT

The information contained in this manual is the property of JPS Communications, Inc. and is intended for the purchaser's use only. It may not be reproduced without the express written consent of JPS Communications.

JPS Communications, Inc.
Phone: (919) 790-1011
Fax: (919) 790-1456
E-mail: jps@jps.com
5800 Departure Drive
Raleigh, NC 27616

Raytheon
JPS Communications

Table of Contents

| | | |
|---|---|---|
| 1 GENERAL INFORMATION | | 1-1 |
| 1.1 | Scope | 1-1 |
| 1.2 | Description | 1-1 |
| | 1.2.1 General | 1-1 |
| | 1.2.2 Card Cage | 1-1 |
| | 1.2.3 Power Supply | 1-2 |
| | 1.2.4 HSP-4 Module | 1-3 |
| | 1.2.5 CPM-2 Module | 1-4 |
| | 1.2.6 DSP-1 Module | 1-4 |
| | 1.2.7 PSTN-1 Module | 1-4 |
| | 1.2.8 LP-1 Module | 1-5 |
| | 1.2.9 System Software | 1-5 |
| | 1.2.10 Computer Control Software "ACU Controller" | 1-5 |
| 1.3 | Optional Equipment | 1-5 |
| | 1.3.1 Case Option | 1-5 |
| | 1.3.2 Radio Interface Cables | 1-5 |
| | 1.3.3 AP-1 Options | 1-6 |
| | 1.3.4 RDI-1 Module | 1-6 |
| | 1.3.5 Nextel Interface | 1-7 |
| | 1.3.6 Cell Phone Interfaces | 1-7 |
| 2 INSTALLATION | | 2-1 |
| 2.1 | General | 2-1 |
| 2.2 | Unpacking and Inspection | 2-1 |
| 2.3 | Reshipment of Equipment | 2-2 |
| 2.4 | Installation Overview | 2-3 |
| 2.5 | Installation Considerations | 2-3 |
| | 2.5.1 Cooling | 2-4 |
| 2.6 | Power Requirements | 2-8 |
| | 2.6.1 Battery Power for the ACU-T | 2-9 |
| | 2.6.2 Charge Switch | 2-9 |
| | 2.6.3 Charger ON LED | 2-9 |
| | 2.6.4 Reverse Polarity Protection | 2-10 |
| | 2.6.5 Fuse Information | 2-10 |
| 2.7 | Installation Checklist | 2-11 |
| 2.8 | External Interconnect Information | 2-12 |

Raytheon
JPS Communications

| | | |
|---|---|---|
| 2.8.1 | HSP-4 Module Connections | 2-13 |
| 2.8.2 | DSP-1 Module Connections | 2-14 |
| 2.8.3 | PSTN-1 Module Connections | 2-15 |
| 2.8.4 | LP-1 Module Connections | 2-16 |
| 2.8.5 | AP-1 Module Connections | 2-17 |
| 2.8.5.1 | AP-1 Cable Information | 2-18 |
| 2.8.6 | Serial Remote Connector | 2-18 |
| 2.9 | Hardware Configuration Settings | 2-19 |
| 2.9.1 | CPM-2 Switch Settings | 2-22 |
| 2.9.1.1 | Baud Rate SW1-1 and SW1-2 | 2-22 |
| 2.9.1.2 | Remote Control Enable SW1-3 | 2-23 |
| 2.9.1.3 | Serial Sync Character SW1-4 | 2-23 |
| 2.9.1.4 | Reserved SW1-5, 6, 7 | 2-24 |
| 2.9.1.5 | Manufacturing Test SW1-8 | 2-24 |
| 2.9.1.6 | Store Configuration SW2-1 | 2-24 |
| 2.9.1.7 | SW2-2 Through SW2-8 | 2-24 |
| 2.9.2 | AP-1 Switch Settings | 2-25 |
| 2.9.2.1 | AP-1 General Information | 2-25 |
| 2.9.2.2 | Bypass Mode | 2-25 |
| 2.9.2.3 | AP-1 Digital Delay | 2-26 |
| 2.9.2.3.1 | AP-1 Digital Delay Setting SW3 | 2-26 |
| 2.9.2.3.2 | Digital Delay Enable AP-1 SW4-1 | 2-26 |
| 2.9.2.3.3 | Control Signal Delay, AP-1 RX Option | 2-27 |
| 2.9.2.3.3.1 | Control Signal Delay, AP-1 TX Option | 2-27 |
| 2.9.2.4 | AP-1 Function Enable Switches, SW4 | 2-27 |
| 2.9.2.5 | AP-1 Control Tone Generation | 2-28 |
| 2.9.2.6 | AP-1 Control Tone Detection | 2-28 |
| 2.9.2.7 | AP-1 Installation Notes | 2-29 |
| 2.9.3 | LP-1 Jumper Settings | 2-30 |
| 2.10 | Programming Configuration Settings | 2-31 |
| 2.10.1 | To Program a Module: | 2-31 |
| 2.11 | Programming Configuration Settings | 2-45 |
| 2.11.1 | System Programming and Operating Items | 2-45 |
| 2.11.1.1 | Enter Programming Mode | 2-45 |
| 2.11.1.2 | Console Override | 2-45 |
| 2.11.1.3 | Select a Module to Program | 2-46 |
| 2.11.1.4 | Exit Programming Mode | 2-46 |
| 2.11.1.5 | Reset Modules to Factory Settings | 2-46 |
| 2.11.1.6 | PIN Numbers | 2-46 |
| 2.11.1.7 | Program PIN Numbers | 2-47 |
| 2.11.1.8 | Delete PIN Numbers | 2-47 |
| 2.11.1.9 | Module Security Level Selection | 2-47 |

| | | |
|---|---|---|
| 2.11.2 | HSP-4 Programming Items | 2-47 |
| 2.11.2.1 | HSP-4 Squelch Type | 2-47 |
| 2.11.3 | DSP-1 Programming Items | 2-48 |
| 2.11.3.1 | Receive Level (DSP-1) | 2-48 |
| 2.11.3.2 | Transmit Level (DSP-1) | 2-49 |
| 2.11.3.3 | COR Polarity (DSP-1) | 2-49 |
| 2.11.3.4 | Full/Half Duplex (DSP-1) | 2-50 |
| 2.11.3.5 | DTMF Mute Timer (DSP-1) | 2-50 |
| 2.11.3.5.1 | Transmitting DTMF via a PSTN Module | 2-51 |
| 2.11.3.5.2 | Transmitting DTMF via a Module other than the PSTN-1 | 2-51 |
| 2.11.3.6 | COR Type, VOX/VMR Threshold, Hangtime, and Audio Delay (DSP-1) | 2-52 |
| 2.11.3.6.1 | Receive (Input) Audio Delay | 2-55 |
| 2.11.3.6.2 | Transmit (Output) Audio Delay | 2-57 |
| 2.11.3.7 | Radio Type Selection (DSP-1) | 2-58 |
| 2.11.3.8 | COR Sampling (DSP-1) | 2-58 |
| 2.11.3.8.1.1 | COR Sampling Programming Options: | 2-59 |
| 2.11.3.8.1.2 | COR Sampling On/Off | 2-59 |
| 2.11.3.8.1.3 | Initial Delay Time | 2-59 |
| 2.11.3.8.1.4 | Sampling Interval | 2-60 |
| 2.11.3.8.1.5 | Sampling Window Width | 2-60 |
| 2.11.3.9 | Noise Reduction Value (DSP-1) | 2-60 |
| 2.11.3.10 | Audio Muted when Squelched (DSP-1) | 2-61 |
| 2.11.3.11 | Transmit Keying Tones (DSP-1) | 2-61 |
| 2.11.3.12 | COR Inhibit Time after PTT | 2-62 |
| 2.11.3.13 | PTT or COR Priority (Half Duplex Only) | 2-62 |
| 2.11.3.14 | Module Security Level Selection | 2-63 |
| 2.11.3.15 | DTMF Commands Enable/Disable | 2-63 |
| 2.11.3.16 | High Frequency Equalizer (DSP-1) | 2-64 |
| 2.11.3.17 | DTMF Pre-emphasis | 2-64 |
| 2.11.3.18 | Auxiliary Output Control | 2-65 |
| 2.11.3.19 | Voice Prompt Initiation Delay | 2-65 |
| 2.11.4 | PSTN-1 Programming Items | 2-66 |
| 2.11.4.1 | Telephone Line Level | 2-66 |
| 2.11.4.2 | Telephone Receive Level Boost | 2-66 |
| 2.11.4.3 | PSTN Type | 2-66 |
| 2.11.4.4 | Dial Mode | 2-67 |
| 2.11.4.5 | DTMF Mute Timer | 2-67 |
| 2.11.4.6 | RX Audio Delay | 2-68 |
| 2.11.4.7 | VOX Threshold | 2-68 |
| 2.11.4.8 | VOX Hangtime | 2-69 |
| 2.11.4.9 | 2-Wire/4-Wire Operation (STU-III Operation) | 2-69 |

Raytheon
JPS Communications

| | | |
|---|---|---|
| 2.11.4.10 | Module Security Level Selection | 2-69 |
| 2.11.4.11 | Outgoing Ring Timer | 2-70 |
| 2.11.4.12 | DTMF Command Enable | 2-70 |
| 2.11.4.13 | Auxiliary Output Control | 2-70 |
| 2.11.4.14 | Inactivity Disconnect Timer | 2-71 |
| 2.11.4.15 | Voice Prompt Initiation Delay | 2-71 |
| 2.11.4.16 | PSTN-1 Simplified Setup Procedure | 2-71 |
| 2.11.5 | LP-1 Programming Items | 2-73 |
| 2.11.5.1 | DTMF Mute Timer | 2-73 |
| 2.11.5.1.1 | Transmitting DTMF via a PSTN Module | 2-74 |
| 2.11.5.1.2 | Transmitting DTMF via a Module other than the PSTN-1 | 2-74 |
| 2.11.5.2 | RX Audio Delay | 2-75 |
| 2.11.5.3 | VOX Threshold | 2-75 |
| 2.11.5.4 | VOX Hangtime | 2-75 |
| 2.11.5.5 | Module Security Level Selection | 2-75 |
| 2.11.5.6 | Dial & Busy Tone Style | 2-76 |
| 2.11.5.7 | Ring Cadence | 2-76 |
| 2.11.5.8 | Dial Tone Enable | 2-76 |
| 2.11.5.9 | Ringback Enable | 2-76 |
| 2.11.5.10 | Outgoing Ring Timer | 2-77 |
| 2.11.5.11 | DTMF Command Enable | 2-77 |
| 2.11.5.12 | Aux Output Control | 2-77 |
| 2.11.5.13 | Voice Prompt Initiation Delay | 2-78 |
| 3 OPERATION | | 3-1 |
| 3.1 | General | 3-1 |
| 3.2 | Front And Top Panel Controls and Indicators | 3-1 |
| 3.2.1 | Power ON LED (Top Panel) | 3-2 |
| 3.2.2 | Charger ON LED (Top Panel) | 3-2 |
| 3.2.3 | System Connection Status Display (Top Panel) | 3-2 |
| 3.2.4 | Speaker Switch (Top Panel) | 3-2 |
| 3.2.5 | Headphones Output Jack (HSP-4 Front Panel) | 3-2 |
| 3.2.6 | Volume Control (Top Panel) | 3-3 |
| 3.2.7 | Fault LEDs (HSP-4, DSP-1, PSTN-1, LP-1) | 3-3 |
| 3.2.8 | Master/Slave LEDs (CPM-2) | 3-3 |
| 3.2.9 | Mon (Monitor) LED (DSP-1, PSTN-1, LP-1) | 3-3 |
| 3.2.10 | Signal LED (DSP-1) | 3-3 |
| 3.2.11 | PTT LED (DSP-1), VOX LED (PSTN-1, LP-1) | 3-3 |
| 3.2.12 | COR LED (DSP-1) | 3-4 |
| 3.2.13 | Ring LED (PSTN-1, LP-1) | 3-4 |
| 3.2.14 | Connect LED (PSTN-1) | 3-4 |

| | | |
|---|---|---|
| 3.2.15 | Off-hook LED (LP-1) | 3-4 |
| 3.3 | Rear and Side Panel Connectors | 3-5 |
| 3.4 | Basic Chassis Modules - Functions and Operation | 3-5 |
| 3.4.1 | CPM-2 | 3-5 |
| 3.4.2 | HSP-4 | 3-6 |
| 3.4.2.1 | Make a Connection | 3-8 |
| 3.4.2.2 | Break a Connection | 3-9 |
| 3.4.2.3 | Attention Command | 3-9 |
| 3.4.2.4 | Report Connections | 3-9 |
| 3.4.2.5 | Disconnect Another Extension | 3-9 |
| 3.4.2.6 | Monitor Function | 3-10 |
| 3.4.2.7 | Store Connection Table in Memory | 3-10 |
| 3.4.2.8 | Regain Control from Console Program | 3-11 |
| 3.4.2.9 | Data / Command Modes | 3-11 |
| 3.4.2.10 | System Reset Feature | 3-12 |
| 3.4.3 | Use of Radio at HSP Connector J0 | 3-12 |
| 3.5 | Interface Modules – Functions and Operation | 3-14 |
| 3.5.1 | DSP-1 | 3-15 |
| 3.5.2 | PSTN-1 | 3-15 |
| 3.5.3 | LP-1 | 3-16 |
| 3.5.4 | AP-1 | 3-16 |
| 3.5.5 | Interface Module Operational Commands | 3-17 |
| 3.5.5.1 | Make a Connection | 3-18 |
| 3.5.5.2 | Break a Connection | 3-18 |
| 3.5.5.3 | Attention Command | 3-19 |
| 3.5.5.4 | Monitor Function | 3-19 |
| 3.5.5.5 | Data / Command Modes | 3-19 |
| 3.5.5.6 | System Reset Feature | 3-20 |
| 3.6 | PIN Security | 3-21 |
| 3.6.1 | How PIN Security Works | 3-21 |
| 3.6.2 | PIN Security Modes | 3-22 |
| 3.6.2.1 | Priority Operation Mode | 3-22 |
| 3.6.2.2 | Exclusive Operation Mode | 3-22 |
| 3.6.3 | How to enable PIN Security | 3-22 |
| 3.6.4 | How to Set ACU-T Security Levels | 3-23 |
| 3.6.5 | How to Input PIN Numbers into the ACU-T Database | 3-23 |
| 3.6.6 | How to Delete PIN Numbers from the Database | 3-24 |
| 3.6.7 | How To Use The Pin Security Feature | 3-24 |
| 3.7 | ACU-T Operation | 3-25 |
| 3.7.1 | Unit Power-Up | 3-25 |
| 3.7.2 | Basic Operation Scenarios | 3-26 |

Raytheon
JPS Communications

|  |  |  |
|---|---|---|
| 3.7.2.1 | Radio to Radio | 3-27 |
| 3.7.2.1.1 | Conditions: | 3-27 |
| 3.7.2.1.2 | Operation Steps: | 3-27 |
| 3.7.2.2 | PSTN to Radio | 3-28 |
| 3.7.2.2.1 | Conditions: | 3-28 |
| 3.7.2.2.2 | Operation Steps: | 3-28 |
| 3.7.2.3 | Local Operator to Radio | 3-29 |
| 3.7.2.3.1 | Conditions: | 3-29 |
| 3.7.2.3.2 | Operation Steps: | 3-29 |
| 3.7.2.4 | Radio to Local Operator | 3-29 |
| 3.7.2.4.1 | Conditions: | 3-29 |
| 3.7.2.4.2 | Operation Steps: | 3-29 |
| 3.7.2.5 | Radio to PSTN | 3-31 |
| 3.7.2.5.1 | Conditions: | 3-31 |
| 3.7.2.5.2 | Operation Steps: | 3-31 |
| 3.7.2.6 | Local Phone to Radio | 3-32 |
| 3.7.2.6.1 | Conditions: | 3-32 |
| 3.7.2.6.2 | Operation Steps: | 3-32 |
| 3.7.2.7 | Conference Call | 3-33 |
| 3.7.2.7.1 | Conditions: | 3-33 |
| 3.7.2.7.2 | Operation Steps: | 3-33 |
| 3.8 | SERIAL Remote Control (RS-232) | 3-35 |
| 3.9 | Removal and Replacement of Modules | 3-35 |
| 4 ACU-T TECHNICAL INFORMATION | | 4-1 |
| 4.1 | Scope | 4-1 |
| 4.2 | General Description | 4-1 |
| 4.3 | Card Cage and Backplane | 4-1 |
| 4.4 | CPM-2 Control Processor Module | 4-2 |
| 4.5 | HSP-4 Handset/Speaker Module | 4-3 |
| 4.5.1 | General Description HSP-4 | 4-3 |
| 4.5.2 | Block Diagram Description HSP-4 | 4-4 |
| 4.5.3 | HSP-4 Specifications | 4-6 |
| 4.6 | DSP-1 Module | 4-8 |
| 4.6.1 | General Description DSP-1 | 4-8 |
| 4.6.2 | Block Diagram Description DSP-1 | 4-8 |
| 4.6.3 | DSP-1 Specifications | 4-10 |
| 4.7 | PSTN-1 Module | 4-12 |
| 4.7.1 | General Description PSTN-1 | 4-12 |
| 4.7.2 | Block Diagram Description PSTN-1 | 4-12 |

|   |   |   |   |
|---|---|---|---|
| | 4.7.3 | PSTN-1 Specifications | 4-15 |
| 4.8 | | LP-1 Module | 4-17 |
| | 4.8.1 | General Description LP-1 | 4-17 |
| | 4.8.2 | Block Diagram Description LP-1 | 4-17 |
| | 4.8.3 | LP-1 Specifications | 4-19 |
| 4.9 | | AP-1 Module | 4-21 |
| | 4.9.1 | AP-1 General Description | 4-21 |
| | 4.9.2 | Block Diagram Description | 4-22 |
| | 4.9.3 | AP-1 Specifications | 4-23 |
5 INDEX 5-1

Raytheon
JPS Communications

LIST OF FIGURES

Figure 2:
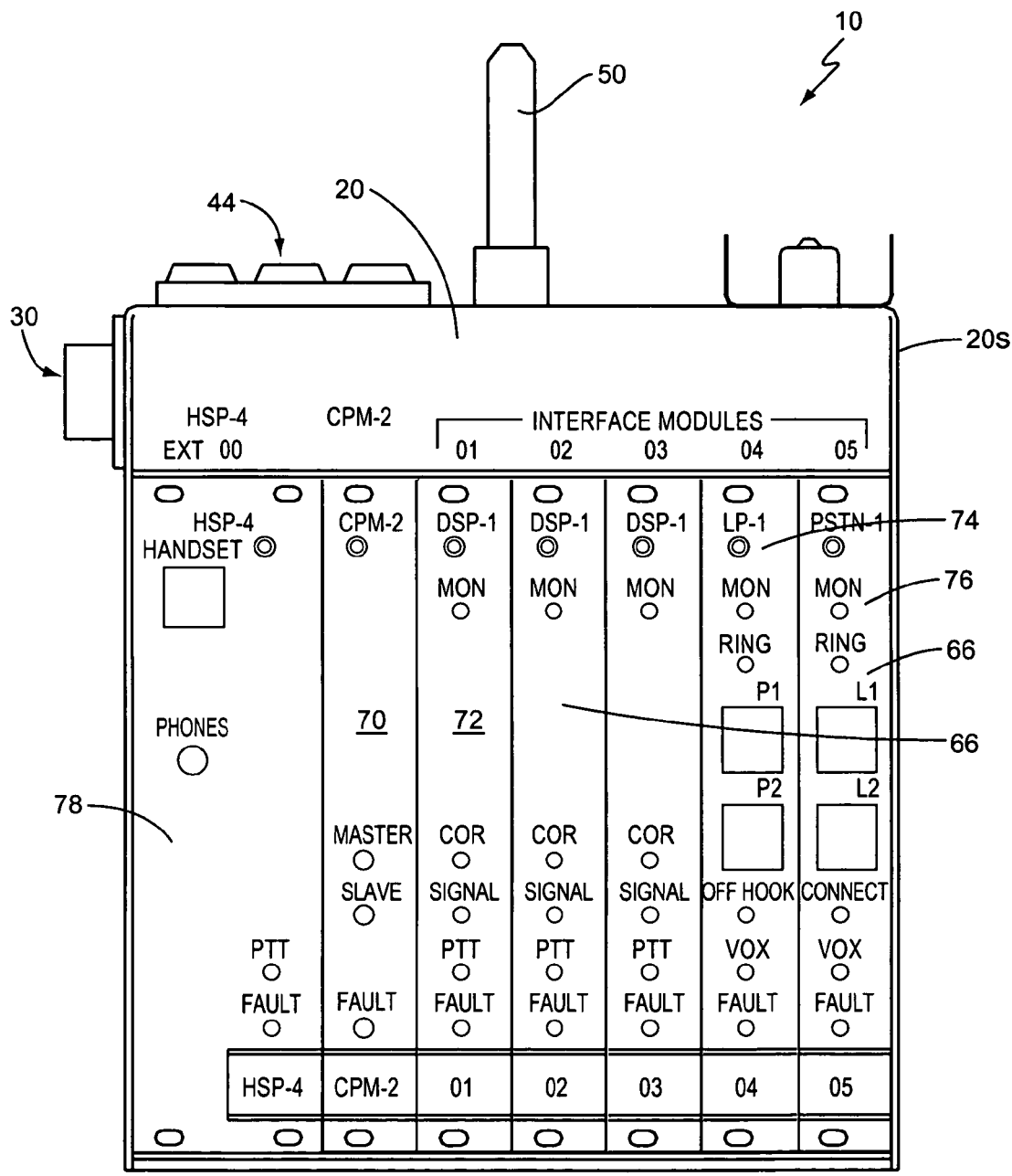
FIG. 2 shows a front view of the portable interconnection system of FIG. 1.
Figure 3:
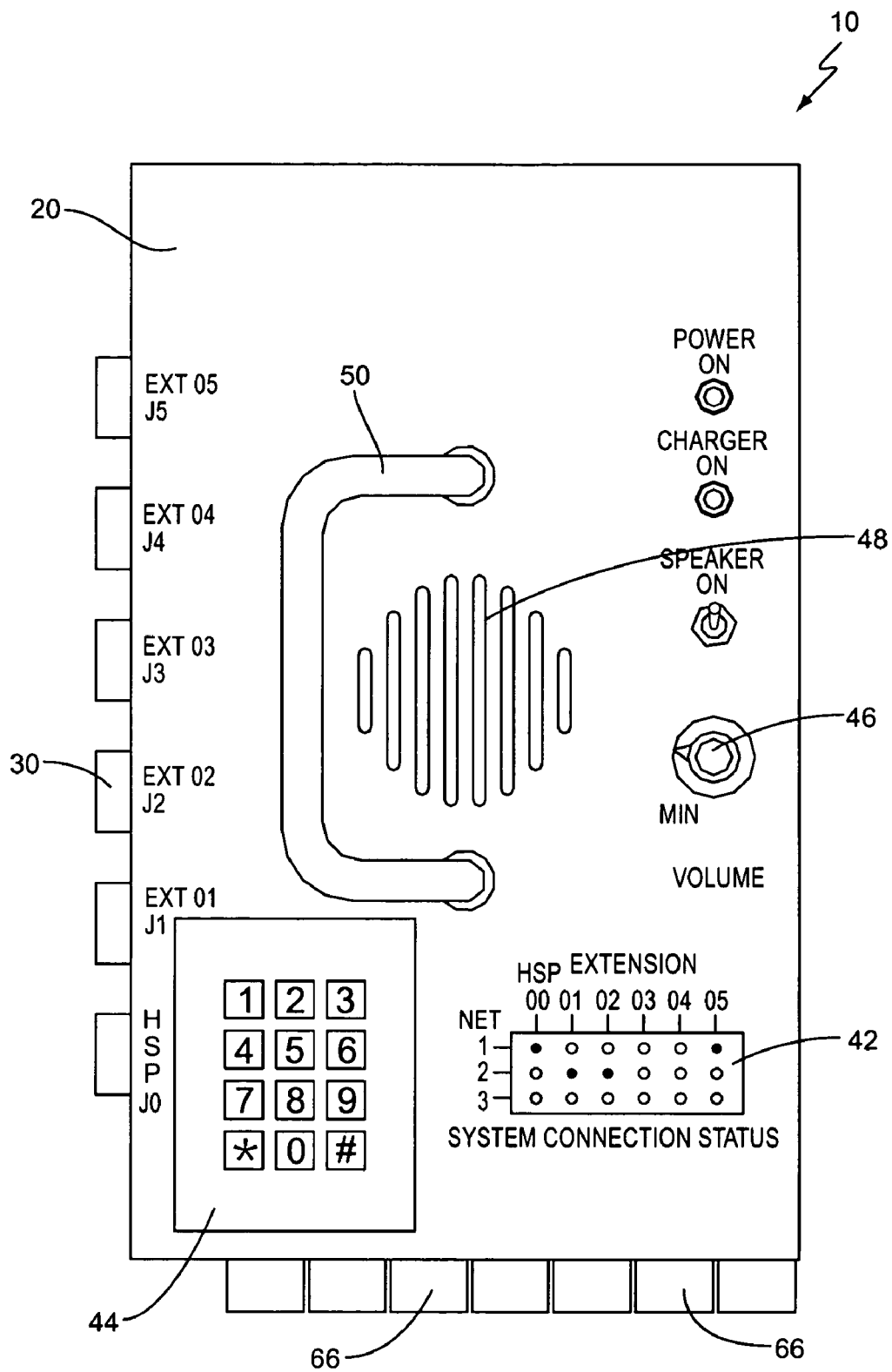
FIG. 3 shows a top view of the portable interconnection system of FIG. 1.
Figure 4:
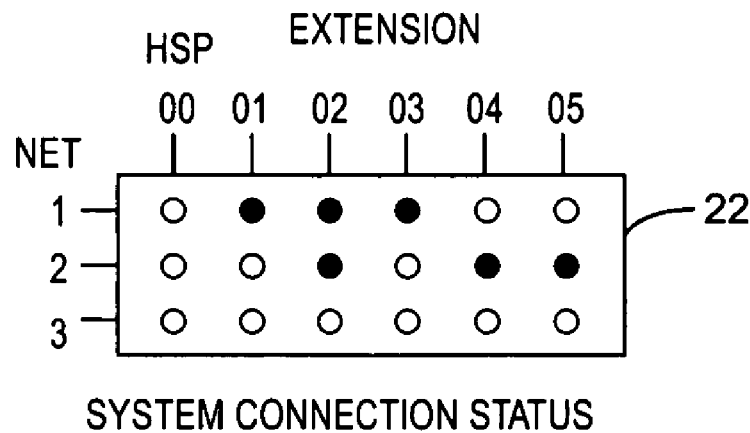
FIG. 4 shows the display of the portable interconnection system of FIG. 1 indicating a first interconnection status in any array format.
Figure 5:
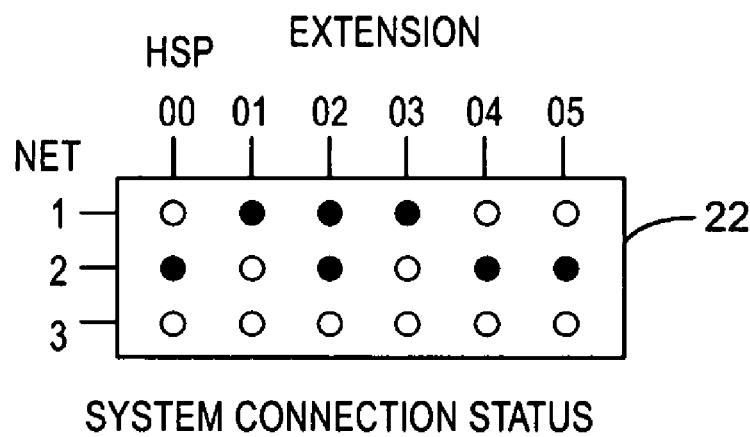
FIG. 5 shows the display of FIG. 4 indicating a second interconnection status.

| | | |
|---|---|---|
| FIGURE 2-1 | FRONT PANEL VIEW | 2-5 |
| FIGURE 2-2 | TOP PANEL VIEW | 2-6 |
| FIGURE 2-3 | REAR PANEL VIEW | 2-7 |
| FIGURE 3-1 | PICTORIAL LAYOUT FOR OPERATING SCENARIOS | 3-26 |
| FIGURE 3-2 | CONNECTION STATUS #1 | 3-27 |
| FIGURE 3-3 | CONNECTION STATUS #2 | 3-28 |
| FIGURE 3-4 | CONNECTION STATUS #3 | 3-30 |
| FIGURE 3-5 | CONNECTION STATUS #4 | 3-32 |
| FIGURE 4-1 | HSP-4 BLOCK DIAGRAM | 4-25 |
| FIGURE 4-2 | DSP-1 BLOCK DIAGRAM | 4-27 |
| FIGURE 4-3 | PSTN-1 BLOCK DIAGRAM | 4-29 |
| FIGURE 4-4 | LP-1 BLOCK DIAGRAM | 4-31 |
| FIGURE 4-5 | AP-1 BLOCK DIAGRAM | 4-33 |

LIST OF TABLES

| | | |
|---|---|---|
| TABLE 1-1 | GENERAL SPECIFICATIONS | 1-8 |
| TABLE 1-3 | EQUIPMENT AND ACCESSORIES SUPPLIED | 1-9 |
| TABLE 1-5 | INTERFACE MODULES | 1-10 |
| TABLE 1-7 | OPTIONAL EQUIPMENT - NOT SUPPLIED | 1-11 |
| TABLE 2-1 | ACU-T FUSES | 2-10 |
| TABLE 2-3 | INSTALLATION CHECKLIST | 2-11 |
| TABLE 2-5 | CHASSIS SLOTS, EXTENSIONS, CONNECTORS, AND MODULES | 2-13 |
| TABLE 2-7 | HSP-4 MODULE CONNECTIONS- J0 | 2-13 |
| TABLE 2-9 | DSP-1 MODULE CONNECTIONS- J1 THROUGH J5 | 2-14 |
| TABLE 2-11 | PSTN-1 MODULE CONNECTIONS- J1 THROUGH J5 | 2-15 |
| TABLE 2-13 | LP-1 MODULE CONNECTIONS- J1 THROUGH J5 | 2-16 |
| TABLE 2-15 | AP-1 MODULE CONNECTIONS- J1 THROUGH J5 | 2-17 |
| TABLE 2-17 | SERIAL REMOTE CONNECTIONS- J10 | 2-18 |
| TABLE 2-20 | ACU-T HARDWARE CONFIGURATION SETTINGS | 2-20 |
| TABLE 2-22 | BAUD RATE | 2-22 |
| TABLE 2-24 | REMOTE CONTROL ENABLE | 2-23 |
| TABLE 2-26 | SERIAL SYNC CHARACTER | 2-23 |
| TABLE 2-28 | MANUFACTURING TEST | 2-24 |
| TABLE 2-30 | STORE CONFIGURATION | 2-24 |
| TABLE 2-32 | AP-1 DIGITAL DELAY SETTINGS, SW3 | 2-26 |
| TABLE 2-35 | AP-1 DSP FUNCTION ENABLE, SW4 | 2-28 |
| TABLE 2-36 | JUMPER SETTINGS LP-1 | 2-30 |
| TABLE 2-38 | ACU-T CONFIGURATION PROGRAMMING ITEMS | 2-34 |
| TABLE 3-1 | HSP-4 OPERATIONAL COMMAND ITEMS | 3-7 |
| TABLE 3-3 | OPERATIONAL COMMANDS | 3-17 |
| TABLE 4-1 | HSP-4 SPECIFICATIONS | 4-6 |
| TABLE 4-3 | DSP-1 SPECIFICATIONS | 4-10 |
| TABLE 4-5 | PSTN-1 SPECIFICATIONS | 4-15 |
| TABLE 4-7 | LP-1 SPECIFICATIONS | 4-19 |
| TABLE 4-9 | AP-1 SPECIFICATIONS | 4-23 |

| Glossary | |
|---|---|
| AP-1 | Audio Processor Module - The AP-1 applies a variety of functions to other ACU-T module inputs or outputs; mainly used for additional digital delay. |
| COR | Carrier Operated Relay - A receiver signal that gives a positive indication a carrier or signal is being received and the receiver is unsquelched. Same as COS. |
| COS | Carrier Operated Squelch - See COR. |
| CPM-2 | Control Processor Module - This ACU module controls all aspects of system operation. |
| CTCSS | Continuous Tone Controlled Squelch System - A squelch system using EIA Standardized sub-audible tones in the 67Hz to 250Hz frequency range. An FM squelch, which opens only when the proper sub-audible tone is present. |
| DIP Switch | Dual In-Line Package Switch ("dipswitch") - A multi-unit switch that fits into a standard DIP IC footprint. Normally contains 8 or 10 individual switches. |
| DTMF | Dual Tone Multi Frequency - The standard touch-tone telephone dialing method sends DTMF characters over the PSTN line. |
| DSP | Digital Signal Processing (or Processor). |
| DSP-1 | Digital Signal Processor Module - The main radio interface of the ACU-T system. DSP algorithms provide VOX, VMR, Audio Delay, Noise Reduction, and Tone Keying functions. |
| EIA | Electronic Industries Association. |
| Extension | Each interface module in the ACU-T system is given an extension number. A user enters this extension number to make a communications link via the selected module. |
| Hangtime | A system with hangtime remains in the transmit mode beyond the time indicated by any keying inputs for the duration of the set hangtime For example, hangtime added to a VOX-based keying circuit prevents transmitter unkey during brief pauses in speech. |
| HSP-4 | The ACU-T Handset/Speaker/Prompt Module. It provides a local operator interface. System voice prompt creation circuitry also resides on this module. |

| Glossary | |
|---|---|
| Key | To key a transmitter means to cause it to transmit. |
| LED | Light Emitting Diode. |
| LMR | Land Mobile Radio. |
| LP-1 | The Local Phone Module in the ACU-T system. |
| Mute | To quiet or inhibit audio. |
| PCB | Printed Circuit Board. |
| Port | The ACU-T side panel connectors J0 through J5 provide Communications Ports to interface with other communications equipment. |
| PTT | Push-to-Talk - An active PTT signal causes a transmitter to key. |
| RX | Receiver or Receiving. |
| Slot | A physical location in the ACU-T chassis where a module can be inserted. |
| SNR | Signal-to-Noise Ratio. |
| Squelch | A means of detecting audio and causing some action when it is present, such as muting an audio path. |
| TX | Transmit or Transmitter. |
| VMR | Voice Modulation Recognition - A type of squelch, which is activated only by spoken words and not by tones, noise, or other audio information. |
| VOX | Voice Operated Xmit (Transmit) - A circuit or algorithm, which causes a transmitter to key or some other action when voice is present. This squelch type is activated by any audio signal, and is not restricted to voice only. |
| PSTN-1 | The ACU-T module to interface to the Public Service Telephone Network |

Raytheon
JPS Communications

*Blank Page*

Raytheon
JPS Communications

1 General Information

1.1 Scope

This instruction manual provides the information necessary to install, configure and operate the ACU-T Intelligent Interconnect System.

1.2 Description

1.2.1 General

JPS' ACU-T is a tactical modular interface/interconnect system packaged in a Eurocard chassis. With this product, an intelligent interconnect system can be configured to meet almost any interface application involving telephones and radios of any sort. The ACU-T is suitable for HF, LMR, and Inmarsat Satcom systems and offers essentially unlimited applications and expandability. A system consists of a chassis, backplane and modules, module software, and system control software.

1.2.2 Card Cage

The Card Cage is a 6 1/2" wide transportable unit equipped with a front mount Eurocard cage. Modules are plugged into an internal blackplane via the front panel. The top of the unit is drip-proof to prevent damage from water entry. The module PC Boards are 100 x 220 mm. The card cage height is 6.7" tall, 6.5" wide, with a depth of 11". The power supply assembly is located on the unit's rear panel and contains the main power switch, fuseholder, battery charger switch, and power input connectors. The ACU-T interfaces with the radios and other devices via side-mounted quick-lock circular connectors.

Raytheon
JPS Communications

1.2.3 Power Supply

The Power Supply is a single PC board assembly mounted to the unit's rear panel. The supply accepts input voltages ranging from +9V to +16V DC and furnishes all of the internal voltages required for the ACU-T to operate. The supply also has an internal battery charger with a 1A tapered charge characteristic designed for 12V gel-cell batteries.

There are two isolated power inputs. Input J7 is designed to accept +15VDC from an AC adaptor (included with the unit) and will power both the ACU-T and the battery charger. Inputs J8 and J9 (wired in parallel; not isolated from each other) accept nominal 12V battery power.

A system battery will be charged if:

- The AC adapter is connected to J7 (and supplying power)
- A 12V battery is connected to either J8 or J9
- The battery charger switch is set to on If the AC line voltage fails or the adapter is unplugged from J7, the battery will automatically take over the power supply to the unit.

Two battery inputs (J8 and J9) are provided so that a fresh battery may be connected to the unit without momentarily causing the ACU-T to lose power during a battery change.

The only requirement for +15VDC at J7 is to operate the battery charger. If the charger is not needed, any voltage as low as +9VDC will power the unit from J7.

Raytheon
JPS Communications

1.2.4 HSP-4 Module

The HSP-4 Module provides circuitry to locally monitor, configure and control an ACU-T system. The user can monitor audio via the top-mounted internal speaker (or plug in an external speaker). Alternatively, the set of headphones or the handset that comes with the HSP-4 can be used. The handset includes a PTT switch to allow the user to key a cross-connected radio via the HSP-4. Module control and configuration is made via a 3x4 keypad (standard telephone layout) on the top panel of the ACU-T. For example, if the system contains a PSTN-1 module, the user may place telephone calls manually using the HSP-4 keypad and handset. The HSP-4 may also be used to set configuration parameters (input and output levels, for example) of all system modules.

The handset and headphone jacks are mounted on the front panel of the HSP-4, and all of its other controls are mounted on the top of the ACU-T. These include: the speaker, speaker On/Off switch, volume control, keypad, and system connection status display. All system voice prompt circuitry resides on the HSP-4.

The System Connection Status display is a three row by six column matrix of 18 LED indicators. The rows designate Connection Nets 1, 2, and 3, while the columns indicate modules that may be interconnected in these nets: the HSP-4 and the five (max) other extension modules in the chassis. As connections are made between modules, the LEDs at the appropriate intersections light, indicating which modules are connected together in what nets. When the ACU-T powers up, the status display flashes each of the six columns left-to-right as a display test and indication of proper initialization.

The HSP-4 can also act as an extra radio port for the ACU-T if its local handset function is not required. In this case, a radio is plugged into the J0 connector on the side of the unit. This connector interfaces with the HSP-4 and provides audio I/O as well as a VOX function plus COR and PTT signals.

1.2.5 CPM-2 Module

The CPM-2 Control Processor Module controls the entire chassis via an internal high-speed serial bus; it requests and receives status and information from each module and sends commands to each module. It instructs modules to output their audio to one of the system audio buses. The CPM-2 provides an RS-232 serial port allowing programming and monitoring of all ACU-T functions via an external computer or serially interfaced console connected to J10 on the rear panel. The front panel of the CPM-2 Module contains a Fault LED (the front panel Master and Slave LEDs are non-functional in an ACU-T).

1.2.6 DSP-1 Module

This module is the main interface module for radios and other 4-wire devices. It contains circuits to interface balanced or unbalanced audio from a receiver and to a transmitter, and has level adjustments for both. The DSP-1 contains three types of COR (receiver unsquelched condition detection); hardwired signal, VMR, and VOX. It offers a DSP noise reduction mode. The VMR and Noise Reduction capability make it ideal for an HF radio interface. Other features include audio delay, configurable equalization of RX input, and key tone capability.

1.2.7 PSTN-1 Module

The PSTN Module is the 2-wire interface between the ACU system and a telephone system (as opposed to a telephone set). A telephone system is an entity that accepts dialing information and processes calls, such as a PSTN line, PABX line, Inmarsat Terminal, or cellular phone. (A telephone set is a device that generates dialing information. It is interfaced to the ACU system via the LP-1 Module.) The PSTN-1 contains one 4-wire port for interfacing to 4-wire phone lines or other devices, and two 2-wire ports with front-panel RJ-11C jacks for interfacing with PSTN lines or satellite equipment. The module contains ring detect circuitry for automated system operation. The interface signal levels are configurable via the HSP-4 module.

The module has a DSP hybrid and VOX with configurable sensitivity and hangtime. It has a DTMF receiver/generator for control and call progress recognition. There are two uncommitted auxiliary parallel inputs and two uncommitted auxiliary parallel outputs. The two 2-wire ports are permanently connected to front-panel RJ-11C jacks.

1.2.8 LP-1 Module
The Local Phone Module is the interface to the ACU system for 2-wire devices that generate dialing information such as a telephone set or FAX machine. This module contains a loop current generator, ring voltage generator, dial and busy tone generators, a DSP hybrid with VOX and a DTMF generator/receiver. In addition to interfacing a telephone set into the ACU system, this module can be used as a telephone "line card" in a mini-PBX system.

1.2.9 System Software
This high level software resides on the CPM-2 Control Processor Module and controls all aspects of the ACU-T's inter-operation with the outside world. It contains the interface protocol necessary for external computer control of specific ACU-T Systems, and determines various aspects of the operator's control interface with an ACU-T System, including the timing of the system voice prompts.

1.2.10 Computer Control Software "ACU Controller"
The ACU Controller allows a PC User to control the ACU-T and monitor its status. The ACU Controller is also the easiest way to set or check all of the configuration parameters of the system interface modules.

1.3 Optional Equipment

1.3.1 Case Option
The ACU-T case option includes a ruggedized foam-lined carrying case that includes the ACU-T Battery Power Option. The case holds the ACU-T with spaces for its manual, AC power adapter, and accessory kit, plus room for power cables and radio interface cables.

1.3.2 Radio Interface Cables
JPS offers a variety of cables that interface common radios (both mobile & portable) via the ACU-T's side-panel CPC connectors. If a cable is required for a radio that JPS does not currently interface, JPS may create an interface cable design (under certain conditions). Contact JPS for further information.

Raytheon
JPS Communications

1.3.3 AP-1 Options

The AP-1 module is a general-purpose 4-wire module that can provide a variety of DSP operations. Unlike other ACU-T modules, the AP-1 does not communicate with the system audio and control bus structures on the ACU-T backplane. The AP-1 is "In Series" with the audio signal that is routed through it via the associated CPC connector. The ACU-T chassis provides DC power and a mounting slot for the AP-1.

The DSP functions of the AP-1 can operate either on the audio and control signal coming into the ACU-T module that it is associated with (AP-1 RX Option Assembly), or on the audio and control signal that is exiting the associated ACU-T module (AP-1 TX Option Assembly). The RX and TX options include the required cabling. For example, if the AP-1 TX option is being used to add digital delay to the output audio from a DSP-1 module to the associated radio, The "Y" cable allows the module to be placed in series with the DSP-1's TX audio.

To use, simply remove the radio interface cable from the side-panel conector associated with the DSP-1 module. Install the AP-1 module into an adjacent chassis slot. Now connect the "Y" cable to the unit: P1 connects to the DSP-1 module, P3 connects to the AP-1 module, and the radio interface connector that had been removed from the ACU-T is now reconnected to P2 of the AP-1 "Y" cable.

Alternatively, the AP-1's DSP features can be used to modify signals not associated at all with the ACU-T. In this case, the customer can manufacture custom cabling to suit the application.

See Table 2-15 for the AP-1 pinouts for connectors J1 to J5.

1.3.4 RDI-1 Module

The RDI-1 module can be used as a basic four-wire interface module. It supports PTT output and COR input, but does not have Digital Signal Processing circuitry and therefore can not perform the sophisticated DSP algorithms that the DSP-1 module can (VMR, VOX, Digital Audio Delay, Tone Keying, etc.). The RDI-1 has one feature that the DSP-1 module does not - an RS-232 interface. Consult JPS for any systems that require an RS-232 interface to a connected four-wire device.

Raytheon
JPS Communications

1.3.5 Nextel Interface

JPS has interface cables to connect to a variety of Nextel Radios. Consult JPS for details.

1.3.6 Cell Phone Interfaces

JPS offers some cell-phone cradles that allow commercial cell-phones to be connected into the system via the PSTN-1 module. Consult JPS for details.

JPS Communications

| Table 1-1 | General Specifications |
|---|---|
| *See Section 4 for individual module specifications* | |
| RS-232 Serial Port J10 | DB-9 Female DCE connector. Baud Rates: 1200, 2400, 4800, and 9600. |
| ACU-T Top Panel | Power LED, Charger LED, Speaker, Speaker Switch, Volume Control, Keypad, and System Connection Status Display. |
| HSP-4 Front Panel | Handset Connector, 1/8" Headphone Jack, PTT LED and FAULT LED. |
| CPM-2 Front Panel | MASTER LED, SLAVE LED, and FAULT LED. |
| DSP-1 Front Panel | Monitor, COR, Signal, PTT, and Fault LEDs. |
| PSTN-1 Front Panel | L1 and L2 RJ-11 Telephone Line Connectors, Monitor, Ring, Connect, VOX and Fault LEDs. |
| LP-1 Front Panel | P1 and P2 RJ-11 Telephone Set Connectors, Monitor, Ring, Off-hook, VOX and Fault LEDs |
| Rear Panel | Main Power Switch, Battery Charger Switch, Fuseholder, DC Input Connector J7, Battery Connectors J8 and J9 and DB-9 Serial Remote Connector. |
| DC Input Power | 15VDC @ 4A max from AC Adapter plugged into J7. |
| BatteryPower | +9 to +15 VDC @ 1A to 4A, depending on the number of installed interface modules. |
| Size | 7" H x 7.3" W x 11.4" D (17.8x18.5x29.0 cm). |
| Weight | 8 lbs (with maximum # of interface modules). |
| Operating Temperature | -20 to +60 degrees C. |
| Storage Temperature | -40 to +85 degrees C. |
| Humidity | Up to 95% @ 55 degrees C. |
| Shock | MIL-STD-810D, Method 516.3, Procedure VI. |
| Vibration | MIL-STD-810D, Method 514.3, Category I. |

Raytheon
JPS Communications

| Table 1-3 Equipment and Accessories Supplied | | |
|---|---|---|
| Quantity | Item | JPS P/N |
| 1 | ACU-T Chassis<br>An ACU-T system consists of a chassis, HSP-4 and CPM-2 modules, up to 5 Interface Modules (See Table 1-5) in any combination.<br>Unused slots on the chassis are covered with blank plates. | 5030-200000 |
| 1 | HSP-4 Module | 5030-202000 |
| 1 | CPM-2 Module | 5961-213000 |
| 1 | ACU Controller Software | 5961-298000 |
| 1 | Operation & Maintenance Manual | 5030-200200 |
| 1 | Accessory Kit<br>Consisting of: | 5030-200150 |
| | Qty  Part Number  Description<br>1    0313-037770  Line Cord<br>1    5030-273000  Power Supply AC Line to 15VDC 4A<br>1    2010-200350  Screwdriver<br>1    0313-080000  RS-232 Cable<br>1    5030-200151  Mounting Brackets, set of 2<br>2    0640-050100  Fuse, 2AG, 5A, 250V, (F1)<br>1    0150-200000  Handset with PTT switch, Black<br>1    0313-060000  Cord, coiled, 5 ft, black, for handset<br>6    0362-005003  Connector, CPC, Plug<br>6    0362-005005  Connector, Cable Shell clamp<br>54  0362-005002  Connector Sockets, Amp CPC<br>1    5030-200153  ACU-T Universal Battery Cable<br>1    5030-200154  ACU-T Aux Power Cable<br>1    5951-707000  Extender card assembly | |
| | Note: Connector components and pins allow the user to create ACU-T interface cables. Alternatively, cables may be purchased from JPS. See Table 1-7. | |

Raytheon
JPS Communications

| | Item | JPS P/N |
|---|---|---|
| As Required | DSP-1 Module<br>Main Interface module for connecting radios and other 4-wire devices. | 5961-818000 |
| A/R | PSTN-1 Module<br>Interface module for connecting to the PSTN, SATCOM Terminal, Cellular Phone or other similar 2-wire devices. | 5961-215000 |
| A/R | LP-1 Module<br>Interface module for connecting to 2-wire devices such as a local telephone set or FAX machine. | 5961-207000 |

Table 1-5    Interface Modules

| Table 1-7 Optional Equipment - Not Supplied |||
|---|---|---|
| Item | JPS P/N | Description |
| Spare Parts Kit | 5030-293000 | Spare Parts |
| Depot Spares Kit | 5030-291000 | Depot Spares |
| Battery Power Option Kit | 5030-205000 | Battery and Cabling |
| Case Option | 5030-204000 | Ruggedized foam-lined case includes Battery Power Kit. Has storage spaces for ACU-T accessories and some radio interface cables. |
| AP-1 RX Option For ACU-T | 5961-284001 | "Y" cable to place the AP-1 module in series with input (RX) audio. |
| AP-1 TX Option For ACU-T | 5961-284002 | "Y" cable to place the AP-1 module in series with output (TX) audio. |
| RDI-1 Module | 5961-212000 | Interface module for connecting radios and other 4-wire devices. This module does not have DSP circuitry, but does have RS-232 capability. |
| Radio Interface Cables | Various | Interface the ACU-T to common models of mobile or portable radios. Consult JPS for details. |
| Nextel Interface Cables | Various | Interface the ACU-T to some models of Nextel radios. Consult JPS for details. |
| Cell Phone Interface Cables | Various | JPS offers several after-market cell phone interfaces that allow some cell phone models to be connected into the ACU-T system via the PSTN-1 Module. Consult JPS for details. |

Raytheon
JPS Communications

*End of Section One.*

JPS Communications

2 Installation

2.1 General

This Section provides the instructions for unpacking, inspection, installation and set-up. Included are directions for reshipment of damaged parts or equipment.

2.2 Unpacking and Inspection

After unpacking the unit, retain the carton and packing materials until the contents have been inspected and checked against the packing list. If there is a shortage or any evidence of damage, do not attempt to use the equipment. Contact the carrier and file a shipment damage claim. A full report of the damage should be reported to the JPS Customer Service Department. The following information should be included in the report:

1. Order Number
2. Equipment Model and Serial Numbers
3. Shipping Agency
4. Date(s) of Shipment The JPS Customer Service Department can be reached by phone at (919) 790-1011, by fax at (919) 790-1456. Upon receipt of this information, JPS will arrange for repair or replacement of the equipment.

Raytheon
JPS Communications

2.3 Reshipment of Equipment

If it is necessary to return the equipment to the manufacturer, a Returned Material Authorization (RMA) number must first be obtained from JPS. This number must be noted on the outside of the packing carton and on all accompanying documents. When packing the unit for reshipment, It is best to use the original packaging for the unit; if this is not possible, special attention should be given to providing adequate packing material around connectors and other protrusions, such as front panel controls. Rigid cardboard should be placed at the corners of the unit to protect against corner damage during shipment.

Shipment should be made prepaid consigned to:

> JPS Communications, Inc.
>
> Customer Service Department
>
> 5800 Departure Drive
>
> Raleigh, North Carolina 27616
>
> USA

Plainly, mark with indelible ink all mailing documents as follows:

> U.S. GOODS RETURNED FOR REPAIR

Mark all sides of the package:

> FRAGILE - ELECTRONIC EQUIPMENT

Inspect the package prior to shipment to be sure it is properly marked and securely wrapped.

Raytheon
JPS Communications

2.4 Installation Overview

These steps are needed to properly prepare the ACU-T for use:

1. Provide the proper power for the unit. See Section 2.6.

2. Interconnect the unit with the communications system via the unit's side panel connectors. See Sections 2.7 and Figure 2-2.

3. Check all internal set-ups and adjustments per the sections beginning with 1.1.

2.5 Installation Considerations

The ACU-T is a transportable unit that may be carried by its handle to operations in the field. The metal housing provides moderate protection from the weather and assurance of operation in ambient temperatures between -20 and +60 degrees C. The top of the unit is drip proof yet should be protected from exposure to salt spray due to risk of corrosion.

The unit may be permanently attached to a hard surface using the mounting brackets provided in the accessory kit. Figure 2-2 and Figure 2-3 provide overall unit dimensions.

---

NOTE: When the ACU-T is installed in a high RF environment such as repeater site, it is recommended that cable assemblies to each module be individually shielded. The cable shields should be connected to Pin 1 (ground) in the CPC connectors of the ACU-T.

---

Raytheon
JPS Communications

2.5.1 Cooling

The ACU-T depends on radiation from its metal surfaces and natural convection for its cooling, therefore it must be arranged in a way that allows for sufficient air circulation or unacceptably high internal temperatures may result. A fully loaded ACU-T with five modules installed dissipates approximately 22 watts. The unit has no internal blower or fan.

A pair of installation guidelines:

1) The ACU-T may be installed in an enclosed space such as a transportable case and operated continuously at temperatures that humans are comfortable in. The transportable case supplied by JPS has the ACU-T front panel area deliberately uncovered to allow it to radiate heat from that surface.

2) If the ACU-T will be operated in a high temperature area such as the trunk of a car or other enclosed space, it must be mounted in the open so that it can radiate heat from its metal surfaces. That is, it should not be operated for long periods while in a high temperature area while also enclosed in a transportable case.

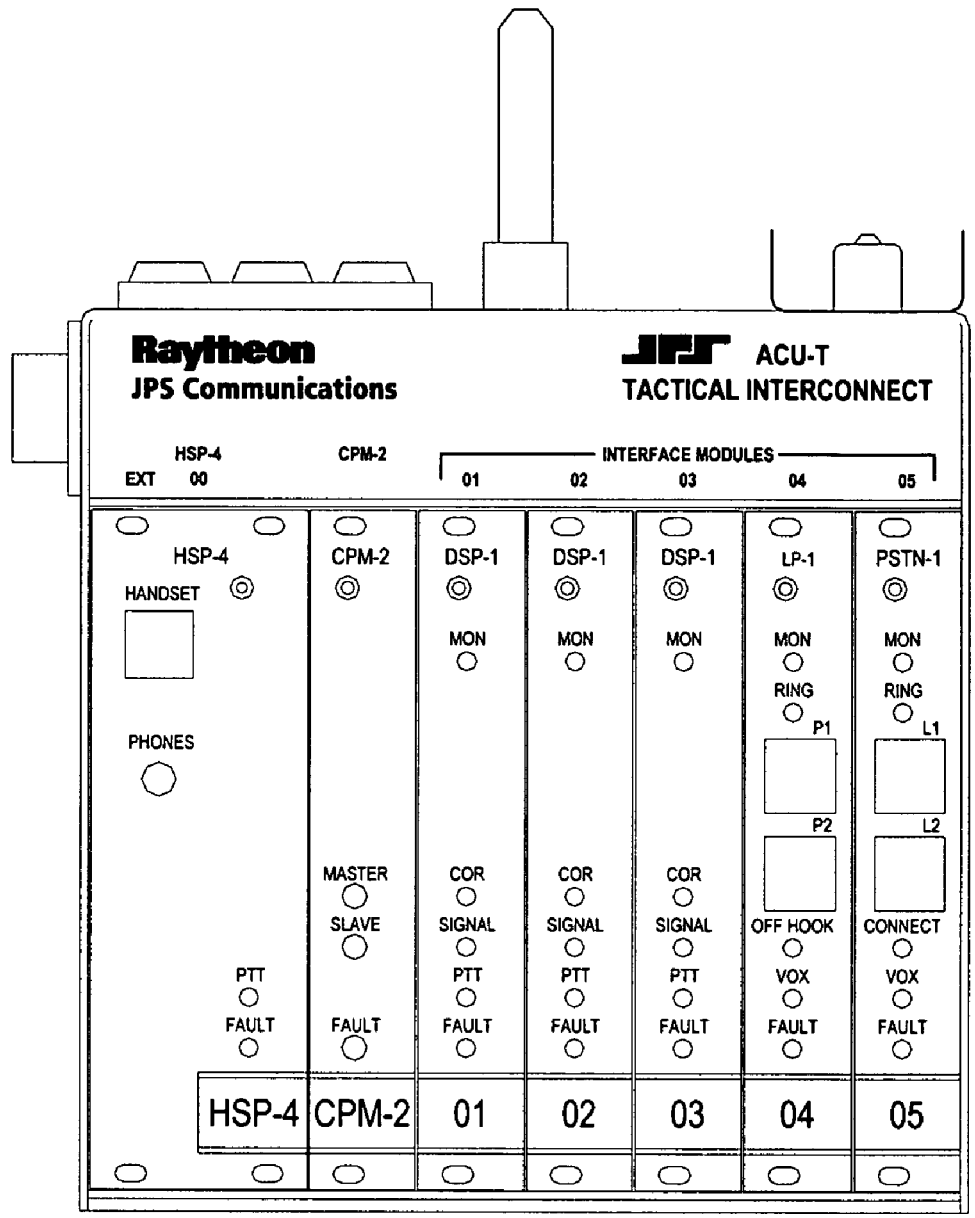
Figure 2-1    Front Panel View

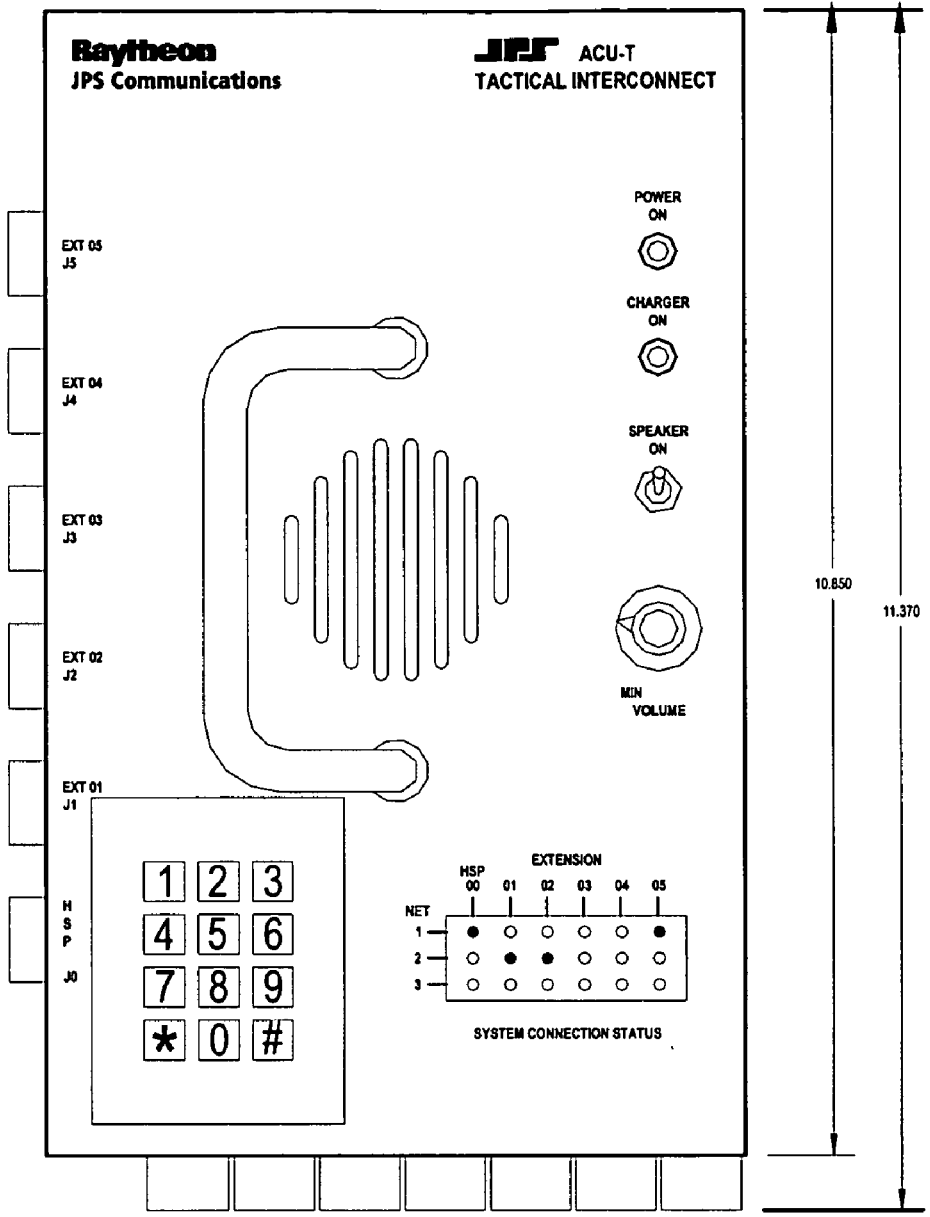
Figure 2-2  Top Panel View

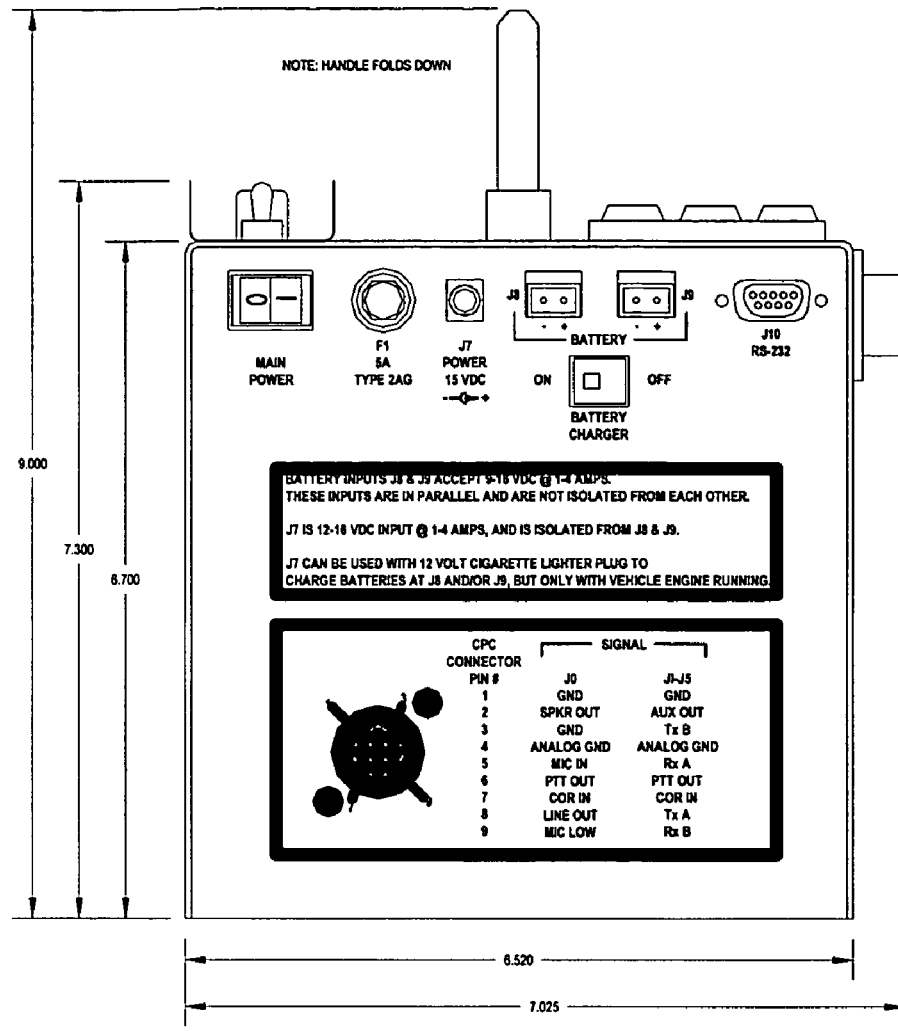
*Figure 2-3      Rear Panel View*

Raytheon
JPS Communications

2.6 Power Requirements

The ACU-T will operate with DC supply voltage from +9 to +16 VDC. There are two isolated power inputs. Input J7 is designed to accept +15VDC from an AC adaptor (included with the unit) to power both the ACU-T and the battery charger. Inputs J8 and J9 (wired in parallel; not isolated from each other) accept nominal 12V battery power. With the included AC adapter connected to J7 and a 12V battery connected to either J8 or J9, the battery will be charged (if the battery charger switch is on) as long as the AC adapter is supplying power. If the AC line voltage fails or the adapter is unplugged from J7, the battery will automatically take over the power supply to the unit.

Two battery inputs (J8 and J9) are provided so that a fresh battery may be connected to the unit without causing the ACU-T to lose power during a battery change.

The only requirement for having a voltage of +15VDC at J7 is to operate the battery charger. If the charger is not needed, any voltage as low as +9VDC will power the unit from J7.

Actual power consumption depends on the number of interface modules installed. The DC power input characteristic of the unit is essentially constant power, i.e., the input power requirement is constant so the input current varies with the input voltage and number of modules installed. A fully loaded chassis consumes 1.8A (21.6W) when run at a nominal 12VDC.

CAUTION: Always disconnect input power cabling from the ACU-T prior to servicing the unit.

NOTE: Any DC power supply connected to the ACU-T DC input must be Safety Extra Low Voltage (SELV) certified.

2.6.1 Battery Power for the ACU-T

A 12V gel-cell battery connected to J8 or J9 can power the ACU-T. An 18AH battery is recommended. When both battery and an AC adapter are connected, the battery will be charged and the unit will be powered from adapter power as long as the AC adapter remains powered or connected to the unit. If the adapter is unpowered or disconnected, the unit will automatically switch over to battery power. When powered by a +12V battery at J8 or J9, the ACU-T current consumption is approximately the following: 0.3A + (0.3A * # interface modules). In other words, the basic chassis with CPM and HSP modules draws 0.3 Amps, and each interface module draws an additional 0.3 Amp. So the current consumption would be the following:

- Chassis with 1 module = 0.6A
- Chassis with 2 modules = 0.9A
  - Chassis with 5 modules = 1.8A (fully loaded ACU-T)

The recommended 18AH battery will give about 10 hours of operation with a fully-loaded ACU-T, and correspondingly longer operating time when fewer than five modules are installed.

2.6.2 Charge Switch

The rear panel Battery Charger Switch must be set to ON to charge batteries connected to J8 or J9. The switch should be set to OFF if any source of power except a battery is connected to either J8 or J9.

2.6.3 Charger ON LED

This LED on the top panel will be lit when the battery charger is turned ON and a battery is connected and charging. The LED is brightest when a battery is low on charge and dims as the battery nears full charge. If there is no battery connected, or the battery is fully charged, the indicator will not light even if the Charger switch is set to ON.

JPS Communications

2.6.4 Reverse Polarity Protection

Power input J7 is protected from reverse polarity by a series diode. If reverse polarity power is applied at J7, the unit will not operate and no damage will occur.

Inputs J8 and J9 are reverse polarity protected by diodes to ground at these inputs and series fuses in the cables. Note that cables attached to these inputs MUST have a series fuse. If reverse polarity power is applied at either J8 or J9, the internal diode will conduct and blow the series cable fuse. The unit will not operate and no damage will occur except for a blown fuse.

2.6.5 Fuse Information

This section identifies the fuses used in and with the ACU-T.

F1 fuses the total DC power to the unit. It protects the unit from fire or component damage in the even of an internal short circuit in the ACU-T or any of the installed modules.

The Universal battery cable and Aux Power cable both have built-in fuses. These fuses protect against applied reverse polarity power as well as internal faults in the unit.

| Table 2-1 ACU-T Fuses | | | |
|---|---|---|---|
| F1 | 5A, 250V, 2AG | Main | Fuses all power to the ACU-T. |
| --- | 10A, 250V, AGC | Battery Cable | Reverse polarity protection for J8, J9. |
| --- | 10A, 250V, AGC | Aux Power Cable | Reverse polarity protection for J8, J9. |

2.7 Installation Checklist

| Table 2-3    Installation Checklist | |
|---|---|
| Provide suitable Mounting and Cooling. | See Section 2.5. |
| Battery Power needed? | See Section 2.6.1 and 2.6.2. |
| Make Interconnections. | See Section 2.8 for External Interconnect Information. |
| Serial Remote Control needed? | Set Serial Remote control ON with CPM SW1-3. Set Baud Rate with CPM SW1-1 and 2. |
| Set Audio Input Levels if necessary. | See Programming Items for the DSP-1 in Table 2-38. |
| Set Audio Output Levels if necessary. | See Programming Items for the DSP-1 in Table 2-38. |
| Set COR Type and Polarity. | See Programming Items for the DSP-1 in Table 2-38. |
| Set Squelch Type if necessary | See Programming Items for the DSP-1 in Table 2-38 |
| Set Telephone Line Level if necessary. | See Programming Items for the PSTN-1 in Table 2-38. |
| Is COR Sampling needed? | See Programming Items for the DSP-1 in Table 2-38. |
| Is Noise Reduction Needed? | See Programming Items for the DSP-1 in Table 2-38. |
| | |
| Numerous other configuration options available but not included in this checklist. See the manual sections beginning with 2.9. | |

JPS Communications

2.8 External Interconnect Information

This section details the type and pin-out information for the ACU-T external connectors. The left-most slot in the chassis is reserved for the HSP-4 Handset/Speaker/Prompt Module and the second slot is for the CPM-2 Control Processor Module. Both of these modules are required for system operation. The 5 remaining slots may be occupied by any complement of the various ACU-T interface modules.

Each of the interface module slots (and the HSP-4 slot) has an associated CPC connector on the side panel. The pin connections presented at the side panel CPC connectors depend on the type of interface module installed in the associated slot. The connectors for the 5 interface module slots are labeled J1-J5 on the side panel. J1 is associated with the module plugged into the slot adjacent to the CPM-2 Module, and the J5 is the connector for the module plugged into the right-most slot. J0 provides external connections to the HSP-4 module.

To reference the modules and system users, the 5 slots that the interface modules plug into are associated with "extensions". Extensions 01 through 05 correspond with side panel circular connectors J1 through J5. The HSP module is identified by the extension "J0" (think of this as similar to "O" for "Operator").

System users employ these extension numbers to identify the connections they want to create. If a VHF radio were connected to the DSP module at J2 (extension 02) and the VHF operator wanted to make a call via the phone line connected to PSTN module in slot 5, he would use his DTMF keypad to call extension 05. If the VHF user wanted instead to communicate directly to the local operator at the ACU-T, he would use his DTMF keypad to connect to extension 00. A radio (or other 4-wire device) may also be connected to J0 using the same interface cable as would be used to connect it to J1 throuh J5. If this is done, a connection to extension 00 will interconnect this radio. See Section 3.4.3 for more information regarding the use of J0 to connect radios.

See Section 3 for full operational instructions.

| Table 2-5 Chassis Slots, Extensions, Connectors, and Modules |||||
|---|---|---|---|
| Chassis Slot | Extension | Side CPC Connector | Module Type |
| HSP | 00 | J0 | HSP-4 |
| CPM | None | None | CPM-2 |
| 1 | 01 | J1 | Various |
| 2 | 02 | J2 | Various |
| 3 | 03 | J3 | Various |
| 4 | 04 | J4 | Various |
| 5 | 05 | J5 | Various |

2.8.1 HSP-4 Module Connections

The HSP-4 module in the system must be plugged into extension 00 in the card cage, which connects it to J0 on the side panel.

| Table 2-7 HSP-4 Module Connections- J0 |||
|---|---|---|
| PIN | Signal | Description |
| 1 | Gnd | Ground connection. |
| 2 | Sprk Out | External speaker connection. |
| 3 | Gnd | Ground connection. |
| 4 | Analog Ground | Used for an audio signal return. |
| 5 | Mic In | Microphone Input; suitable for radios also; has AGC. |
| 6 | /PTT OUT | Active Low output to key a radio. |
| 7 | /COR In | COR input from a receiver, active low. |
| 8 | Line Out | 0 dBm line level audio output. |
| 9 | Mic Low | Microphone return. Use as ground return for Pin 5. |

Raytheon
JPS Communications

2.8.2 DSP-1 Module Connections

A DSP-1 module may be plugged into any of the extensions 01 through 05 in an ACU-T chassis. Its interface with the outsideworld would be available at the associated side panel connector, J1 through J5.

| Table 2-9 DSP-1 Module Connections- J1 through J5 | | |
|---|---|---|
| PIN | Signal | Description |
| 1 | Ground | Ground connection. |
| 2 | /AUX Out 1 | Auxiliary Output 1- Active low; used for special functions only. |
| 3 | TX Out B | Balanced transmit audio output. |
| 4 | Analog Ground | Used for an audio signal return. |
| 5 | RX in A | Balanced receive audio input. |
| 6 | /PTT Out | Active Low output to key a radio. |
| 7 | COR In | COR input from a receiver. |
| 8 | TX Out A | Balanced transmit audio output. |
| 9 | RX in B | Balanced receive audio input. |
| Note: For unbalanced audio, ground "B" pin of audio pair; connect unbalanced audio to "A" pin. | | |

2.8.3 PSTN-1 Module Connections

A PSTN-1 module may be plugged into extensions 01 through 05 in an ACU-T chassis.

| Table 2-11 PSTN-1 Module Connections- J1 through J5 | | |
|---|---|---|
| PIN | Signal | Description |
| 1 | Ground | Ground connection. |
| 2 | /AUX In 2 | Auxiliary Input 2- Active low; used for special functions only. |
| 3 | Tel Line 1 Tip | Telephone Line 1 Tip Connection; use JP2 to enable. |
| 4 | Analog Ground | Used for an audio signal return. |
| 5 | Tel Line 2 Ring | Telephone Line 2 Ring Connection; use JP3 to enable. |
| 6 | /AUX Out 1 | Auxiliary Output 1- Active low; used for special functions only. |
| 7 | 4WOUT | 4-Wire Audio Output. |
| 8 | Tel Line 1 Ring | Telephone Line 1 Ring Connection; use JP1 to enable. |
| 9 | Tel Line 2 Tip | Telephone Line 2 Tip Connection; use JP4 to enable. |

Raytheon
JPS Communications

2.8.4 LP-1 Module Connections

An LP-1 module may be plugged into any of the extensions 01 through 05 in an ACU-T chassis.

| Table 2-13 LP-1 Module Connections- J1 through J5 | | |
|---|---|---|
| PIN | Signal | Description |
| 1 | Ground | Ground connection. |
| 2 | /AUX In 2 | Auxiliary Input 2- Active low; used for special functions only. |
| 3 | Tel Line 1 Tip | Telephone Line 1 Tip Connection. |
| 4 | Analog Ground | Used for an audio signal return. |
| 5 | Tel Line 2 Ring | Telephone Line 2 Ring Connection. |
| 6 | /AUX Out 1 | Auxiliary Output 1- Active low; used for special functions only. |
| 7 | /PTT In | Active- Low PTT Input. |
| 8 | Tel Line 1 Ring | Telephone Line 1 Ring Connection. |
| 9 | Tel Line 2 Tip | Telephone Line 2 Tip Connection. |

2.8.5 AP-1 Module Connections

An AP-1 module may be plugged into any of the extensions 01 through 05 in an ACU-T chassis.

| Table 2-15 AP-1 Module Connections- J1 through J5 | | |
|---|---|---|
| PIN | Signal | Description |
| 1 | Ground | Ground connection. |
| 2 | /AUX Out 1 | Auxiliary Output 1- Active low; used for special functions only. |
| 3 | TX Out B | Balanced transmit audio output. |
| 4 | Analog Ground | Used for an audio signal return. |
| 5 | RX in A | Balanced receive audio input. |
| 6 | /PTT Out | Active Low output to key a radio. |
| 7 | COR In | COR input from a receiver. |
| 8 | TX Out A | Balanced transmit audio output. |
| 9 | RX in B | Balanced receive audio input. |
| Note: For unbalanced TX output audio, ground "B" pin of audio pair; connect unbalanced audio to "A" pin. | | |

2.8.5.1 AP-1 Cable Information

The AP-1 module applies DSP functions to its throughput audio and/or control lines. This audio can be applied to either the input or the output of other ACU-T interface modules. The AP-1 Option cabling determines whether its functions are applied to the associated ACU-T module's input or to its output. The cable provided with the AP-1 module is designed to be used in series with the standard radio interface cable.

For example, if extra audio delay must be added to a trunked radio interfaced with a DSP-1 module in the ACU-T chassis, the AP-1 TX Option must be used.

To install, disconnect the trunked radio's interface connector from the side panel of the ACU-T. Install the AP-1 module (configured for the proper audio delay) into a chassis slot adjacent to the DSP-1 module. Attach the AP-1 TX Option cable as follows:

- P1 connects to the DSP-1's side panel connector
- P3 connects to the AP-1's side panel connector
- P2 connects to the interface cable from the trunked radio; P2 is the same configuration as the ACU-T's side panel connector so that it mates with any standard ACU-T interface cable.

2.8.6 Serial Remote Connector

This female 9-pin DB-9 connector provides a serial RS-232 interface with the CPM-2 module. The connector is labeled J10 on the rear panel. Standard DCE pinout is used.

| Table 2-17 Serial Remote Connections- J10 ||
|---|---|
| PIN | Signal |
| 2 | TX Data |
| 3 | RX Data |
| 5 | Ground |

Raytheon
JPS Communications

2.9 Hardware Configuration Settings

In the ACU-T, there are two types of system and module configuration settings: Hardware and Programming. Changing physical pots, jumpers, and switches on each module adjusts hardware settings. Programming items for each module are set via the HSP-4 Keypad or by RS-232 remote control. In general, the hardware settings are done once at installation and need not be changed, while the programming items are more likely to be changed after installation to optimize system performance. This section explains all hardware configuration switch and jumper settings for each of the modules in a system. A full explanation of Programming Configuration Settings follows.

To access the potentiometers, jumpers and switches listed in Table 2-20, use the Extender Card found in the Accessory Kit. Remove the module needing adjustment and install the extender card in its place. Insert the Extender Card with its connector on the right side of the card (the Extender Card connector must be on the same side of the extender card as the module components). All modules can be safely "hot-plugged" (removed and re-inserted with the unit's power on) without damage, but interruptions to unit operation may occur.

Raytheon
JPS Communications

| Table 2-20 ACU-T Hardware Configuration Settings |||
|---|---|---|
| Rear Panel | Designator | Factory Setting |
| Charger On/Off | -- | Off |
| HSP-4 Module Configuration | Designator | Factory Setting |
| Internal/External Speaker Selection | JP-1 | Internal Speaker Enabled |
| CPM-2 Module Configuration | Designator | Factory Setting |
| Serial Port Baud Rate | SW1-1, 2 | 9600 |
| RS-232 Serial Remote Control Enable/Disable | SW1-3 | Enabled |
| Serial Sync Character Requirement | SW1-4 | Not required |
| Reserved for future use | SW1-5 | Off |
| Chassis Configuration | SW1-6, 7 | Single Chassis (multi-chassis systems are not possible with the ACU-T) |
| Manufacturing Test Enable/Disable | SW1-8 | Disabled |
| Store Configurations Enable/Disable | SW2-1 | Enabled |
| Reserved for future use | SW2-2,3,4,5,6,7,8 | Off |
| Reserved for future use | All of SW-3 | Off |
| DSP-1 Module Configuration | Designator | Factory Setting |
| Hi/Low Input Impedance (Low = 600 ohms) | JP1 | Low (600 Ohms) |
| Input Balanced/Unbalanced | JP2 | Balanced |
| PSTN-1 Module Configuration | Designator | Factory Setting |
| Ringer Volume | R73 | Mid-Range |
| Tel Line 1 Tip connection to Rear Panel | JP2 | Disabled |

Table 2-20 ACU-T Hardware Configuration Settings

| | | |
|---|---|---|
| Tel Line 1 Ring connection to Rear Panel | JP1 | Disabled |
| Tel Line 2 Tip connection to Rear Panel | JP4 | Disabled |
| Tel Line 2 Ring connection to Rear Panel | JP3 | Disabled |

Raytheon
JPS Communications

2.9.1 CPM-2 Switch Settings

The dipswitches on the CPM-2 module configure the chassis for proper operation in its customer-specific application. There are two eight-position dipswitches on this module. The features associated with each individual dipswitch are described in the following paragraphs. Switches that do not currently have a feature assigned are reserved for future use and should be kept OFF. The CPM-2 dipswitches are only read by the ACU-T at unit power-up, so to change unit configuration, shut main power off, pull out the CPM-2 module, change dipswitch settings as required, reinstall the module and turn main power back on. If using the CPM-2 on an extender card, it will still be necessary to turn power off/on in order to get the unit to read the switches and change configuration accordingly. In the tables below, the default settings are marked with an asterisk.

2.9.1.1 Baud Rate SW1-1 and SW1-2

These switches set the external serial port baud rate. The serial port uses 8 data bits, 1 stop bit, and no parity.

| Table 2-22 Baud Rate | | |
|---|---|---|
| SW1-1 | SW1-2 | Baud Rate |
| Off | Off | 300 Baud |
| On | Off | 1200 |
| Off | On | 2400 |
| On | On | 9600 * |

2.9.1.2 Remote Control Enable SW1-3

This switch enables remote control via RS-232 and the external serial port. The default is Enabled; setting to Disabled does not change operation in any way except incoming RS-232 commands will be ignored.

| Table 2-24 Remote Control Enable | |
|---|---|
| SW1-3 | Remote Control |
| On | Enabled * |
| Off | Disabled |

2.9.1.3 Serial Sync Character SW1-4

This switch adds the requirement that all remote control commands are preceded by the synchronizing character ^ (ascii character 0x5E). The default setting is OFF, as this is not normally required. The sync character may improve remote control operation under electrically "noisy" conditions, such as the presence of high levels of RF energy.

| Table 2-26 Serial Sync Character | |
|---|---|
| SW1-4 | Sync Character |
| On | Required |
| Off | Not Required * |

NOTE: The ACU Controller program does not use the Serial Sync Character and will not function if this switch is turned on.

JPS Communications

2.9.1.4 Reserved SW1-5, 6, 7

SW1-5 through SW1-7 are reserved for future use and should be kept in the OFF position.

2.9.1.5 Manufacturing Test SW1-8

The factory uses this switch for manufacturing test purposes only, and must be kept off.

| Table 2-28 Manufacturing Test ||
|---|---|
| SW1-8 | Manufacturing Test |
| On | Enabled |
| Off | Disabled * |

2.9.1.6 Store Configuration SW2-1

SW2-1 enables the Store Configuration feature when in the ON position. This feature is controlled by the HSP-4 keypad, but will not function unless SW2-1 is on. See Section 3.4.2.7.

| Table 2-30 Store Configuration ||
|---|---|
| SW2-1 | Store Configuration Feature |
| On | Enabled * |
| Off | Disabled |

2.9.1.7 SW2-2 Through SW2-8

SW2-2 through SW2-8 are reserved for future use and must be kept OFF to ensure proper operation.

2.9.1.8 SW3

All of the switches of SW3 are reserved for future use and must be kept OFF to ensure proper operation.

2.9.2 AP-1 Switch Settings

2.9.2.1 AP-1 General Information

The AP-1 module is a general-purpose 4-wire module that can provide a variety of DSP operations. Unlike other ACU-T modules, the AP-1 does not communicate with the system audio and control bus structures on the ACU-T backplane. The AP-1 is basically "In Series" with the audio signal that is routed through it via the associated rear panel connector. The ACU-T chassis merely provides to the AP-1s DC power and a place to reside. The DSP functions of the AP-1 can operate either on the audio and control signal coming into the ACU-T module that it is associated with (AP-1 RX Option Assembly), or on the audio and control signal that's exiting the associated ACU-T module (AP-1 TX Option Assembly). Alternatively, the AP-1's DSP features can be used to modify signals not associated at all with the ACU-T. In this case, the customer can manufacture custom cabling to suit the application.

The functions enabled on the AP-1 module are determined by the settings of dipswitches SW3 and SW-4. See Table 2-32 and . Module configuration does not require the main power be cycled off and back on; module operation changes as soon as a switch setting changes.

2.9.2.2 Bypass Mode

The front panel Bypass Switch and LED may be used to temporarily disable all DSP functions. When the switch is pressed in, the LED on, any configured function is disabled, and audio is routed straight through the module.

> NOTE: When the AP-1 is set to the Bypass Mode, the audio is still converted to a digital data stream, passed through the DSP IC and reconstructed into an analog signal. The DSP performs no functions on the throughput audio.

Raytheon
JPS Communications

2.9.2.3 AP-1 Digital Delay

2.9.2.3.1 AP-1 Digital Delay Setting SW3

The AP-1 delay function delays both the input audio and an accompanying control signal by an adjustable amount from 6 milliseconds to 1530 ms in 6 ms steps. The way the control signal is delayed varies depending on the version of AP-1 option used. The AP-1 TX Option uses this delay to deal with the timing problems inherent when interconnecting with trunked systems; delaying the offset, but not the onset of the control signal. The AP-1 RX option delays both the onset and the offset. Only the cables that connect them to the ACU-T differentiate the two versions of the AP-1 option.

Use SW3 to configure the desired delay. The overall delay of the module is the total of the individual delays set by all switches. This provides a delay setting between 6 and 1530 milliseconds at 6 ms increments.

| Table 2-32 AP-1 Digital Delay Settings, SW3 ||
|---|---|
| SW3 switch | Delay Added if Switch is Set to ON |
| SW3-1 | 6 milliseconds |
| SW3-2 | 12 milliseconds |
| SW3-3 | 24 milliseconds |
| SW3-4 | 48 milliseconds |
| SW3-5 | 96 milliseconds |
| SW3-6 | 192 milliseconds |
| SW3-7 | 384 milliseconds |
| SW3-8 | 768 milliseconds |
| Note: The total delay is the sum of the delays of the individual switches. Factory default setting is all SW3 switches off. ||

2.9.2.3.2 Digital Delay Enable AP-1 SW4-1

To enable digital delay, set dipswitch SW4- 1 to On.

2.9.2.3.3 Control Signal Delay, AP-1 RX Option

Both the onset and offset (turnoff) of the input control signal (COR) present at pin 7 of the module's CPC side panel connector are delayed by the same amount as the audio; the delayed control signal output is provided at pin 6. An inherent DSP processing delay of 2 ms is present in addition to the set digital delay.

2.9.2.3.3.1 Control Signal Delay, AP-1 TX Option

The onset of the PTT output is not delayed (relative to the corresponding COR input), however the offset of the output is delayed by the AP-1's set delay duration. This effectively extends the duration of the PTT output. When a non-trunked user is interconnected with a trunked system, he will hit his PTT switch and begin talking immediately.

An inherent DSP processing delay of 2 ms is present in addition to the set digital delay.

2.9.2.4 AP-1 Function Enable Switches, SW4

The table below lists the switches that must be turned on to enable the various DSP functions. The AP-1 module can't simultaneously perform all of the functions listed (nor does it make sense to).

- The AP-1 can always provide digital delay
- The AP-1 can also be set to be either a tone detector or a tone generator (but not both at the same time)
- The AP-1 can perform the tone detect or tone generate function at either of two frequencies (but not both)

Raytheon
JPS Communications

| Table 2-35 AP-1 DSP Function Enable, SW4 ||
|---|---|
| SW4 | DSP Function if Switch Set to On |
| SW4-1 | Digital Delay Enable |
| SW4-2 | 2175 Hz Tone Generator Enable |
| SW4-3 | 1950 Hz Tone Generator Enable |
| SW4-4 | 2175 Hz Tone Detector Enable |
| SW4-5 | 1950 Hz Tone Detector Enable |
| SW4-6 | Reserved – Keep Off |
| SW4-7 | Reserved – Keep Off |
| SW4-8 | Reserved – Keep Off |
| Note: The functions that may be simultaneously enabled are:<br>  Digital Delay and one Tone Generator Frequency<br>    OR<br>  Digital Delay and one Tone Detector Frequency<br>Factory default setting is all SW4 switches off. ||

2.9.2.5 AP-1 Control Tone Generation

The AP-1 can mix either a 1950 Hz or a 2175 Hz control tone with the throughput audio stream. When this function is enabled, the control tone is present at a level of –9dB relative to the thoughput audio whenever the digital input at pin 7 is pulled low. This feature can be used in conjunction with the digital delay function. When both are enabled, the audio signal and the control tone are both delayed by the set amount.

2.9.2.6 AP-1 Control Tone Detection

When this functionality is enabled, the AP-1 will search for a control tone of either 1950 or 2175 Hz in its input audio signal. When the tone is detected, the AP-1 digital output at pin 6 of the module's output connector, is pulled low. The tone should be set at a level of 0 to –20 dB relative to the program audio signal. The AP-1 will also enable an audio notch filter at the selected frequency, so that if a control tone is present it cannot be heard in the module's audio output. This feature can be used in conjunction with the digital delay function. When both are enabled, the audio signal and the control tone detect output are both delayed by the set amount.

Raytheon
JPS Communications

2.9.2.7 AP-1 Installation Notes

When installing the TX AP-1 Option or the RX AP-1 Option to an existing ACU-T system, plug the AP-1 module into the ACU-T chassis, preferably to the right of the module that it will work with, and connect the associated cable. The connectors at the short "Y" end of the cable are assembled to the ACU-T chassis, and the cable previously connected to the ACU-T is now connected to the remaining connector, which has the same configuration as an ACU-T side panel connector.

The AP-1 is factory set for unity gain and needs not be adjusted for applications requiring 0dBm in, 0 dBm out (as would be needed if the AP-1 is semi-transparent to the throughput audio). For other input/output levels:

If the ACU-T AP-1 RX Option is used, adjust the output from the radio or other 4-wire device into the AP-1 with the AP-1 input potentiometer. Adjust the output to the radio via the DSP-1 transmit level programming items. If the AP-1 TX Option is used, adjust the audio output from the radio or other 4-wire device into the DSP-1 module via the DSP-1 transmit level programming items. Adjust the output from the AP-1 to the external device with the AP-1 output potentiometer.

2.9.3 LP-1 Jumper Settings

| Table 2-36 Jumper Settings LP-1 | | | | |
|---|---|---|---|---|
| Input/Output | Definition | Setting | Level | Jumper |
| Line Input | 4 Wire Input | High | +3 dBm | JP4 |
| | | Norm | 0 dBm | JP4 |
| | | Low | -3 dBm | JP4 |
| Microphone In | 2 Wire Input | High | -6 | JP3 |
| | | Norm | -9 | JP3 |
| | | Low | -12 | JP3 |
| Line Out | 4 Wire Output | High | +3 dBm | JP2 |
| | | Norm | 0 dBm | JP2 |
| | | Low | -3 dBm | JP2 |
| Handset Speaker | 2 Wire Output | High | -3 dBm | JP1 |
| | | Norm | -6 dBm | JP1 |
| | | Low | -9 dBm | JP1 |
| N/A | Phone Enable | Enabled | | JP7 |
| | 4 Wire Enable | Disabled | | JP8 |
| | Loop Current | Pins 2-3 | 50 mA | JP5 |
| | | Pins 1-2 | 20 mA | |
| | Loop Voltage | Pins 2-3 | -12V | JP6 |
| | | Pins 1-2 | -48V (see note) | |

NOTE: -48V Loop Voltage is a special option. Consult JPS.

2.10 Programming Configuration Settings

The ACU-T modules are individually programmed via the Top panel keypad, or by the ACU Controller software included with the unit. This section and Section 2.11 explain the programming commands as they are entered via the keypad.

Refer to Table 2-38, which provides all Configuration Programming Items.

2.10.1 To Program a Module:

1. Enter the programming mode by pressing * 9 9 on the keypad. The ACU-T responds with the voice prompt "Setup Mode". Each time a user successfully enters one of the programming commands the ACU responds with "Ready". The ACU-T stays in programming mode until the user exits this mode by entering the * # (star pound) sequence. The user does not have to enter * # until all programming is complete. The configuration changes are not entered into non-volatile memory (permanent storage) until the * # sequence is entered. All programming configuration changes are then automatically stored in non-volatile memory. These settings are retained (including following the cycling of ACU-T main power) unless the programming mode is re-entered and new settings stored, or a "Reset to Factory Settings" command is entered.

NOTE: If the ACU-T is currently operating under serial remote control via the JPS ACU Controller, any programming via the keypad is disabled and the "Invalid Entry" voice prompt will be heard. To override console control, enter * 3 7 and wait for the "Ready" prompt. Programming via the keypad can then begin. Any configuration changes made will not be seen via the console program until it executes the "Retrieve Current Configuration" command from the "File" pulldown menu, or until it is is terminated and restarted.

Raytheon
JPS Communications

2. When in the programming mode, select the individual module you wish to program by entering * 0 1 n n, where "n n" is the two-digit extension number of the module to be programmed. The extension numbers will be from 01 through 05. For example, to set a parameter on a DSP-1 module that is installed in extension slot 05, the user first enters the "Select Module to Program" command * 0 1 0 5. Once this command is given user may then enter as many programming items as desired for the selected module. If the user mistakenly selects an extension slot that is empty or non-existent, or there is another reason why the selected module is not valid for programming, the ACU-T will respond with an error message. There are no programming items for the HSP-4 module.

> NOTE: The System Programming Items at the start of Table 2-38 are system-wide programming commands that do not require the selection of a module. To execute these items, enter the programming mode, but do not select a particular module.

3. Now that a module is selected, begin actual programming. Enter the desired programming command, following the format described in Table 2-38.

Continuing the example from step #2 above:

To set the receive level to 0 dBm on a DSP-1 module located in extension slot 05, the user first selects this module by entering * 0 1 0 5, the ACU responds with "*05 Ready*", and the user then sets the receive level to 0 dBm by entering * 0 2 3. The ACU responds with "*Ready*".

4. When all parameters for a selected module are complete, another module can be chosen for programming as in step #2 above, or the user can exit the programming mode at this time, which will store all settings. This is accomplished by entering * #. The ACU-T responds with "*Saving configuration*" followed by "*Configuration has been saved*".

> NOTE: If the programming mode is not exited by pressing * # before the power to the ACU-T is turned off, none of the new configuration settings made will be saved.

Table 2-38 ACU-T Configuration Programming Items

| System Programming Item | Command | N = Selection | Factory |
|---|---|---|---|
| Enter Programming Mode | * 9 9 | None | N/A |
| Console Override | * 3 7 | None | N/A |
| Select Module to Program | * 0 1 n n | n n = slot extension (two digits must be entered) | N/A |
| Exit Programming Mode | * # | None | N/A |
| Reset Modules to Factory Settings | * 9 9 9 9 | None | N/A |
| Enable System PIN numbers | * 2 9 n | 0 = Disable PIN numbers<br>1 = Enable PIN numbers in *Priority* operation<br>2 = Enable PIN numbers in *Exclusive* operation | Disabled |
| Program PIN numbers | * 3 0 nnnnx | nnnn is the four digit PIN, x is the security level from 0 to 9.<br>0 = not secure (PIN not required)<br>1 = least secure<br>9 = most secure | PIN Database Cleared |
| Delete PIN numbers | * 3 1 nnnn | nnnn is the four digit PIN | N/A |

| HSP-4 Programming Item | Command | N = Selection | Factory |
|---|---|---|---|
| Squelch Type | * 5 3 n | 0 = Mic<br>1 = VOX | Mic |
| DSP-1 Programming Item | Command | N = Selection | Factory |
| Receive Level | * 0 2 n | 0 = 12dBm<br>1 = 8dBm<br>2 = 4dBm<br>3 = 0dBm<br>4 = -4dBm<br>5 = -8dBm<br>6 = -12dBm<br>7 = -16dBm<br>8 = -20dBm<br>9 = -26dBm | 0dBm |
| Transmit Level | * 0 3 n | 0 = -26dBm<br>1 = -20dBm<br>2 = -16dBm<br>3 = -12dBm<br>4 = -8dBm<br>5 = -4dBm<br>6 = 0dBm<br>7 = 4dBm<br>8 = 8dBm<br>9 = 12dBm | 0dBm |
| COR Polarity | * 0 4 n | 0 = Active Low<br>1 = Active High | Active Low |
| Full/Half Duplex | * 0 8 n | 0 = Full, 1 = Half | Half |
| DTMF Mute Timer Value | * 0 9 n | 0 = Off<br>1 = 0.5 sec<br>2 = 1 sec<br>3 = 1.5 sec<br>4 = 2 sec<br>5 = 2.5 sec<br>6 = 3 sec<br>7 = 3.5 sec<br>8 = 4 sec<br>9 = 4.5 sec | Off |

| Audio Delay H/W COR Mode | * 1 0 n | 0 = 20 ms<br>1 = 60 ms<br>2 = 100 ms<br>3 = 140 ms<br>4 = 180 ms<br>5 = 220 ms<br>6 = 260 ms<br>7 = 300 ms | 20 ms |
|---|---|---|---|
| Audio Delay VOX Mode | * 1 0 n | 0 = 20 ms<br>1 = 60 ms<br>2 = 100 ms<br>3 = 140 ms<br>4 = 180 ms<br>5 = 220 ms<br>6 = 260 ms<br>7 = 300 ms | 60 ms |
| Audio Delay VMR Mode | * 1 0 n | Less than 220 msec not allowed.<br>0,1,2,3,4,5 = 220 ms<br>6 = 260 ms<br>7 = 300 ms | 220 ms |
| VMR/VOX Threshold | * 1 1 n | 0 = Low (Highest Sensitivity)<br>1 = Med1<br>2 = Med2<br>3 = High (Lowest Sensitivity)<br>4-9 = Reserved for special applications – do not use | Med1 |
| VOX Hangtime | * 1 2 n | 0 = 175 ms<br>1 = 375 ms<br>2 = 575 ms<br>3 = 775 ms<br>4 = 975 ms<br>5 = 1.175 sec<br>6 = 1.375 sec<br>7 = 1.575 sec | 775 ms |

| VMR Hangtime | *1 2 n | Less than 775 not allowed.<br>1, 2, 3 = 775 ms<br>4 = 975 ms<br>5 = 1.175 sec<br>6 = 1.375 sec<br>7 = 1.575 sec | 775 ms |
|---|---|---|---|
| COR (squelch) Type | *1 4 n | 0 = COR<br>1 = VMR<br>2 = Reserved<br>3 = VOX | VOX |
| COR Sampling On/Off | *1 8 n | 0 = Disabled<br>1 = Enabled | Disabled |
| COR Sampling Initial Delay Time | *1 9 n | 0 = 2 sec<br>1 = 4 sec<br>2 = 6 sec<br>3 = 8 sec<br>4 = 10 sec<br>5 = 12 sec<br>6 = 14 sec<br>7 = 16 sec<br>8 = 18 sec<br>9 = 20 sec | 10 sec |
| COR Sampling Interval | *2 0 n | 0 = 1 sec<br>1 = 2 sec<br>2 = 3 sec<br>3 = 4 sec<br>4 = 5 sec<br>5 = 6 sec<br>6 = 7 sec<br>7 = 8 sec<br>8 = 9 sec<br>9 = 10 sec | 5 sec |

Raytheon
JPS Communications

| COR Sampling Window Width | *2 1 n | 0 = 50 ms<br>1 = 100 ms<br>2 = 150 ms<br>3 = 200 ms<br>4 = 250 ms<br>5 = 300 ms<br>6 = 350 ms<br>7 = 400 ms<br>8 = 450 ms<br>9 = 500 ms | 150 ms |
|---|---|---|---|
| Noise Reduction Value (Peaker Value) | *2 2 n | 0 = Off<br>1 = Minimum<br>9 = Maximum | Off |
| Audio Muted when Squelched | *2 3 n | 0 = Muted<br>1 = Not Muted | Muted |
| Transmit Keying Tones | *2 5 n | 0 = None<br>1 = 1950 Hz Continuous<br>2 = EIA Sequence (F1 function tone, 1950 Hz) | None |
| COR Inhibit Time after PTT | *2 6 n | 0 = None<br>1 = 100 ms<br>2 = 200 ms<br>3 = 400 ms<br>4 = 800 ms<br>5 = 1 sec<br>6 = 2 sec<br>7 = 3 sec<br>8 = 4 sec<br>9 = 5 sec | 100 ms |
| PTT or COR Priority (Half Duplex only) | *2 7 n | 0 = COR Priority<br>1 = PTT Priority | PTT Priority |
| Keying Tone Amplitude Does not apply to EIA Keying | *2 8 n | 0 = -6 dB, 1 = -9 dB,<br>2 = -12 dB,<br>3 = -15 dB | -9 dB |

| Module security level | * 3 2 n | 0 = Not Secure<br>1 = Least Secure<br>9 = Most Secure | Not Secure |
|---|---|---|---|
| DTMF Enable | * 3 8 n | 0 = Disabled<br>1 = Enabled | Enabled |
| High Frequency Equalizer | * 3 9 n | 0 = Reserved<br>1 = 5 dB cut<br>2 = 3.5 dB cut<br>3 = 2 dB cut<br>4 = Flat<br>5 = 2 dB boost<br>6 = 3.5 dB boost<br>7 = 5 dB boost<br>8 and 9 = Reserved | Flat |
| DTMF Pre-emphasis (HSP-4 keypad only) | * 4 0 n | 0 = DTMF Pre-emphasized<br>1 = DTMF Not Pre-emphasized | Pre-emphasis |
| DTMF Enable | * 3 8 n | 0 = Disabled<br>1 = Enabled | Enabled |
| High Frequency Equalizer | * 3 9 n | 0 = Reserved<br>1 = 5 dB cut<br>2 = 3.5 dB cut<br>3 = 2 dB cut<br>4 = Flat<br>5 = 2 dB boost<br>6 = 3.5 dB boost<br>7 = 5 dB boost<br>8 and 9 = Reserved | Flat |
| DTMF Pre-emphasis (HSP-4 keypad only) | * 4 0 n | 0 = DTMF Pre-emphasized<br>1 = DTMF Not Pre-emphasized | Pre-emphasis |
| Auxiliary Output Control | * 4 1 n | 0 = Future option<br>1 = Local control by the module | Local Control |

Raytheon
JPS Communications

| TX Audio Delay (was "Radio Type Selection") | * 4 3 n | 0 = No Delay<br>1 = 200 ms<br>2 = 400 ms<br>3 = 600 ms<br>4 = 800 ms<br>5 through 9 reserved for future use | No Delay |
|---|---|---|---|
| Voice Prompt Initiation Delay | * 4 4 n | 0 = No Delay<br>1 = 50 ms<br>2 = 100 ms<br>3 = 500 ms<br>4 = 750 ms<br>5 = 1 sec<br>6 = 2 sec<br>7 = 3 sec<br>8 = 4 sec<br>9 = 5 sec | 100 ms |

| PSTN-1 Programming Item | Command | n = Selection | Factory |
|---|---|---|---|
| Telephone Line Levels | * 0 2 n | 0 = 0dBm<br>1 = -3dBm<br>2 = -6dBm<br>3 = -9dBm<br>4 = -12dBm<br>5 = -15dBm<br>6 = -18dBm<br>7 = -21dBm<br>8 = -24dBm | -9dBm |
| Telephone RX Level Boost | * 0 3 n | 0 = 0 dB<br>1 = 2.5 dB<br>2 = 4.5 dB<br>3 = 6 dB<br>4 = 7.4 dB<br>5 = 8.5 dB<br>6 = 9.5 dB<br>7 = 10.5 dB<br>8 = 11.3 dB<br>9 = 12 dB | 6 dB |
| PSTN Type | * 0 5 n | 0 = Normal<br>1 = Satcom | Normal |
| PSTN Dialing Mode | * 0 6 n | 0 = DTMF<br>1 = Pulse | DTMF |
| DTMF Mute Timer | * 0 9 n | 0 = Off<br>1 = 0.5 sec<br>2 = 1 sec<br>3 = 1.5 sec<br>4 = 2 sec<br>5 = 2.5 sec<br>6 = 3 sec<br>7 = 3.5 sec<br>8 = 4 sec<br>9 = 4.5 sec | 1 sec |

| Audio delay Time | * 1 0 n | 0 = 10 ms<br>1 = 22 ms<br>2 = 35 ms<br>3 = 47 ms<br>4 = 60 ms<br>5 = 72 ms<br>6 = 85 ms<br>7 = 97 ms | 35 ms |
|---|---|---|---|
| VOX Threshold | * 1 1 n | 0 = VOX Off<br>1 & 2 = Low<br>3 = High<br>9 = VOX Off | Low |
| VOX Hangtime | * 1 2 n | 0 = 500 ms<br>1 = 1 sec<br>2 = 1.5 sec<br>3 = 2.0 sec | 1 sec |
| Four Wire/Two Wire Operation | * 2 4 n | 0 = 2-Wire<br>1 = 4-Wire w/hybrid<br>2 = 4-Wire; no hybrid<br>3 = STU-III w/hybrid<br>4 = STU-III; no hybrid | 2-Wire |
| Module security level | * 3 2 n | 0 = Not Secure<br>1 = Least Secure<br>9 = Most Secure | Not Secure |
| Outgoing Ring Time | * 3 7 n | 0 = No ring<br>1 = 30 sec<br>2 = 60 sec<br>3 = Continuous | 30 seconds |
| DTMF Enable | * 3 8 n | 0 = Disabled<br>1 = Enabled | Enabled |
| Auxiliary Output Control | * 4 1 n | 0 = Future option<br>1 = Local control by the module | Local Control |
| Inactivity Disconnect Timer | * 4 2 n | 0 = None<br>1 = 30 sec<br>2 = 1 min<br>3 = 2 min<br>4 = 5 min<br>5 = 10 min<br>6, 7, 8 & 9 = Reserved | 2 Minutes |

| Voice Prompt Initiation Delay | * 4 4 n | 0 = No Delay<br>1 = 50 ms<br>2 = 100 ms<br>3 = 500 ms<br>4 = 750 ms<br>5 = 1 sec<br>6 = 2 sec<br>7 = 3 sec<br>8 = 4 sec<br>9 = 5 sec | No Delay |
|---|---|---|---|
| LP-1 Programming Item | Command | n = Selection | Factory |
| DTMF Mute Timer | * 0 9 n | 0 = Off<br>1 = 0.5 sec<br>2 = 1 sec<br>3 = 1.5 sec<br>4 = 2 sec<br>5 = 2.5 sec<br>6 = 3 sec<br>7 = 3.5 sec<br>8 = 4 sec<br>9 = 5 sec | 1 second |
| Audio Delay Time | * 1 0 n | 0 = 10 ms<br>1 = 35 ms<br>2 = 60 ms<br>3 = 85 ms<br>4 = 110 ms<br>5 = 135 ms<br>6 = 160 ms<br>7 = 185 ms | 60 ms |
| VOX Threshold | * 1 1 n | 0 = VOX Off<br>1 = Low<br>2 = Med<br>3 = High<br>9 = Off | Med |
| VOX Hangtime | * 1 2 n | 0 = 10 ms<br>1 = 750 ms<br>2 = 1.5 sec<br>3 = 2.25 sec | 750 ms |

Raytheon

JPS Communications

| Module security level | * 3 2 n | 0 = Not Secure<br>1 = Least Secure<br>9 = Most Secure | Not Secure |
|---|---|---|---|
| Dial and Busy Tone Style | * 3 3 n | 0 = USA Style<br>1 – 9 = Reserved | USA |
| Ring Cadence | * 3 4 n | 0 = USA Style<br>1 = European Style<br>2 – 9 = Reserved | USA |
| Dial Tone Enable | * 3 5 n | 0 = Dial Tone Disabled<br>1 = Dial Tone Enabled | Enabled |
| Ringback Enable | * 3 6 n | 0 = Ringback Disabled<br>1 = Ringback Enabled | Enabled |
| Outgoing Ring Time | * 3 7 n | 0 = No ring<br>1 = 30 sec<br>2 = 60 sec<br>3 = Continuous | 30 seconds |
| DTMF Enable | * 3 8 n | 0 = DTMF Disabled<br>1 = DTMF Enabled | Enabled |
| Auxiliary Output Control | * 4 1 n | 0 = Future option<br>1 = Local control by the module | Local Control |
| Voice Prompt Initiation Delay | * 4 4 n | 0 = No Delay<br>1 = 50 ms<br>2 = 100 ms<br>3 = 500 ms<br>4 = 750 ms<br>5 = 1 sec<br>6 = 2 sec<br>7 = 3 sec<br>8 = 4 sec<br>9 = 5 sec | No Delay |

2.11 Programming Configuration Settings

2.11.1 System Programming and Operating Items

See Section 2.10 for a basic overview explaining how to enter the following programming items via the ACU-T keypad. All of the commands are listed in Table 2-38 and described in detail below. The modules can be programmed using an IBM PC-compatible computer running Windows 95, 98, or NT, and the ACU Controller Software. Complex systems with a variety of different radios will be much easier to set up and maintain with the controller software.

2.11.1.1 Enter Programming Mode

Use the command * 9 9 to enter the programming mode. Once in this mode, the programming of each individual module's configuration items is possible. Unless otherwise specified, the programming items listed in Table 2-38 or this section can only be entered when the ACU-T is in the Programming Mode.

2.11.1.2 Console Override

If the ACU-T is currently under serial remote control using the ACU Controller software, programming via the keypad is disabled. To override the console software and re-enable programming via the keypad, enter * 3 7 at the keypad. Configuration changes made during console override will not be available at the console screen until the "Retrieve Current Configuration" option is selected from the "File" pulldown menu.

2.11.1.3 Select a Module to Program

After entering the programming mode, use the command * 0 1 n n to select the slot number of the module you wish to program, where nn is the two-digit slot number. For example, to program the module in slot 5, enter * 0 1 0 5. After all programming commands are complete for one module, the programming of another module may begin, using this command to select that module. It is not necessary to exit and re-enter the programming mode each time a new module is programmed.

2.11.1.4 Exit Programming Mode

When programming is complete, use the command * # to exit the programming mode and store the configuration in non-volatile memory.

2.11.1.5 Reset Modules to Factory Settings

The command * 9 9 9 9 causes all modules in the ACU-T chassis to be reset to the factory settings. Be careful, as using this command will erase all custom configuration programming. This command can only be issued from programming mode.

2.11.1.6 PIN Numbers

This command configures PIN operation for the ACU-T. PIN numbers *(Personal Identification Numbers)* are used to control access to the ACU-T network; see Section 3.6 for full details. Enable PIN numbers in the Priority Mode by entering * 2 9 1, or in the Exclusive Mode by entering * 2 9 2. To Disable PIN numbers enter * 2 9 0. When either PIN mode is enabled, users attempting to access the system will be prompted by the ACU-T to enter their PIN. When in the *Priority PIN Mode*, the user's password security level must be equal to or higher than the security level of the module to gain access. *Exclusive PIN Mode* operation requires the user's password security level to be identical to the security level of the extension the user is attempting to access. Extension security levels are set for all types of interface modules using the * 3 2 n programming item. Instructions are included with each module's list of programming items.

Raytheon
JPS Communications

2.11.1.7 Program PIN Numbers

The security level of each PIN is entered into the ACU-T database by this command. Up to 20 different PIN numbers may be entered. To enter a PIN into the database and/or set the level for the PIN, enter * 3 0 n n n n x, where n n n n is the four digit PIN and x is the security level to be associated with this PIN. There are 9 available security levels, ranging from 1 = least secure to 9 = most secure. The security level "0" is essentially meaningless, as a security feature, since an extension set to security level 0 does not require a PIN to gain access. PIN programming is a global command, meaning it's not necessary to select a module to program when entering PIN numbers or setting PIN security levels.

2.11.1.8 Delete PIN Numbers

To delete a particular PIN, enter * 3 1 n n n n, where n n n n is the four digit PIN. This is a global command. Note that it is not necessary to input the security level when deleting a PIN.

2.11.1.9 Module Security Level Selection

This command sets a module's security level. Enter * 3 2 n, where n is the security level, with 0 = not secure (no PIN required), 1 = least secure, up to 9 = most secure. This is not a global command. Each module's security level must be individually set. To set the security level for a particular module, first use the "Select Module to Program" command.

2.11.2 HSP-4 Programming Items

2.11.2.1 HSP-4 Squelch Type

There is only one programming item for the HSP-4 module. The * 5 3 n command sets the Squelch Type for the module. Unlike all other operating commands, the HSP-4 Squelch Type can only be set by the ACU-T keypad; it cannot be sent by the ACU Controller.

There are two squelch types: 0 = mic only (the handset mic switch must be depressed for the handset audio input to be enabled and transferred to the rest of the ACU-T system), 1 = mic or VOX (either the PTT switch or the detection of handset audio will enable the input).

The HSP-4 should be kept in the mic only mode unless a radio or other four-wire device is connected to J0 on the ACU-T side panel.

JPS Communications

2.11.3 DSP-1 Programming Items

2.11.3.1 Receive Level (DSP-1)

The command * 0 2 n programs the audio receive level for a selected DSP-1. A correct receive level setting is required to ensure proper operation. Too high a level may cause flat-topping and distortion, while too low a level won't provide adequate audio volume. The front panel SIGNAL LED is provided as a guide to setting the level; raise the receive volume until the SIGNAL LED flashes momentarily on voice peaks. If the LED never lights, the level is too low; if the LED is on almost continuously, the level is set too high. The following procedure is suggested:

Connect the normal audio source to the module, and place the module in the program mode.

- Enter the command * 0 2 0 to set the module at its least-sensitive setting. If the SIGNAL LED is flashing on voice peaks, this setting is correct. If the LED is now on continuously, the incoming audio level is higher than can be accommodated by the DSP-1 module, and must be attenuated before reaching the module. If the SIGNAL LED is not flashing at the * 0 2 0 setting, the module's gain must be increased; proceed to the next step.

- Raise the module' receive gain one step at a time until the SIGNAL LED is flashing on voice peaks. For example, program * 0 2 1, then * 0 2 2, etc., until the LED is flashing during voice peaks but is not lit continuously.

- Among the DSP-1 module's algorithms is a Peak Limiter to prevent clipping of loud audio peaks. This limiter has a fast attack time and slow recovery rate.

Raytheon
JPS Communications

2.11.3.2 Transmit Level (DSP-1)

The command * 0 3 n allows a module's transmit (or output) audio level to be programmed. The transmit level must be set correctly to insure proper operation of radios or other equipment connected to this output. Too high a level may cause flat-topping, distortion, or over-modulation of a connected radio, while too low a level won't provide adequate audio volume or modulation level. If the actual audio level requirement of the radio or other connected equipment is known, select this level from the Transmit Level row of Table 2-38. These levels assume a 600 Ohm termination. If the required level is not known, the following procedure is suggested:

- An input audio source for the module is required (so this audio can be sent back out through the transmit audio port). Use the Connect command to create a connection between the module to be programmed with the second module (which is providing audio), and then place the first module into the programming mode.

- Determine the proper input level to the connected equipment (output level from the module). It may be necessary to monitor the module's output audio level at the connected equipment's input port with an audio voltmeter or other means.

- Enter the command * 0 3 0 to set the output to its lowest level.

- Raise the output level one step at a time until the proper level is reached. For example, enter * 0 3 1, then * 0 3 2, etc., until the proper level is reached.

2.11.3.3 COR Polarity (DSP-1)

The command * 0 4 n allows the module's hardwired COR input to work with either an active low or an active high COR input. If the radio's COR output goes low when a signal is being received, set the input to active low (* 0 4 0); if the radio's COR output goes high when a signal is being received, set the input to active high (* 0 4 1). This configuration parameter does not need to be programmed unless the hardwire COR input will be used.

JPS Communications

2.11.3.4 Full/Half Duplex (DSP-1)

The command * 0 8 n configures the module for either full duplex or half duplex operation. Set to full duplex if the connected radios or equipment can transmit and receive at the same time. Set to half duplex otherwise. Enter * 0 8 0 for full duplex; * 0 8 1 for half duplex.

2.11.3.5 DTMF Mute Timer (DSP-1)

When a module is not in the Data Mode (See Section 3.4.2.9), all DTMF signals detected in the receive audio are interpreted as commands meant for the receiving module. When the DTMF Mute Timer is enabled, the DTMF signals are "Muted"; that is, they are not passed on to the ACU-T internal audio bus to be routed to another module, nor are they sent back out in any module's TX audio. A module cannot instantaneously mute a DTMF signal; some time is required to detect its presence. Therefore, when a DTMF signal first becomes present in the receive audio, a short burst is passed through. The DTMF mute timer ensures that, if a long string of DTMF characters are present in the receive input, a short burst of only the first DTMF character is passed through. This is accomplished by muting the audio as soon as the first character is detected, and then keeping the audio muted until the first character is complete, and until enough of the next character has been received so it is detected. Each time a new DTMF character is detected, the timer is reset. When the timer expires (because no new DTMF character is detected in the receive input), the audio is no longer muted.

The factory default is DTMF Mute Timer Disabled, as the majority of ACU-T systems do not employ DTMF control. This setting allows the DTMF signals to be passed through the system like all other audio. It also prevents inevitable occasional "falsing" on voice signals that are similar to a DTMF character; this falsing would momentarily mute throughput audio.

If DTMF control is used, it may be desirable to mute the DTMF characters as they may be annoying to other system users, and a timer setting of 1 second works well in most cases. If the setting is too low (because some system users transmit DTMF characters slowly), a short burst of DTMF will be passed through at the start of each DTMF character. The timer should be set to a value that is longer than the maximum time elapsed between the end of one DTMF character and the start of the next.

There are some circumstances when it's important that incoming DTMF not be interpreted by the ACU-T as control input, but instead must be passed to other equipment. The settings used are different depending on whether the module that's passing on the DTMF is a PSTN-1 module (which regenerates DTMF) or any other type of module (which do not).

2.11.3.5.1 Transmitting DTMF via a PSTN Module

If the system will be used, for example, to allow a radio user to control a telephone answering machine via DTMF, the following will occur:

A radio with a DTMF keypad will transmit to a radio wired to a DSP-1 module. This DSP-1 will be cross-connected to a PSTN-1 module that is hooked to a phone line. If the radio user creates the cross-connection using the DTMF keypad, the DSP-1 module must be in the Command Mode when he does so. He must then use the keypad to put the DSP-1 module into the Data Mode. When in the Command mode, DTMF coming into the DSP-1 module is interpreted as system command input. When in the Data Mode, the incoming DTMF is interpreted as control characters intended for other equipment and is not interpreted as control commands (other than the DTMF sequence that signals the module to return to the command mode). See Section 3.4.2.9 for more information about the Command and Data Modes.

While in the Data Mode, the DTMF from the radio is detected by the DSP-1 module and relayed via the CPM-2 module to the cross-connected PSTN-1 module as serial data. The PSTN-1 regenerates and transmits the DTMF characters into the phone line. This Data Mode regeneration cleans up the DTMF, so any noise or frequency-response related distortion of the DTMF characters (caused by radio transmission of the DTMF) is not passed on to the phone line.

When the system is used in this way, the DSP-1 module should have its DTMF Mute Timer turned on, so that only the regenerated DTMF will be sent via the phone line.

2.11.3.5.2 Transmitting DTMF via a Module other than the PSTN-1

If it is desired that DTMF characters (being sent out by a module other than a PSTN-1) be passed through the system, the DTMF mute timer must be turned off. This is required because only the PSTN-1 regenerates DTMF; the others will just pass it through like any other program audio. The DTMF mute timer must be set to Off on the module that receives the DTMF or it cannot be passed on to the cross-connected module or modules.

Raytheon
JPS Communications

Please note that it is possible, but not advisable, to retransmit DTMF, bringing DTMF into the ACU-T on one radio via a DSP-1 module and then retransmitting the DTMF on a second radio via a cross-connected DSP-1 module. The normal FM noise that will accompany the DTMF, along with frequency response related distortion (caused by pre-emphasis & de-emphasis in the radio audio circuits) might have an adverse affect on DTMF signal quality and detection.

The programming command * 0 9 n sets the DTMF Mute Timer, with timer settings of 0 = Off, 1 = 0.5 sec, 2 = 1 sec, 3 = 1.5 sec, 4 = 2 sec, 5 = 2.5 sec, 6 = 3 sec, 7 = 3.5 sec, 8 = 4 sec, and 9 = 4.5 sec. Since the majority of systems do not use DTMF signaling, the factory default sets n at 0, with the DTMF Mute timer turned off.

2.11.3.6 COR Type, VOX/VMR Threshold, Hangtime, and Audio Delay (DSP-1)

The DSP-1 modules must have positive knowledge that an input audio signal is present so they know when to key an associated transmitter. A signal that provides this information is called COR (for Carrier Operated Relay, sometimes referred to as COS Carrier Operated Squelch). The DSP-1 module can use an external hardwire COR line, an internal VMR (Voice Modulation Recognition) algorithm, or a VOX Squelch. In a full duplex connection, it may be desirable to ignore COR activity altogether and never mute the incoming audio. The correct selections depend on the type of radio or other equipment that is connected to the DSP-1 receive audio input.

- FM Radios - For best reliability, use a hardwire COR signal, if one is available from the radio's own squelch circuit. If no hardwire COR signal is available, and the radio has a squelch circuit, use the radio's squelch in conjunction with VOX mode. VMR should be used for FM radios that must be operated with an open squelch (receiver noise is present when there is no signal). The VOX cannot be used in this condition because it will open on receiver noise, but the VMR opens only on speech, not on receiver noise. When used in this mode, the VMR threshold must be set to Med2 or High to avoid falsing on white noise from the FM discriminator.

- AM Aircraft Radios - Again, the best choice is a hardwire COR line from the radio, if one is available. If this isn't an option, VMR should be used. VMR thresholds of Low or Med1 may be most appropriate for this application.

- HF SSB Radios - The only reliable choice for HF radios is VMR. VMR thresholds of Low or Med1 may be most appropriate for this application.

- Non-Radio Applications - The choice for these applications is hardwire COR, if this signal is available. If not, use VOX if the audio is relatively noise-free; use VMR for noisy signals.

The command * 1 4 n sets the COR type to be used in the DSP-1: * 1 4 0 selects hardwire COR, * 1 4 1 selects VMR, * 1 4 2 is reserved for future applications, and * 1 4 3 selects VOX squelch. Whenever VMR or VOX are selected, the DSP-1 will switch to default audio delay and hangtime settings that work well for each of these COR types. These default settings are recommended, but not mandatory except as explained below. When VMR or VOX is selected, the defaults are set. The user may then make a change in these settings if any are necessary.

The Audio Muted When Squelched configuration item may be turned off so the module ignores COR and does not mute incoming audio when COR is active. This may be desirable for full-duplex setups. Enter * 2 3 n to modify this parameter. * 2 3 0 is the default setting and mutes the audio when COR is active. * 2 3 1 disables muting. Disable muting when using the HSP-4 to monitor a module or group of modules.

To set up the DSP-1 for best operation with each of the COR choices:

- Hardwire COR - The only parameter that needs to be set is the COR polarity. If the radio's COR output goes low when a signal is being received, set the input to active low; if the radio's COR output goes high when a signal is being received, set the input to active high.

- VOX - The VOX algorithm will signal COR present whenever the incoming audio exceeds a set threshold. The signal can be tones, voice or noise. The VOX algorithm is looking for any audio signal above the set threshold. Three parameters determine how the VOX algorithm functions: threshold, hangtime, and delay (see definitions below). VOX and VMR use the same programming commands to set hangtime and threshold. Note: When VOX is selected, the DSP-1 will default to an audio delay setting of 60 ms and a hangtime setting of 775 ms. Other times may then be set.

Raytheon
JPS Communications

- VMR - The VMR algorithm is designed to detect speech in a wide range of input audio SNR's. Three parameters determine the performance of the VMR algorithm: threshold, hangtime, and delay. Note: VMR and VOX use the same programming commands to set hangtime and threshold. About default settings: when VMR is selected, the DSP-1 will default to an audio delay setting of 220 ms and a hangtime setting of 775 ms. It's possible to rest these parameters to different values, but audio delay cannot be set below 220 ms, and hangtime cannot be set below 775 ms. These minimum settings are required to ensure proper VMR operation.

*Threshold:* The VOX threshold is signal amplitude related: the higher the threshold, the louder the input must be to trip the VOX and open the squelch. However, the VMR threshold is not amplitude related; instead, it specifies how stringent the VMR algorithm is when deciding whether a signal contains speech or noise. Because of the statistical nature of speech and noise, the VMR algorithm is not perfect and a performance tradeoff occurs at different threshold settings: at Low threshold, the unit is least likely to fail to detect speech, but most likely to false on noise. When the Threshold is set to the High setting, the unit is least likely to false on noise, but will fail to detect some speech. The correct setting will depend on aspects of the incoming signal and the requirements of the system. A lower threshold should be used if the input noise is not excessive, such as from an AM or HF SSB radio. A higher threshold is necessary for use with an open-squelch FM radio, where full noise is present when no signal is present. The standard factory setting of Med2 should be suitable for most situations and signal types.

The programming command * 1 1 n varies the threshold for both VOX and VMR, the setting options for n are 0 = Low threshold (highest sensitivity), 1 = Med1, 2 = Med2, and 3 = High (lowest sensitivity). A setting of 9 disables VOX/VMR entirely, so no level of input audio will cause the VOX or VMR to be tripped. This setting is useful only for system testing.

*Hangtime:* Hangtime keeps the audio path enabled for an adjustable duration after the moment when speech is no longer detected, preventing the audio from being muted between syllables or during pauses in speech.

The programming command * 1 2 n sets the hangtime for both VOX and VMR:

The hangtime duration options are: 0 = 175 ms, 1 = 375 ms, 2 = 575 ms, 3 = 775 ms, 4 = 975 ms, 5 = 1.175 sec, 6 = 1.375 ms, 7 = 1.575 ms. In VMR mode, the 0, 1, 2, and 3 selections all set hangtime to 775 ms.

*Delay:* The DSP-1 can add an adjustable delay to the module's input audio, output audio, or both.

2.11.3.6.1 Receive (Input) Audio Delay

When speech first appears at the audio input, some time passes before it can be detected. The adjustable audio delay prevents the loss of the audio that is received before the detection takes place and audio gates can be opened to send this audio on to other modules. The amount of delay needed depends on the type of COR in use, as the different COR methods require different processing times. When hardwire COR is used, the default delay is 20 ms, because an external COR signal normally arrives before its associated audio, so only minimum delay is needed. The VMR has a minimum speech detection time of about 100 ms, so its default delay is 220 ms, which allows time for speech to be reliably detected under most conditions. The VOX detection time is normally just a few tens of milliseconds, so its default delay time is 60 ms. The delays should be kept at the default values unless some system requirement dictates a change, such as the use of slow-to-key radios.

The Input Audio Delay programming command is * 1 0 n, with a delay range for the variable n from 0 = 20 ms, 1 = 60 ms, 2 = 100 ms, 3 = 140 ms, 4 = 180 ms, 5 = 220 ms, 6 = 260 ms, and 7 = 300 ms.

Raytheon
JPS Communications

> NOTE: Be advised of the following important characteristics of the RX audio delay.

- There can never be a true "zero delay" for receive audio passing through the DSP-1 module; an inherent processing delay is always present.

- The RX audio delay does not delay the handling of the COR signal. This means that if two radios are cross-connected through a pair of DSP modules, an active COR at one module will immediately key the other module. The incoming RX audio will then be delayed from being retransmitted at the connected module by the set RX audio delay time. The duration of the COR signal (and corresponding PTT signal) will be extended by the set RX audio delay time.

- Keep the delay set as low as possible for clarity of conversation. If the first syllable or part of the first syllable is lost after a message is passed through the unit, most likely the audio delay should be increased.

- Due to the longer processing time required for VMR mode, settings of 0 through 5 all set the delay to 220 ms. The longer input audio delays of 260 and 300 ms can be set with inputs of 6 or 7, respectively.

Raytheon
JPS Communications

2.11.3.6.2 Transmit (Output) Audio Delay

The DSP-1 can also add delay to the audio output of the module. Transmit Audio Delay is mainly used when the four-wire device associated with the DSP-1 is a trunked radio. When a user makes a trunked system transmission, there is a delay between when the radio's PTT is activated and when a channel is assigned so that communication may begin. Most trunking systems signal this ready status by a confirmation tone. There is no means to transfer this tone to ACU-T system users who are cross-connected to the trunked system. Instead, the DSP-1 Output Audio Delay should be set to a duration that holds the TX audio until the channel has been selected so that the first syllable is not clipped.

Use the Radio Type programming command to set the TX Audio Delay. Enter * 4 3 n, where n is the TX audio delay setting; the factory default is n = 0 (no audio delay), 1 = 200 ms delay, 2 = 400 msec delay, 3 = 600 ms delay, and 4 = 800 ms delay.

Note that when two radios are cross-connected by a pair of DSP-1 modules, the RX (input) audio delay of the receiving module is added to the TX (output) audio delay of the transmitting module (assumed to be a trunked radio). This occurs because, while the RX audio is delayed by the set amount, the COR input takes effect immediately (see above). This undelayed COR will immediately send an active PTT (via the cross-connected DSP-1 module), to the trunked radio. The audio from the receiving module is then sent to the trunked radio delayed by the sum of the receiving module's RX audio delay and the transmitting (trunked) module's TX Audio Delay. This provides a maximum total delay of 1100 milliseconds. If additional TX Audio Delay is required, the AP-1 TX Option may be used. This will add up to 1530 milliseconds additional TX Audio Delay.

NOTE: TX Audio Delay is available only for DSP-1 modules with revision 2.08 or higher firmware installed. To verify the revision on a DSP-1 module, remove the module and examine the label on the EPROM. The label reads "DSP-1 1096-201XXX" where XXX is the revision number. TX audio delay is available for 1096-201208 or higher. Upgrades are available from JPS.

Raytheon
JPS Communications

2.11.3.7 Radio Type Selection (DSP-1)

See TX Audio Delay description in the final paragraphs of the previous section (Section 2.11.3.6). The settings initially referred to as "Radio Type Selection" are now used to set the TX Audio Delay.

2.11.3.8 COR Sampling (DSP-1)

When a radio connected to the DSP-1 is operating in half duplex mode, it cannot receive while it is transmitting. This means as long as the radio is in the TX mode, the remote radio user who's communicating to the ACU-T system through this radio will be locked out and unable to send any commands to the system. To make sure this condition does not last for extended periods, the module will drop PTT momentarily to allow it to check for an active COR input, which would indicate the remote user is trying to communicate with the system. If COR is detected during this "sampling" window, the module will hold the local radio unkeyed for at least five seconds so the remote user has time to enter a DTMF command. There are three variable parameters associated with COR sampling: initial delay time, sampling interval, and sampling window width. In general, it is desirable to keep the sampling interval as long as is feasible and the window width as short as is feasible because each time a sample is taken, a "hole" is put in the transmit audio, and syllables or words can be missed. The factory default setting for COR Sampling is Off (disabled), so no COR sampling will occur unless it's enabled.

- *Initial Delay Time-* This programming item sets how long after the start of the user-initiated PTT that the first sample window occurs. If the PTT goes inactive before the initial delay time expires, the initial delay time is reset, and starts running again at the onset of PTT. Note this time is set separately from the sampling interval, allowing it to be set longer than the sampling interval. The factory default for the initial delay is 10 seconds.

Raytheon
JPS Communications

- *Sampling Interval-* The first COR sample takes place when the initial delay expires. The module momentarily ignores the system input holding it in the transmit mode, drops PTT and samples for an incoming COR. If COR is not detected, and the system PTT input remains active, the module re-asserts PTT and maintains it for a time less than or equal to the sampling interval. While PTT is continuously active, samples will continue to be taken at this interval. The factory default setting is 5 seconds. A shorter interval will allow quicker take-over of the system by the radio user, but will disrupt transmit audio more often.

- *Sampling Window Width-* This sets how long the local radio stays unkeyed while looking for COR from the local radio. The correct value depends on how fast the local radio can switch from transmit to receive and how fast COR can be detected. For Hardwire COR this depends on how fast the local radio's squelch circuit can respond to a received signal. For DSP-1 modules using VOX or VMR based COR, it depends on how long it takes the module to detect a valid signal in receive audio inputs, plus the time the radio requires to switch into the RX mode. Keep the sampling window width as short as possible, because a gap is put into the transmit audio during this time; but not too short or COR sampling will be ineffective because the system does not have sufficient time to respond. The factory set value of 150 ms is about the minimum practical value for most radios, while some radios require a window of 250 ms or more.

2.11.3.8.1.1 COR Sampling Programming Options:

2.11.3.8.1.2 COR Sampling On/Off

* 1 8 n

* 1 8 0 = disabled (default), * 1 8 1=enabled

2.11.3.8.1.3 Initial Delay Time

* 1 9 n

Set n 0 for 2 seconds, 1 = 4 sec, 2 = 6 sec, 3 = 8 sec, 4 = 10 sec (default), 5 = 12 sec, 6 = 14 sec, 7 = 16 sec, 8 = 18 sec, and 9 = 20 seconds.

Raytheon
JPS Communications

2.11.3.8.1.4 Sampling Interval

*2 0 n

Set n = 0 for 1 second, 1 = 2 sec, 2 = 3 sec, 3 = 4 sec, 4 = 5 sec (default), 5 = 6 sec, 6 = 7 sec, 7 = 8 sec, 8 = 9 sec, and 9 = 10 seconds.

2.11.3.8.1.5 Sampling Window Width

*2 1 n

Set n = 0 for 50 ms, 1 = 100 ms, 2 = 150 ms (default), 3 = 200 ms, 4 = 250 ms, 5 = 300 ms, 6 = 350 ms, 7 = 400 ms, 8 = 450 ms, and 9 = 500 ms.

2.11.3.9 Noise Reduction Value (DSP-1)

The DSP-1 uses time domain mode noise reduction, designed to peak up any correlated information (such as speech), in the audio passband. It reduces noise by forming dynamic bandpass filters around correlated information, thus automatically reducing the bandwidth to the minimum necessary to pass the information. This type of noise reduction is most effective on purely random noise, such as white or pink noise, and less effective on impulse noises. The noise reduction value allows the amount of noise reduction to be set in ten steps from off to maximum. Increasing the level provides more actual noise reduction, but may give a "surging" quality to the recovered audio depending on its frequency content. Reducing the level lowers the noise reduction but may provide the best sounding audio in some cases. The best setting in a particular application depends on the noise level and represents a balance between noise reduction amount and ultimate audio quality.

Set the noise reduction value with the programming command * 2 2 n, with a range for the variable "n" from 0 = Off, 1 = Minimum to 9 = Maximum. The factory default is Off.

Raytheon
JPS Communications

2.11.3.10 Audio Muted when Squelched (DSP-1)

This selection determines whether the module's audio output to the ACU-T internal bus (and, therefore, to other modules in the system) is muted when the module is not detecting COR. The default setting mutes the audio when squelched, but sometimes other system requirements (such as the need for full-time monitoring of an input signal) may dictate the audio be not muted.

Configure the Audio Muted When Squelched function with the programming command *2 3 n, with * 2 3 0 = Muted, * 2 3 1 = Not Muted. Default setting is muted.

2.11.3.11 Transmit Keying Tones (DSP-1)

The DSP-1 can mix keying tones with its transmit audio output. This allows the DSP-1 to signal a connected transmitter to key using only the audio output lines, eliminating the need for an extra wire to carry the PTT output.

Use the programming command * 0 2 5 n to set the keying tone type. 0 = No keying tones, 1 = 1950 Hz continuous tone, 2 = EIA Keying Sequence (see below). Factory default is No Keying Tones.

The command * 0 2 8 n sets the amplitude of the 1950 Hz continuous keying tone relative to the transmit audio output. The available selections are: 0 = -6 dB, 1 = -9 dB, 2 = -12dB, and 3 = -15dB. The default setting is –9 dB.

The DSP-1 can produce the EIA tone keying sequence using function tone F1. The EIA tone keying sequence has three tones, produced in succession:

- High-level Alert Tone, 2175 Hz tone for 125 ms @ +10dB (also called "High Guard Tone"). TX program audio is muted during this time.

- F1 Function Tone, 1950 Hz for 40 ms @ 0dB. Program audio is muted during this time.

- Hold Tone, 2175 Hz @ -20dB, mixed with the TX program audio as long as PTT is enabled (also called the "Low Guard Tone").

Raytheon
JPS Communications

---

The levels of the EIA keying tones are expressed relative to the normal TX program audio. When the DSP-1 is set for default TX audio (0 dBm) into a terminated 600 Ohm load, the levels are +10 dBm for the High Guard Tone, 0 dBm for the Function Tone, and –20 dBm for the Low Guard Tone. Since the maximum output of the DSP-1 is +10 dBm, and the High Guard Tone level is 10 dB above the program audio, the program audio must not be set higher than 0 dBm if EIA Tone Keying is used. The * 0 8 n command does not affect the EIA keying sequence tone amplitudes.

2.11.3.12 COR Inhibit Time after PTT

Some types of radios produce momentary unwanted COR outputs just after their PTT inputs are de-activated. If a radio connected to the ACU-T exhibits this behavior, the COR inhibit causes this COR to be ignored. If the COR inhibit time is not correctly set, this COR signal can cause connected extensions to momentarily key.

The programming item * 2 6 n sets the inhibit time. The available settings are 0 = None, 1 = 100 ms, 2 = 200 ms, 3 = 400 ms, 4 = 800 ms, 5 = 1 sec, 6 = 2 sec, 7 = 3 sec, 8 = 4 sec, and 9 = 5 sec. The factory default is 100 ms.

2.11.3.13 PTT or COR Priority (Half Duplex Only)

For most applications, the standard setting is PTT priority, the factory default. PTT Priority indicates if a system operation calls for the radio to begin transmitting, it will always do so, unless a previous PTT is in active use for this net. For example, if two DSP modules (modules 1 and 2) are connected in a net, with neither module receiving a signal and module 1 begins receiving a COR (valid signal), module 2 will key. If at this point, module 2 begins to receive a COR, it will not switch to receive because the module is set to PTT Priority. Only when the existing COR and PTT scenario goes away will module two COR, and then key module one.

PTT or COR priority only matter if the radio or other equipment connected to the DSP-1 is half duplex (can not transmit and receive simultaneously). If a full duplex radio is used, PTT and COR can occur simultaneously, so there is no reason to set to COR priority, and the module should be left in the PTT priority default.

In some cases, it is necessary for COR to have priority over PTT. This indicates as long as a radio is receiving a valid signal (as indicated by the detection of COR), the DSP-1 module will not put the radio into the transmit mode. One example is when a PSTN-1 module and DSP-1 module cross-connect a phone line and radio together. If the PSTN line has high background noise, COR Priority will probably be useful.

For PTT priority, enter * 2 7 1 (default), for COR priority, enter * 2 7 0.

2.11.3.14 Module Security Level Selection

This command sets a module's security level. Enter * 3 2 n, where n is the security level, with the security level set by n defined as: 0 = not secure (no PIN required), 1 = least secure, up to 9 = most secure.

2.11.3.15 DTMF Commands Enable/Disable

The command * 3 8 n determines whether an ACU-T module considers any DTMF characters present in its input audio to be commands meant for that module. When n = 0 DTMF command recognition is disabled, when n = 1 DTMF command recognition is enabled.

When DTMF commands are disabled, they are not considered as commands to the receiving module blocked from passing through the module. If the DTMF Mute Timer is enabled, the DTMF characters are detected and muted. If the DTMF Mute Timer is disabled, any incoming DTMF is simply passed through along with the rest of the program audio. A likely reason for setting the module to the DTMF Command Disable mode would be to prevent any outside users from connecting to the ACU-T system via DTMF. This is especially likely if the system is normally controlled by an operator using the ACU Controller software, and authorized system users do not have DTMF keypads on their radios.

The default factory setting is DTMF Commands Enabled. In this mode, the receiving module assumes that all incoming DTMF characters are commands and responds accordingly. See Section 2.11.3.5 for proper DTMF Mute Timer adjustment, and Section 3.4.2.9, which explains the Data and Command modes, which can be used to temporarily (and remotely) control the use of DTMF input, without having to enter the programming mode.

Raytheon
JPS Communications

2.11.3.16 High Frequency Equalizer (DSP-1)

The DSP-1 module can reshape the high frequency response of its receive audio input. Equalization can have two effects:

1. Improved DTMF detection when using radios with a nonlinear response.

2. Better-sounding audio for some radios. The high frequency response can be either cut or boosted by up to 5 dB.

Enter * 3 9 n to modify frequency response. Options are 0, 1 = 5 dB cut, 2 = 3.5 dB cut, 3 = 2 dB cut, 4 = flat (no change, factory default setting), 5 = 2 dB boost, 6 = 3.5 dB boost, 7, 8, 9 = 5 dB boost.

2.11.3.17 DTMF Pre-emphasis

FM radios (VHF, UHF, 800 MHz) use pre-emphasis in the transmitted audio and de-emphasis in the received audio. Pre-emphasis and de-emphasis alter, and then restore, the audio frequency response in order to improve the quality of the received signal with respect to high frequency noise. In most FM transmitters that have built-in DTMF signaling, the DTMF characters are added after the pre-emphasis circuitry. When detected in an FM receiver, the DTMF characters are taken from the discriminator audio, prior to the de-emphasis circuitry.

In the ACU-T, DTMF detection is performed by the DSP-1 module rather than by the associated receiver. When the DSP-1 receives line audio or speaker audio from an FM receiver (rather than discriminator audio), any received DTMF characters have been inappropriately de-emphasized. This incorrect shaping of the frequency response of the DTMF characters impedes proper DTMF detection. The DSP-1 can add pre-emphasis to the DTMF detection algorithm (leaving the received audio flat) for improved detection.

Enter * 4 0 n to alter the frequency response of the audio in the DTMF detection algorithm. Note, these settings do not affect the audio that is passed on by the DSP-1 to be cross-connected via another module in the system. Enter * 4 0 0 to add pre-emphasis to the received DTMF and * 4 0 1 to not apply the pre-emphasis. The factory default is n = 0, with added pre-emphasis. It should be used any time the DSP-1 audio input source is the line audio or speaker audio output of an FM receiver. The n = 1 selection should be used if the audio source is the discriminator output of an FM receiver or from a source other than an FM receiver.

2.11.3.18 Auxiliary Output Control

This programming item determines how the AUX outputs are controlled by the ACU system. * 4 1 0 is for future functions, and * 4 1 1 (factory default) turns control over to the system. This function is used by JPS to change a TTL output from high to low, or low to high in order to control external devices. For example, when the STU3 4-wire option is chosen, the software controls the AUX output to throw a relay controlling whether audio goes to the ACU-T or to the STU-3 handset.

2.11.3.19 Voice Prompt Initiation Delay

A delay can be added to the onset of system voice prompts. Different delays can be added to any of the interface modules. This variable delay is mainly used to compensate for slow-to-react equipment associated with a module. For example, if a local radio associated with a DSP-1 module has a long settling time after its PTT is activated, it may be necessary to delay all voice prompts transmitted via the DSP-1. When additional delay is required, the distant radio user will not hear the beginnings of system voice prompts.

Enter * 4 4 n to set the delay. Options are 0 = no delay, 1 = 50 ms, 2 = 100 ms, 3 = 500 ms, 4 = 750 ms, 5 = 1 sec, 6 = 2 sec, 7 = 3 sec, 8 = 4 sec, and 9 = 5 sec. The factory default for DSP-1 modules is 100 ms; for PSTN-1, and LP-1 modules, the default is no delay.

Raytheon
JPS Communications

2.11.4 PSTN-1 Programming Items

2.11.4.1 Telephone Line Level

The command * 0 2 n programs the PSTN-1 for different telephone line levels. The selections for n are 0 = 0 dBm, 1 = -3 dBm, 2 = -6 dBm, 3 = -9 dBm (default), 4 = -12 dBm, 5 = -15 dBm, 6 = -18 dBm, 7 = -21 dBm, 8 and 9 both = -24 dBm. This command simultaneously sets the telephone send and receive levels. The default setting is -9 dBm, which is the maximum level allowed into U.S. (and most foreign) telephone networks at the subscriber end. Many PABX units require a level of -12 dBm. Higher levels should only be selected for use into field wire or private networks that are known to accommodate higher levels. Do not use this command if the telephone receive audio volume is too low; use the * 0 3 n command instead (next paragraph).

2.11.4.2 Telephone Receive Level Boost

This command, * 0 3 n, provides additional volume to the PSTN-1 receive input. The * 0 2 n command explained above sets the correct audio levels for proper hybrid operation and correct levels on the PSTN line. The * 0 3 n command boosts the PSTN-1 receive audio at the output of the hybrid. When necessary, use this command to increase the volume of audio coming into the PSTN-1 so it matches the volume level of other audio signals in the ACU-T system. The factory default of n = 3 for 6 dB boost works for most systems, but if a different level is required, the options for n are 0 = 0 dB, 1 = 2.5 dB, 2 = 4.5 B, 3 = 6 dB, 4 = 7.4 dB, 5 = 8.5 dB, 6 = 9.5 dB, 7 = 10 dB, 8 = 11.3 dB, 9 = 12 dB.

2.11.4.3 PSTN Type

The command * 0 5 n allows the PSTN-1 to be programmed for either a normal telephone system or an Inmarsat M SATCOM terminal. The only difference is the Satcom terminal requires a "#" be appended to the entered telephone number. When the PSTN-1 is programmed for Satcom operation, this is done automatically, so the "#" need not be entered by the user. Enter the programming command * 0 5 0 for a regular telephone line (default) and * 0 5 1 for SATCOM use.

2.11.4.4 Dial Mode

The PSTN-1 module can use either DTMF (Dual Tone Multi Frequency, otherwise known as "Touch-Tones") or Pulse Dialing. In most systems, DTMF is used, but some older systems may still require the use of Pulse Dialing. The command * 0 6 0 sets the unit for DTMF Dialing (default setting); the command * 0 6 1 sets the unit for pulse dialing. When in the Pulse Dialing mode, all digits after the initial telephone number are sent not as pulses, but as DTMF. This allows the use of an answering machine, etc., which require DTMF command input after a connection is made on the pulse dial system. It will be necessary to use the * 8 0 operational command to put the module into the Data Mode.
See Section 3.4.2.9.

2.11.4.5 DTMF Mute Timer

When a module is not in the Data Mode (see Section 3.4.2.9), all DTMF signals detected in the receive audio are interpreted as commands meant for the receiving module. When the DTMF Mute Timer is enabled, these DTMF command signals are "Muted"; that is, they are not passed on to the ACU-T internal audio bus to be routed to another module, nor are they sent back out in any module's TX audio. A module cannot instantaneously mute a DTMF signal; some time is required to detect its presence. Therefore, when a DTMF signal first becomes present in the receive audio, a short burst is passed through. The DTMF Mute Timer ensures, if a long string of DTMF characters are present in the receive input, a short burst of only the first DTMF character is passed through. This is accomplished by muting the audio as soon as the first character is detected, and then keeping the audio muted until the first character is complete, and until enough of the next character has been received so it is detected while the audio is still being muted. Each time a new DTMF character is detected, the timer is reset. When the timer expires (because no new DTMF character is detected in the receive input), the audio is no longer muted.

The factory default is DTMF Mute Timer Disabled, as the majority of ACU-T systems do not employ DTMF control. This setting allows the DTMF signals to be passed through the system like all other audio. It also prevents inevitable occasional "falsing" on voice signals that are similar to a DTMF character; this falsing would momentarily mute throughput audio.

Raytheon
JPS Communications

If DTMF control is used, it may be desirable to mute the DTMF characters as they may be annoying to other system users, and a timer setting of 1 second works well in most cases. If the setting is too low (because some system users transmit DTMF characters slowly), a short burst of DTMF will be passed through at the start of each DTMF character. The timer should be set to a value that is longer than the maximum time elapsed between the end of one DTMF character and the start of the next.

There are some circumstances when it's important that incoming DTMF not be interpreted by the ACU-T as control input, but instead must be passed to other equipment. The settings used are different depending on whether the module that's passing on the DTMF is a PSTN-1 module (which regenerates DTMF) or any other type of module (which do not).

Use the programming command * 0 9 n sets the DTMF Mute Timer, with timer settings of 0 = Off, 1 = 0.5 sec, 2 = 1 sec, 3 = 1.5 sec, 4 = 2 sec, 5 = 2.5 sec, 6 = 3 sec, 7 = 3.5 sec, 8 = 4 sec, and 9 = 4.5 sec. The factory default for the PSTN-1 sets n at 0, disabling the Mute Timer.

2.11.4.6 RX Audio Delay

An adjustable delay can be added to the PSTN-1's input audio. When speech first appears in the input audio, some time passes before it can be detected by the VOX algorithm. The adjustable audio delay prevents the loss of the audio that is received before the detection takes place and audio gates can be opened to send this audio on to other modules.

The Audio Delay programming command is * 1 0 n, with a delay range for the variable n from 0 = 10 ms, 1 = 22 ms, 2 = 35 ms, 3 = 47 ms, 4 = 60 ms, 5 = 72 ms, 6 = 85 ms, and 7 = 97 ms. The factory default is 35 ms.

2.11.4.7 VOX Threshold

This command setting determines the sensitivity of the PSTN-1 VOX. To be sure to avoid missing speech, the factory default setting is Low Threshold, which provides maximum sensitivity. There may be instances where less sensitivity is desired (for example if excessive if background noise is present).

Enter * 1 1 n, with selections of 0 = VOX Off, 1 & 2 both = Low (highest sensitivity), 3 = High, and 9 = VOX disabled. The factory default setting is for Low Threshold.

2.11.4.8 VOX Hangtime

VOX hangtime determines how long the VOX stays active after speech disappears. This keeps radios that are communicating with the PSTN-1 from unkeying between words spoken by the telephone caller. If too short a hangtime is set, the radios will unkey frequently and syllables may be missed during the time it takes the transmitter to key again. Too long a hangtime causes the party at the other end to wait unnecessarily long for the VOX to unkey before beginning their response during the conversation.

Set the VOX hangtime with the programming command * 1 2 n, with selections off 0 = 500 ms, 1 = 1 sec, 2 = 1.5 sec, and 3 = 2 sec. The factory default is 1 sec.

2.11.4.9 2-Wire/4-Wire Operation (STU-III Operation)

The PSTN-1 can be configured for 2-Wire (normal) or for 4-Wire interface. The 4-wire setting is useful for interfacing with certain types of 4-wire telephones or telephone lines. A special application of the 4-wire setting is for use with the STU-III option to the ACU-T. Selection of 4-wire can be made with or without the hybrid. The hybrid may cause problems in some 4-wire system applications. The 4-wire circuitry is not intended for connection to most external circuits; JPS offers a 4-wire balanced audio interface module, P/N 5020-100000.

The * 2 4 n programming command is used to make this selection. The selections for n are 0 = standard 2-wire (default), 1 = 4-wire with hybrid, 2 = 4-wire without hybrid, 3 = STU-III with hybrid, 4 = STU-III without hybrid.

2.11.4.10 Module Security Level Selection

This command sets a module's security level. Enter * 3 2 n, where n is the security level, with 0 = not secure (no PIN required), 1 = least secure, up to 9 = most secure.

JPS Communications

2.11.4.11 Outgoing Ring Timer

The length of time the PSTN-1 allows the phone being called to ring is set by the * 3 7 n programming item. The selection options are: n = 0 (no ring), n = 1 for a 30 second ring (factory default), n = 2 for a 1 minute ring, or n = 3 for a continuous ring. When set for either 30 seconds or one minute, the call will time-out if the call is not answered before the ringing time elapses. If Outgoing Ring is set to "no ring," no outgoing calls are allowed. This feature is useful, for example, if the PSTN-1 is connected to a satellite terminal and, while it's important to receive incoming calls, the system operator does not want to pay for outgoing calls. If set for continuous ring, the incoming call does not time out and the phone will continue to ring until the call is terminated by the originator.

2.11.4.12 DTMF Command Enable

The command * 3 8 n determines whether an ACU-T module considers any DTMF characters present in its input audio to be commands meant for the module. When n = 0 DTMF command recognition is disabled, when n = 1 DTMF command recognition is enabled. When DTMF commands are disabled, they're blocked from passing through the module. Instead, the DTMF characters are detected and muted, but are not considered as commands to the receiving module. The default factory setting is DTMF Commands enabled. In this mode, the DTMF characters are still detected and muted, but the receiving module assumes they are incoming commands and responds accordingly. See Section 2.11.3.5 for proper DTMF Mute Timer adjustment, and Section 3.4.2.9, which explains the Data and Normal modes, which can be used to temporarily control the use of DTMF input, without having to enter the programming mode.

2.11.4.13 Auxiliary Output Control

This programming item determines how the AUX outputs are controlled by the ACU-T system. * 4 1 0 is for future functions, and * 4 1 1 (factory default) turns control over to the system. This function is used by JPS to change a TTL output from high to low, or low to high in order to control external devices. For example, on the PSTN, the AUX output is controlled by the ACU-T software to change states to operate an external ringer when receiving an incoming call.

2.11.4.14 Inactivity Disconnect Timer

The Inactivity Disconnect Timer disconnects a PSTN-1 user from the ACU-T system if no activity is detected on the line. This prevents the connection from being tied up if a telephone user forgets to give the "Disconnect" command or the connection is otherwise lost without notification to the system. This timer measures how long there is no speech or DTMF characters present in audio sent to the PSTN-1 receive audio input. If there's insufficient activity so the VOX is not tripped before this timer expires, the connection is terminated by the ACU. This timer is reset whenever the VOX is tripped. When using the PSTN-1 to monitor audio from another module for an extended time, set timer to 0 (off).

Set the Timer duration with the * 4 2 n programming command. Selections available are: 0 = None (the connection will not be terminated due to inactivity no matter how long), 1 = 30 seconds, 2 = 1 minute, 3 = 2 minutes (factory default), 4 = 5 minutes, 6 = 10 minutes.

2.11.4.15 Voice Prompt Initiation Delay

A delay can be added to the onset of system voice prompts. Different delays can be added to any of the interface modules. This variable delay is mainly used to compensate for slow-to-react equipment associated with a module. For example, if a local radio associated with a DSP-1 module has a long settling time after its PTT is activated, it may be necessary to delay all voice prompts transmitted via the DSP-1. When additional delay is required, the distant radio user will not hear the beginnings of system voice prompts.

Enter * 4 4 n to set the delay. Options are 0 = no delay, 1 = 50 ms, 2 = 100 ms, 3 = 500 ms, 4 = 750 ms, 5 = 1 sec, 6 = 2 sec, 7 = 3 sec, 8 = 4 sec, and 9 = 5 sec. The factory default for DSP-1 modules is 100 ms; for PSTN-1 and LP-1 modules, the default is no delay.

2.11.4.16 PSTN-1 Simplified Setup Procedure

This is a set of hints to assist in the basic setup of a PSTN-1 module to the phone system to which it's connected. It gives a step-by-step process that lists the steps in the best order to quickly achieve the best results.

Use the HSP-4 handset to place a call from the PSTN-1 to the phone number of an associate who will help with the setup.

Raytheon
JPS Communications

Refer to Section 2.11.4.1, Telephone Line Level. Ensure that the line levels are correct for the network being used and do not exceed maximum allowed levels. Within the guidelines presented, the line level may be adjusted to present the proper level to your associate at the remote telephone. This can be done via the ACU Controller program or the * 0 2 n programming item.

- Now listen as the associate speaks and verify that the VOX LED illuminates on the PSTN-1 even for softly spoken speech. If the VOX doesn't always trip, raise the telephone RX Level Boost setting until it does, but no higher. This can be done via the ACU Controller program or the * 0 3 n programming item.

- Continue to have a conversation while monitoring the VOX LED. If problems persist with failure to VOX or if false VOXing due to background noise on the distant phone occurs, adjust the VOX threshold as needed. Use the ACU Controller or the * 1 1 n programming item. There are only two settings, Low & High. The default setting is Low threshold. If the VOX does not always trip, and the setting is currently at High, lower the threshold to the Low setting. If the threshold is already set to Low, the VOX cannot be made more sensitive, so the RX Level Boost must be increased. If the VOX sometimes falses on background noise, and the threshold is set to low, move the threshold to the high setting. Note: The VOX is expected to trip on loud background noises; lower the threshold only if the VOX is activated for background sounds that are below the volume of normal speech.

- Now have your associate on the distant phone count from one to twenty at a slow, conversational rate. The VOX should remain active throughout. If the VOX drops in and out, raise the VOX hangtime just until this no longer occurs. The default setting is one second; if the VOX continually drops out between words, increase it to 1.5 seconds or, if necessary, to two seconds. Change the VOX hangtime with the ACU Controller or by the HSP-4 keypad.
The keypad configuration programming item is * 1 2 n.

2.11.5 LP-1 Programming Items

2.11.5.1 DTMF Mute Timer

When a module is not in the Data Mode (See Section 3.4.2.9), all DTMF signals detected in the receive audio are interpreted as commands meant for the receiving module. When the DTMF Mute Timer is enabled, the DTMF command signals are "Muted"; that is, they are not passed on to the ACU-T internal audio bus to be routed to another module, nor are they sent back out in any module's TX audio. A module cannot instantaneously mute a DTMF signal; some time is required to detect its presence. Therefore, when a DTMF signal first becomes present in the receive audio, a short burst is passed through. The DTMF mute timer ensures that, if a long string of DTMF characters are present in the receive input, a short burst of only the first DTMF character is passed through. This is accomplished by muting the audio as soon as the first character is detected, and then keeping the audio muted until the first character is complete, and until enough of the next character has been received so it is detected. Each time a new DTMF character is detected, the timer is reset. When the timer expires (because no new DTMF character is detected in the receive input), the audio is no longer muted.

The factory default is DTMF Mute Timer Disabled, as the majority of ACU-T systems do not employ DTMF control. This setting allows the DTMF signals to be passed through the system like all other audio. It also prevents inevitable occasional "falsing" on voice signals that are similar to a DTMF character; this falsing would momentarily mute throughput audio.

If DTMF control is used, it may be desirable to mute the DTMF characters as they may be annoying to other system users, and a timer setting of 1 second works well in most cases. If the setting is too low (because some system users transmit DTMF characters slowly), a short burst of DTMF will be passed through at the start of each DTMF character. The timer should be set to a value that is longer than the maximum time elapsed between the end of one DTMF character and the start of the next.

There are some circumstances when it's important that incoming DTMF not be interpreted by the ACU-T as control input, but instead must be passed to other equipment. The settings used are different depending on whether the module that's passing on the DTMF is a PSTN-1 module (which regenerates DTMF) or any other type of module (which do not).

Raytheon
JPS Communications

2.11.5.1.1 Transmitting DTMF via a PSTN Module

If the system will be used, for example, to allow a local phone user to control a telephone answering machine via DTMF, the following will occur:

A local phone with a DTMF keypad will send DTMF characters to an associated LP-1 module. This LP-1 will be cross-connected to a PSTN-1 module that is hooked to a phone line. If the local phone user creates the cross-connection using the DTMF keypad, the LP-1 module must be in the Command Mode when he does so. He must then use the keypad to put the LP-1 module into the Data Mode. When in the Command Mode, DTMF coming into the LP-1 module is interpreted as system command input. When in the Data Mode, the incoming DTMF is interpreted as control characters intended for other equipment rather than control commands for the ACU-T. This applies to all DTMF except the sequence that signals the module to return to the command mode. See Section 3.4.2.9 for more information about the Command and Data Modes.

While in the Data Mode, the DTMF from the local phone is detected by the LP-1 module and relayed via the CPM-2 module to the cross-connected PSTN-1 module as parallel data. The PSTN-1 regenerates and transmits the DTMF characters into the phone line.

When the system is used in this way, the DSP-1 module should have its DTMF Mute Timer turned on, so that only the regenerated DTMF will be sent via the phone line.

2.11.5.1.2 Transmitting DTMF via a Module other than the PSTN-1

If it is desired that DTMF characters (sent out by a module other than a PSTN-1) be passed through the system, , the DTMF Mute Timer must be turned off. This is required because only the PSTN-1 regenerates DTMF; the others will just pass it through like any other program audio. The DTMF Mute Timer must be set to off on the module that receives the DTMF or it cannot be passed on to the cross-connected module or modules.

Use the programming command * 0 9 n sets the DTMF Mute Timer, with timer settings of 0 = Off, 1 = 0.5 sec, 2 = 1 sec, 3 = 1.5 sec, 4 = 2 sec, 5 = 2.5 sec, 6 = 3 sec, 7 = 3.5 sec, 8 = 4 sec, and 9 = 4.5 sec. The factory default sets n at 0, disabling the timer.

2.11.5.2 RX Audio Delay

An adjustable delay can be added to the LP-1's input audio. When speech first appears in the input audio, some time passes before it can be detected by the VOX algorithm. The adjustable audio delay prevents the loss of the audio that is received before the detection takes place and audio gates can be opened to send this audio on to other modules.

The RX Audio Delay programming command is * 1 0 n, with a delay range for the variable n from 0 = 10 ms, 1 = 35 ms, 2 = 60 ms, 3 = 85 ms, 4 = 110 ms, 5 = 135 ms, 6 = 160 ms, and 7 = 185 ms. The factory default is 60 ms.

2.11.5.3 VOX Threshold

This command setting determines the sensitivity of the LP-1 VOX.

Enter * 1 1 n, with selections of 0 = VOX Off, 1 = Low (highest sensitivity), 2 = Medium, 3 = High, and 9 = VOX disabled. The factory default setting is Medium.

2.11.5.4 VOX Hangtime

VOX hangtime determines how long the VOX stays active after speech disappears. This keeps radios that are communicating with the LP-1 from unkeying between words spoken by the LP-1 user. If too short a hangtime is set, the radios will unkey frequently and syllables may be missed during the time it takes the transmitter to key. Too long a hangtime causes the party at the other end to wait unnecessarily long for the VOX to unkey before beginning their response during the conversation.

Set the VOX hangtime with the programming command * 1 2 n, with selections of 0 = 10 ms, 1 = 750 ms, 2 = 1.5 sec, and 3 = 2 sec. The factory default is 750 ms.

2.11.5.5 Module Security Level Selection

This command sets a module's security level. Enter * 3 2 n, where n is the security level, with 0 = not secure (no PIN required), 1 = least secure, up to 9 = most secure.

Raytheon
JPS Communications

2.11.5.6 Dial & Busy Tone Style

The Local Phone Module generates the dial tone and busy tone sent to the phone that is plugged into it. When the handset of the local phone is picked up, this dial tone is heard in the earpiece. After a request to make a connection is made, the user will hear the ring cadence as set in Section 2.11.5.7 as the ACU-T attempts to make the connection. If the extension is busy, a busy tone will be heard. The programming item * 3 3 n defines the style generated. The factory default generates the standard US tones. The selections for n are: 0 = Standard US, 1 through 9 are reserved for future use.

2.11.5.7 Ring Cadence

The cadence of the ring the LP-1 sends to the associated telephone set is selected by the programming item * 3 4 n. * 3 4 0 sets the cadence to the standard US style (factory default), * 3 4 1 selects European style. * 3 4 2 through * 3 4 9 are reserved for future use. This ring cadence applies both to the tone heard in the LP-1's earpiece when a call is being made and to the ring that is produced when a call is placed to the local phone (ringback).

2.11.5.8 Dial Tone Enable

The LP-1 can generate a dial tone whenever a caller picks up the handset of the associated telephone set in order to place a call. If desired, this dial tone can be disabled. Use the * 3 5 n programming item to enable or disable the LP-1 dial tone. The selections are * 3 5 0 for Dial Tone Disabled and * 3 5 1 to enable the dial tone (factory setting).

2.11.5.9 Ringback Enable

When a call is placed to the extension occupied by the LP-1, the LP-1 can signal this call has been made via its ringback signal. For example, if an ACU-T user attempts to make a connection with his UHF radio to an extension occupied by an LP-1, he will hear this ringback signal as he waits for the handset at the LP-1 to be picked up. It's possible to disable this ringback signal; in this case the UHF radio user will not hear anything as he waits for his call to go through. The programming item * 3 6 0 disables the ringback tone, while * 3 6 1 enables it (factory default). See Section 2.11.5.7 Ring Cadence, and Section 2.11.5.10 Ringing Time.

Raytheon
JPS Communications

2.11.5.10 Outgoing Ring Timer

The length of time the LP-1 causes its associated phone set to ring when a call is received is adjusted by the * 3 7 n programming item. The selection options are: n = 0 (no ring), n = 1 for a 30 second ring (factory default), n = 2 for a 1 minute ring, or n = 3 for a continuous ring. When set for either 30 seconds or one minute, the call will time-out if the call is not answered before the Ringing Time elapses. When set to "no ring," no outgoing calls are allowed. If set for continuous ring, the incoming call does not time out and the phone will continue to ring until the call is terminated by the originator.

2.11.5.11 DTMF Command Enable

The command * 3 8 n determines whether an ACU-T module considers any DTMF characters present in its input audio to be commands meant for that module. When n = 0 DTMF command recognition is disabled, when n = 1 DTMF command recognition is enabled. When DTMF commands are disabled, they're blocked from passing through the module. Instead, the DTMF characters are detected and muted, but are not considered as commands to the receiving module. The default factory setting is DTMF Commands Enabled. In this mode, the DTMF characters are still detected and muted, but the receiving module assumes they are incoming commands and responds accordingly. See Section 2.11.5.1 for proper DTMF Mute Timer adjustment, and Section 3.4.2.9, which explains the Data and Command Modes, which can be used to temporarily control the use of DTMF input, without having to enter the programming mode.

2.11.5.12 Aux Output Control

This programming item determines how the LP-1's AUX outputs are controlled by the ACU system. * 4 1 0 is for future functions, and * 4 1 1 (factory default) turns control over to the system. This function is used by JPS to change a TTL output from high to low, or low to high in order to control external devices.

Raytheon
JPS Communications

2.11.5.13 Voice Prompt Initiation Delay

A delay can be added to the onset of system voice prompts. Different delays can be added to any of the interface modules and to the HSP-4. This variable delay is mainly used to compensate for slow-to-react equipment associated with a module. For example, if a local radio associated with a DSP-1 module has a long settling time after its PTT is activated, it may be necessary to delay all voice prompts transmitted via the DSP-1. When additional delay is required, the distant radio user will not hear the beginnings of system voice prompts.

Enter * 4 4 n to set the delay. Options are 0 = no delay, 1 = 50 ms, 2 = 100 ms, 3 = 500 ms, 4 = 750 ms, 5 = 1 sec, 6 = 2 sec, 7 = 3 sec, 8 = 4 sec, and 9 = 5 sec. The factory default for DSP-1 modules is 100 ms; for HSP-4, PSTN-1, and LP-1 modules, the default is no delay.

End Of Section Two.

Raytheon
JPS Communications

3 Operation

3.1 General

This section contains information and instructions required for proper operation of the ACU-T Tactical Interconnect System. These instructions will begin with the most basic operations first, and then add procedures that are more complex. Refer to these figures for pictorial views of the front, top, and rear of the ACU-T: Figure 2-1, Figure 2-2, and Figure 2-3.

The main purpose of the ACU-T is to provide interconnections between different communications systems. The ACU-T can simultaneously crossband two or more different radio networks, connect a radio network to a telephone line (or SATCOM system), or even create a conference call between several different radio networks and a caller on the telephone line. An operator at the ACU-T can use the HSP-4 module to monitor or establish an interconnection with any (or all) of the communications systems that are wired to the ACU-T side panel. The ACU-T provides voice and tone prompts to assist all system users in making full use of all of the unit's capabilities.

Each of the five interface module plug-in slots may contain a module that will connect a communications system to the rest of the ACU-T network. Each of these plug-in slots is given an extension number, from 01 through 05. The interface module installed in the plug-in slot just to the right of the CPM-2 module is given extension number 01, and extension number 05 is associated with the right-most slot. The HSP-4 module has extension number 00 (think of this as similar to "O" for "Operator"). See Section 2 and Table 2-5 for more information.

3.2 Front And Top Panel Controls and Indicators

All front and top panel controls and indicator LEDs are explained below. The module that contains the control or indicator is listed in parenthesis.

Raytheon
JPS Communications

3.2.1 Power ON LED (Top Panel)

The LED should be lit as long as power is applied to the unit. If power is applied, but the LED is not lit, check fuse F1.

3.2.2 Charger ON LED (Top Panel)

This LED will be lit when the battery charger is turned ON and a battery is connected and charging. The LED is brightest when a battery is low on charge and dims as the battery nears full charge. If there is no battery connected, or if the battery is fully charged, the indicator will not light whether or not the Charger switch is ON.

3.2.3 System Connection Status Display (Top Panel)

The System Connection Status display is a matrix of 18 LED indicators arranged in three rows by six columns. The rows indicate Connection Nets 1, 2, and 3, while the columns indicate the HSP-4 and five other extension modules in the chassis. As connections are made between modules, the LEDs at the appropriate intersections light, indicating which modules are connected together in which nets. When the ACU-T powers up, the status display lights each of the six columns momentarily left-to-right as a display test and indication of proper initialization.

3.2.4 Speaker Switch (Top Panel)

This top-mounted switch turns the top panel speaker on and off. It does not affect the headphone audio or the external speaker driver audio signal available at pin 2 of side panel connector J0.

3.2.5 Headphones Output Jack (HSP-4 Front Panel)

This stereo jack accepts a stereo or mono 3.5-mm headphone jack (also referred to as a 1/8" jack). The monaural headphone audio signal is supplied to both the left and right sections of an inserted stereo plug. Headphone volume, along with the volume of the speaker and handset earpiece, is controlled by the top panel volume potentiometer.

3.2.6 Volume Control (Top Panel)
This potentiometer adjusts the volume to the speaker, handset, and headphones.

3.2.7 Fault LEDs (HSP-4, DSP-1, PSTN-1, LP-1)
The red FAULT LEDs will be illuminated whenever the associated module's built-in test circuitry detects a fault condition for that module.

3.2.8 Master/Slave LEDs (CPM-2)
The Master and Slave LEDs are non-functional in an ACU-T because an expanded (multi-chassis) system is not possible with the unit.

3.2.9 Mon (Monitor) LED (DSP-1, PSTN-1, LP-1)
The Monitor LED of any module is lit whenever that module is being monitored by another module.

3.2.10 Signal LED (DSP-1)
The signal LED gives an indication of the proper audio level entering the module from outside of the ACU-T (for example, it describes the RX audio from a receiver into the DSP-1 module to which the receiver is cabled). The Signal LED is lit when the audio level is correct for the module. The input audio level should be adjusted so the signal LED just flashes on voice peaks. If the LED never lights, the audio level is too low; if the LED stays lit almost continuously, the audio level is too high for best system operation. See Section 2 for installation and setup instructions.

3.2.11 PTT LED (DSP-1), VOX LED (PSTN-1, LP-1)
The PTT or VOX LED is lit whenever the associated module's VOX or squelch has been activated and the module is causing an associated transmitter to transmit.

Raytheon
JPS Communications

3.2.12 COR LED (DSP-1)

The green LED provides an indication showing squelch has been broken on the associated input audio channel. This indication will depend on the method of COR in use. In systems which use external COR inputs this occurs when the receiver is unsquelched, driving the receiver's COR output low. In the DSP-1 module, when squelched receivers are used and no external COR line is available, signal is declared present (squelch broken) when VMR or VOX is activated, depending on which one of these functions is enabled.

3.2.13 Ring LED (PSTN-1, LP-1)

The PSTN-1 Ring LED is lit while the PSTN module is receiving a ring signal from the telephone line. The LP-1 Ring LED is lit whenever the LP-1 is causing the associated telephone set to ring.

3.2.14 Connect LED (PSTN-1)

The Connect LED is lit while the PSTN module is actually connected to a telephone line, either in response to automatic answer of an incoming ring, or while dialing out.

3.2.15 Off-hook LED (LP-1)

This LED is lit whenever the local phone set is taken off-hook. (*Off-hook* means that the telephone handset has been lifted from its cradle.)

3.3 Rear and Side Panel Connectors

Section 2.8 contains full explanations and pin-outs for all rear and side panel connectors. Figure 2-2 and Figure 2-3 show connector locations.

3.4 Basic Chassis Modules - Functions and Operation

All ACU-Ts contain a rear panel power supply and a chassis with the HSP-4 and CPM-2 modules installed, plus up to five Interface Modules. (Interface modules plug into extension slots 01 through 05, and connect the basic chassis to radio or phone networks, or to a satellite or local phone user, etc.). The top panel keypad (via the hardware on the HSP-4) can be used to configure and control the entire system. This section explains the operation of the basic chassis with the HSP-4 and CPM-2 modules. The interface modules are detailed in Section 3.5.

3.4.1 CPM-2

The CPM-2 is the controller for all other modules in the ACU-T. The CPM-2 constantly polls all modules in the ACU-T to keep track of their current status. This module arbitrates the audio signals on the backplane, controls tone and voice prompting, and maintains password security (called PIN numbers in the ACU-T, see Section 3.6). The CPM-2 keeps all system and module configuration parameters in storage; for example, this module always knows what modules are installed in each of the unit's Extension Slots and what the input and output audio level settings are for each module.

The RS-232 serial remote control port for the ACU-T is controlled by the CPM-2. Whenever the power switch is turned on, the CPM-2 checks the configuration of the unit, and determines if there have been any changes to interface module slot assignments since the power was turned off. If not, the CPM-2 reconfigures each module to the settings it had before power was cut off (input & output audio levels, audio delays, etc).

Raytheon
JPS Communications

3.4.2 HSP-4

The HSP-4 Module provides a means to locally monitor, control and configure an ACU-T system. The user can monitor audio via an internal speaker, or plug in external headphones or use the handset provided. The handset includes a PTT switch, which must be depressed for the user's voice to be transmitted. Control is via a 3x4 keypad (standard telephone layout), which enables the user to select a module and enter control/configuration data. If the system contains a PSTN-1 module, the user may place telephone calls manually using the HSP-4 keypad and handset. In addition to the front-panel handset and phones jacks, the HSP-4 provides line audio input and output and an external speaker output.

The HSP-4 module houses the system voice prompt generator. These voice prompts allow the ACU system to respond with English messages (optionally, other languages) that make it easier to configure and operate the system.

Section 2 explained how to configure the ACU-T system modules via the HSP-4 keypad. Table 3-1 and the text that follows it explain how to use the HSP-4 as an operational control for the ACU-T communications system after it has been configured. The HSP-4 can make a communications link with any one of the system's interface modules, or with a number of them simultaneously in a conference call. The HSP-4 can perform certain operations that users connected by one of the system interface modules cannot perform, including, but not limited to, storing the current state of connections for later recall, or breaking the current connection of a module other than itself. A system user at the HSP-4 is considered the "local operator" of the system, and has the extension number "0 0".

| Table 3-1 | | HSP-4 Operational Command Items | |
|---|---|---|---|
| Command Item | Command | Description | Factory Default |
| Make a Connection | * n n | Connect HSP-4 to extension nn. | N/A |
| Break the Current Connections | * # | Terminate all connections the HSP-4 is currently participating in. | N/A |
| Attention Command | * * * | ACU-T responds by identifying the extension number of the HSP-4 module being queried. | N/A |
| Report Connections | * 3 0 | Voice Prompts list all current connections. | N/A |
| Disconnect Another Extension | * 3 3 n n | Terminate all connections extension nn is currently participating in. | N/A |
| Monitor Function | * 3 4 n | n = Extension to be monitored. * 3 4 n toggles between Monitor On and Monitor Off. | Monitor Off |
| Store Connections | * 3 6 | Store the current connection configuration for automatic recall at power-up. | None Stored |
| Regain Control | * 3 7 | Regain system-programming control from the ACU Controller. | N/A |
| Data/Comm and Mode | * 8 0 | Toggles between Data and Command Modes. | Command Mode |
| System Reset | * 9 0 n n | If nn is any series of digits other than 00, the System Reset feature is enabled, and "nn" is the system reset code. If nn is 00, the feature is disabled. | Disabled |

Raytheon
JPS Communications

3.4.2.1 Make a Connection

When the command * n n is entered at the keypad, a connection is made between the local operator at the HSP-4 and the communications medium at extension n n. For example, if a VHF radio is wired to a DSP-1 module installed at extension slot #2, the command * 0 2 will connect the local operator to the VHF radio. The local operator will hear the distant radio user's transmit audio via the RX audio output of the radio attached to the DSP-1 module. When the PTT switch on the HSP-4 handset is depressed, the local operator's speech will be transmitted to the radio user. If a PSTN module is installed at extension slot #5, the command * 05 will connect the local operator to the telephone line wired to that PSTN module.

Voice prompts guide the local operator at the HSP-4 to enter the telephone number that will be called, and provide other useful information, such as informing the user if a module is busy or otherwise unavailable. To make a conference call among several modules, add a second connection after the first is made. For example: tomake a conference call between the local operator at the HSP-4, the VHF radio at extension 02, and a PSTN subscriber via the PSTN module at extension 05. Connect to the VHF radio as described above, then at any time add the PSTN subscriber by entering * 05 and following the voice prompt instructions provided.

To make a connection between a pair of modules, neither of which is the HSP-4, the local operator must first make a connection between the HSP-4 and one of these other modules, then create a conference call with the remaining module, and finally enter the disconnect command * # to remove the HSP-4 from the call. If for some reason the two modules still engaged in the link can not break the connection themselves (for instance, if both are HF radios so neither can reliably transmit DTMF commands), the local operator must use the HSP-4 to break the connection. He may use the Monitor Function command to listen to the conversation between the two HF radio users, and enter the "Disconnect Other Extensions" command to terminate the link when the conversation is complete.

3.4.2.2 Break a Connection

To disconnect the HSP-4 (or any interface module) from any connection, enter the disconnect command * # (star pound). If the HSP-4 is currently engaged in a conference call between the HSP-4, the VHF radio at extension 2 and a PSTN subscriber using the PSTN-1 at extension 5, the * # sequence entered at the HSP-4 keypad will remove the HSP-4 from the call, but leave the VHF radio user and the PSTN subscriber connected.

3.4.2.3 Attention Command

Whenever the Attention Command, * * *, is entered a voice prompt will be returned identifying the extension number of the module receiving the command. When * * * is entered by the top panel keypad, this will result in the voice prompt "EXTENSION 00". The Attention Command can be given whether or not the HSP-4 module is currently connected to another module. The feedback provided by the voice prompt allows quick system operation verification without having to make a connection.

3.4.2.4 Report Connections

Whenever the Report Command, * 3 0, is entered at the HSP-4 keypad, the ACU will list all existing connections. They can be heard at the front panel speaker or the HSP-4 handset. This command cannot be made via any of the interface modules; it's valid only when entered by the HSP-4 keypad. This connection status is also available on the top panel display.

3.4.2.5 Disconnect Another Extension

This command allows the local operator to use the HSP-4 keypad to select any system module and terminate all connections the selected module is currently participating in. When the operational command * 3 3 nn, is entered, any interconnections that extension nn is currently engaged in are immediately terminated. This command cannot be made via any of the interface modules; it's valid only when entered by the HSP-4 keypad.

Raytheon
JPS Communications

3.4.2.6 Monitor Function

This command enables any module to monitor the receive audio from any other module. Enter * 3 4 n, where n is the extension to be monitored. To discontinue monitoring, re-enter * 3 4 n, where n is the extension currently being monitored. This command toggles the selected module, first turning the module function on, and then cutting it off. When the monitor function is enabled, the monitoring module will hear only the receive audio of the module being monitored. The Monitor Function does not allow the monitoring module to assert any control over the monitored module. The monitoring module will still be capable of making connections and perform other functions if desired. The voice prompts; "MONITOR ON" and "MONITOR OFF," inform the user of the operational changes made.

When this command is made via the HSP-4's top panel keypad, the local operator may monitor the selected module's receive audio via the ACU-T speaker, handset, and headphone jack.

3.4.2.7 Store Connection Table in Memory

Use the command * 3 6 to store a table of all current module connections in non-volatile memory. After this has been done, every time power is re-applied to the ACU-T, these connections will be automatically restored.

The factory default connectivity state is "no connections", so until the first time the Store Connection Table command is used, the ACU-T will be initialized upon the re-application of power with no connections made. To change the stored connections, make all the desired connections, then enter * 3 6. To clear stored connections, terminate all connections, then enter * 3 6. This command cannot be made via any of the interface modules; it's valid only when entered by the HSP-4 keypad.

> NOTE: The Store Connections feature will not function unless it's enabled by setting CPM-2 switch SW2-1 to ON. (The factory default setting for this dipswitch is ON, enabling the feature)

Raytheon
JPS Communications

> NOTE: The ACU-T must not be in programming mode when the Store Connections command is used.

3.4.2.8 Regain Control from Console Program

The HSP-4 is normally not allowed to enter configuration commands while the ACU-T is being remotely controlled by the ACU Controller program. If it is ever necessary to pull back the configuration control from the console program (for example, if the computer is remotely located and locks up), enter the command * 3 7 to return control to the HSP-4.

3.4.2.9 Data / Command Modes

The HSP-4 module receives its input audio from the handset, so it does not have a DTMF detector. Its keypad functions as its DTMF input. If the HSP-4 is in the Command Mode, the keypad entries are interpreted as commands to the system. If the HSP-4 is in the Data Mode, keypad entries are not interpreted as commands, but instead the keypad entries are sent as parallel data to a cross-connected PSTN-1 module. The PSTN-1 generates the appropriate DTMF characters and sends them out on the phone line.

The * 8 0 command toggles a module in and out of the Data Mode. All modules begin operation in the default Command Mode. When Data/Command Mode command is first received, the module switches to the Data Mode and returns the prompt "Data Mode". Whenever the * 8 0 command is again received, the module responds with the "Command Mode" prompt and reverts to normal operation.

A simple example of the use of this feature assumes the local operator at the ACU-T wants to call home and check the messages on his answering machine. The HSP-4 starts out in the Command Mode. The local operator first connects to the PSTN module at extension 05. Following the voice prompts provided, he then enters the telephone number to call home. In order for any DTMF to be heard at his house after the call is answered, he must enter the * 8 0 command to switch to Data Mode. Once he does so, he may enter the necessary DTMF password to gain access to his home answering machine. All subsequent keypad entries will result in the transmission of the DTMF characters until he either toggles back out of the Data Mode with another * 8 0 entry or disconnects with a * # entry.

Raytheon
JPS Communications

It is important to note only the PSTN-1 module regenerates DTMF in this way. The Data Mode was created mainly to allow an ACU-T user to make a connection to a PSTN-1 module and be able to control equipment that is connected to the phone line and uses DTMF signaling (voice mail systems, answering machines, etc). It is not possible to use it to send HSP-4 keypad DTMF commands from a DSP-1, or LP-1 module, since these modules do not regenerate DTMF.

3.4.2.10 System Reset Feature

The System Reset Feature allows a user who is interfaced with the system via a DSP-1or PSTN-1 module to reset the ACU-T to its initial power-up state. This means all current connections will be lost, and the unit will return to any connections stored by the * 3 6 command (see Section 3.4.2.7). In order to prevent any inadvertent or unauthorized use of this powerful feature, the System Reset Feature can only be used after first being enabled at the HSP-4 keypad. In addition, a "system reset code" is entered at the time that the feature is enabled, and DSP-1 or PSTN-1 users must enter this code in order to implement the System Reset feature.

The ACU-T factory default for this feature is disabled. To enable System Reset capability, enter * 9 0 n n, where "nn" is any pair of digits other than 00. The feature is now enabled, and "nn" is the system reset code. If a DSP-1 or PSTN-1 user (who is currently connected to the system) enters the DTMF command * 9 0 n n, the system will be reset. If * 9 0 and any digits other than the system reset code are entered, the system will not be reset.

To disable this feature, enter * 9 0 0 0 at the HSP-4 front panel. To re-enable, once again enter * 9 0 n n, where "nn" can be either the previous system reset code or an entirely new code.

3.4.3 Use of Radio at HSP Connector J0

A radio (or other four-wire device) may be connected at the side panel connector J0 and interconnected with the rest of the ACU-T system. Use the same cabling as would connect the radio to a DSP-1 module at J1 through J5. There are some differences in operation at J0 rather than if connected at J1 through J5:

Raytheon
JPS Communications

- There is no signal processor on the HSP-4 module, so the VMR mod is not available. The unsquelched condition of the radio connected at J0 is detected by a VOX circuit on the HSP-4 module.

- There are no level settings available on the HSP-4 for the radio RX and TX audio. JPS radio interface cable designs set the proper TX audio level. The HSP-4 RX audio input has an AGC circuit. The proper input level is usually achieved (when using speaker audio as the RX audio input to the ACU-T) when the radio volume pot is set to mid-range.

- There is no DTMF detector on the HSP-4, so interconnections cannot be initiated via users (with DTMF keypads) calling into the radio connected at J0.

- If the HSP-4 Squelch Mode is set to VOX, any audio present at the HSP-4 handset is mixed with RX audio from the radio. Therefore, whenever this mode is selected, it is best to disconnect the HSP-4 handset, or handset audio will trip the VOX and be mixed with the RX audio from the radio. When the handset is used with no radio connected at J0, keep the HSP-4 Squelch Mode set to "Mic".

Raytheon
JPS Communications

3.5 Interface Modules – Functions and Operation

Up to five Interface Modules may be installed along with the basic chassis modules. These interface modules allow a wide variety of different communications media to become part of the ACU-T system. HF, UHF, VHF, 800 MHz, Nextel two-way radios and trunking radios, satellite users, distant callers connected via the PSTN, local callers connected by a standard telephone set, cell phone users, fax machines, and almost any type of two-wire or four-wire communications medium can be connected. Users can gain entry to the system and exercise control over the ACU-T and the call they've made via DTMF operational commands. Alternatively, the ACU Controller program can be used to make and terminate connections. The different interface modules are described briefly below, followed by a table listing all of the various operational commands, then a more complete explanation of each command. While the commands are the same for all interface modules, the process of making a connection may be different, (for example, placing a telephone call is different than establishing communications between two radios) but the command structure is the same. Operational scenarios (Section 3.7.2) help explain the differences among the different media. See also the ACU Controller manual for information about controlling the ACU-T from a computer.

Raytheon
JPS Communications

3.5.1 DSP-1

The DSP-1 module is the main 4-wire interface to the ACU-T system and can interface radios, remote control heads, or other 4-wire audio devices. It contains circuits to interface balanced or unbalanced 600 Ohm audio from a receiver, 600 Ohm balanced audio to a transmitter, and has audio level adjustments for both. The balanced send and receive audio interface is available to connect a remote control head or console. Due to the DSP circuitry and signal processing algorithms on the DSP-1, it has three types of COR: Hardwired signal, VMR, and VOX. It offers a DSP noise reduction mode, audio high frequency equalization and an overdrive limiter. The VMR and Noise Reduction capability make it an ideal HF radio interface.

3.5.2 PSTN-1

The PSTN Module is the 2-wire interface between the ACU system and a telephone system (as opposed to a telephone set). A telephone system is an entity that accepts dialing information and processes calls, such as a PSTN line, PABX line, Inmarsat Terminal, or cellular phone. A telephone set is a device that generates dialing information such as a standard telephone that can be locally purchased and plugged into a standard wall jack. Telephone sets are interfaced to the ACU system via the LP-1 Module. Two modular jacks (L1 and L2) are available on the PSTN-1 front panel, allowing a pair of two-wire devices to be connected; however only one can be active at a time. The L-1 jack is available to receive and send calls from the PSTN. The PSTN L2 port may only be accessed to call out through the Console Interface Software, and will not answer incoming calls. The module has a 4-wire port for interfacing to 4-wire phone lines or other devices.

The PSTN-1's AUXO1 output (pin 12) changes logic state during ring cadence, intended to control an external ringer.

Among the functions provided by the PSTN-1's DSP algorithms are a DSP hybrid, a VOX with configurable sensitivity and hangtime, and a DTMF receiver/generator for control and call progress recognition.

The two 2-wire ports are available via two front-panel RJ-11C jacks. Internal jumpers may be used to route these signals to make them available at the associated ACU-T backplane connector.

Raytheon
JPS Communications

3.5.3 LP-1

The Local Phone Module is the interface to the ACU system for 2-wire devices, which generate dialing information (such as a standard telephone set or a FAX machine). This module contains a loop current generator, ring voltage generator, dial and busy tone generators, a DSP hybrid with VOX and a DTMF generator/receiver. In addition to interfacing a telephone set into the ACU system, this module can be used as a telephone "line card" in a mini-PBX system.

3.5.4 AP-1

The AP-1 is used to apply an extra DSP function to its throughput audio. It is not recognized by the CPM-2 module or by the ACU Controller. It is not considered an Interface module and none of the Operational Commands listed in this section apply to the AP-1.

3.5.5 Interface Module Operational Commands

| Table 3-3 | | Operational Commands | |
|---|---|---|---|
| Command Item | Command | Description | Factory Default |
| Make a Connection | * n n | Connect the module to extension nn. | No Connections |
| Break the Current Connections | * # | Terminate all connections the module is currently participating in. | N/A |
| Attention Command | * * * | ACU responds with the extension number of the module being queried. | N/A |
| Monitor Function | * 3 4 n | N = Extension to be monitored. * 3 4 n toggles between Monitor Mode and Normal (non-monitoring) Mode. | Disabled (Normal Mode) |
| Data /Command Mode | * 8 0 | Toggles between Data Mode and Command Modes. | Command Mode |
| System Reset | * 9 0 n n | Performs system reset. "nn" is system reset code set via HSP-4 keypad. (See Section 3.4.2.) | Feature Disabled |

Raytheon
JPS Communications

3.5.5.1 Make a Connection

When the command * n n is entered at the HSP-4 keypad or these DTMF characters are detected in the audio input of any interface module, a connection is made between that module and the communications medium at extension n n. For example, if a VHF radio is wired to a DSP-1 module installed at extension slot #2, the command * 0 2, entered into the keypad of a telephone set associated with an LP-1 module at extension slot #4, will connect the local phone set to the VHF radio. The local phone user will hear the distant radio user's transmit audio via the radio attached to the DSP-1 module. When the VOX in the LP-1 detects voice, the local phone user's speech will be transmitted to the radio user. If a PSTN module is installed at extension slot #5, the command * 0 5 will connect the LP-1 user to the telephone line wired to that PSTN module. Voice prompts guide the LP-1 operator to enter the telephone number that will be called, and provide other useful information, such as informing the user if a module is busy or otherwise unavailable. To make a conference call among several modules, add a second connection after the first is made. An example is making a conference call between the LP-1 user at extension 04, the VHF radio at extension 02, and a PSTN subscriber via the PSTN module at extension 05. Make a connection between the LP-1 and the VHF radio as described above, then add the PSTN subscriber by entering * 0 5 and following the instructions provided.

3.5.5.2 Break a Connection

To disconnect an interface module from any connection, enter the disconnect command * # (star pound). If the interface module is currently engaged in a conference call between several different modules, the * # sequence entered at the keypad of a radio associated with an DSP-1 module will remove the DSP-1 user from the call, but leave the remaining connections intact. Because of the way a telephone set is directly wired to the ACU-T chassis, it's possible to terminate an LP-1 connection by hanging up the LP-1 telephone handset. All other modules require the * # entry to break a connection.

3.5.5.3 Attention Command

When the Attention Command * * * is sent to any module, a voice prompt will be returned identifying the extension number of the module receiving the Attention Command. This can be done whether or not the module being queried is currently connected, so it can be used to check if the system is operational without having to make a connection.

3.5.5.4 Monitor Function

This command enables any module to monitor all audio from any other module. Enter * 3 4 n, where n is the extension to be monitored. To discontinue monitoring, re-enter * 3 4 n, where n is the extension that is currently being monitored. This command toggles the selected module, turning the module function on, and then cutting it off. When the monitor function is enabled, the monitoring module will hear both transmit and receive audio of the module being monitored. The Monitor Function does not allow the monitoring module to assert any control over the monitored module. The monitoring module will still be capable of making connections and perform other functions if desired.

3.5.5.5 Data / Command Modes

When an ACU-T interface module detects DTMF in its receive audio, it can either interpret the DTMF tone as a command input (Command Mode) or transmit DTMF via a connected PSTN-1 module so this DTMF can control other equipment (Data Mode). When in the Data mode, the DTMF input is detected and interpreted. This information is passed to the connected PSTN-1 module, which then regenerates the DTMF and inserts it into the PSTN-1 audio output. This regenerated DTMF is free of any FM noise or the frequency response related distortion that often results from the pre-emphasis and de-emphasis of FM audio circuits. The * 8 0 command toggles a module in and out of the Data Mode. All modules begin operation in the default Command Mode. When the Data/Command operational command is received, the module switches to the Data Mode and returns the prompt "Data Mode". Whenever the * 8 0 command is again received, the module responds with the "Command Mode" prompt and reverts to normal operation.

Raytheon
JPS Communications

A simple example of the use of this command assumes the radio user wants to call home and check the messages on his answering machine. The user makes a connection from the DSP-1 module associated with his radio to the PSTN module at extension 05. Following the voice prompts provided, he then enters the telephone number at his home. After the call is successfully made, the user then enters the * 8 0 command. Once he does so, he may enter the password to gain access to his home answering machine. All subsequent DTMF entries will result in the regeneration of the DTMF characters until he either toggles back out of the Data Mode with another * 8 0 entry or disconnects with a * # entry. The module that's receiving the DTMF should also have its DTMF Mute Timer enabled (see the DTMF Mute Timer explanations in Section 2.11).

It is important to note that only the PSTN-1 module regenerates DTMF in this way. The Data Mode was created mainly to allow an ACU-T user to gain access to the system through any type of module (including the HSP-4), make a connection to a PSTN-1 module and be able to control equipment that commonly uses DTMF signaling (voice mail systems, answering machines, etc). Iit is possible, but not advisable, to use the Data Mode (with the DTMF Mute Timer disabled) to cause input DTMF to be repeated through the ACU-T. This is because of the FM noise that will be mixed with the DTMF, along with the frequency response related distortion that will be compounded by the fact that the DTMF will be repeated through two radios.

3.5.5.6 System Reset Feature

The System Reset Feature allows a user who is interfaced with the system via a DSP-1 or PSTN-1 module to reset the ACU-T to its initial power-up state. This means all current connections will be lost, and the unit will return to any connections stored by HSP-4 using the * 3 6 command (see Table 3-1). In order to prevent any inadvertent or unauthorized use of this powerful feature, the System Reset Feature can only be used after first being enabled at the HSP-4 keypad. In addition, a "system reset code" is entered, and DSP-1 or PSTN-1 users must enter this code in order to implement this feature.

The ACU-T factory default for this feature is "disabled". To enable System Reset capability, use the HSP-4 keypad to enter * 9 0 n n, where "n n" is any pair of digits other than 00. The feature is then enabled, and "n n" is the system reset code. If a DSP-1 or PSTN-1 user (who is currently connected to the system) enters the DTMF command * 9 0 n n, the system will be reset. If * 9 0 and any digits other than the system reset code are entered, the system will not be reset.

To disable this feature, enter * 9 0 0 0 at the HSP-4 top panel keypad. To re-enable, once again enter * 9 0 n n, where "n n" can be either the previous system reset code or an entirely new code.

3.6 PIN Security

It's possible to enable ACU-T access security features that require a correct PIN (Personal Identification Number) to be entered before a user can make a connection and thereby gain access to the system. This section explains the two different PIN security modes (Priority Operation and Exclusive Operation) and lists how to set-up and use both of these modes.

3.6.1 How PIN Security Works

- When PIN numbers are enabled, the ACU-T extensions may be programmed for various security levels, from 0 to 9. An extension set to security level 0 is available to all system users, without regard to PIN numbers. The ACU-T will not ask the user to input a PIN when a connection is requested to an extension set to security level 0.

- When PIN numbers are entered into the ACU-T database, they are assigned a security level. This security level corresponds to the extension security levels and identifies which extensions can be accessed via the PIN number.

- When a user tries to connect to a secure extension (an extension that has a security level above 0) he will be prompted "ENTER ID". The user must enter his PIN at this time. If the security level of the PIN is not correct to provide access, the "SECURITY VIOLATION" voice prompt will be heard, and the connection will not be made. If the security level is correct, the connection will be allowed and the ACU-T will make the requested connection; when successful, the normal prompt will be heard: "*n n CONNECTED*", where n is the requested extension number.

Raytheon
JPS Communications

3.6.2 PIN Security Modes

There are two modes of security operation, Priority and Exclusive. The two modes are independent of each other; the ACU-T is in either the Priority mode, or the Exclusive mode. It is not allowed to have some modules in the ACU-T set to Priority, and some set to Exclusive.

3.6.2.1 Priority Operation Mode

Access is granted if the PIN security level is equal to or higher than the security level of the extension. Higher security levels are more secure; a PIN at security level 6 can access any extension set to level 6 and lower, but may not access extensions set at security levels 7, 8, or 9.

3.6.2.2 Exclusive Operation Mode

Access is granted only if the PIN security level is equal to the security level of the extension to which the user is requesting to be connected. A PIN at security level 6 will allow the user to make a connection with an extension slot set to level 6, but not to any extension slot with security levels from 1 to 5 or 7 to 9. Remember also that access to extensions set to security level 0 does not require PIN numbers.

3.6.3 How to enable PIN Security

- Enter "SETUP MODE" * 9 9.

- To enable Priority Mode PIN numbers enter * 2 9 1, and listen for the "*READY*" prompt. To instead enable Exclusive Mode PIN numbers enter * 2 9 2.

- To disable PIN numbers (either mode) enter * 2 9 0, and listen for the "READY" prompt.

- To save the configuration enter * #, and listen for prompt "SAVING CONFIGURATION", followed by "CONFIGURATION HAS BEEN SAVED" after the ACU-T has completed storing all system parameters.

3.6.4 How to Set ACU-T Security Levels

- Enter "SETUP MODE" by pressing * 9 9.

- Select the extension to be programmed. For example, to program the module at extension 05 enter * 0 1 0 5, and listen for the "READY" prompt.

- Now enter the security level * 3 2 n, where n is the level from 0 to 9. The higher the number the more secure. Listen for the "READY" prompt. For example: to set a security level of five, enter the command * 3 2 5.

- Repeat the two previous steps as often as necessary to assign security levels to any remaining extensions that should have a security level higher than the default level 0.

To save the configuration enter * # and listen for prompt "SAVING CONFIGURATION", followed by "CONFIGURATION HAS BEEN SAVED".

3.6.5 How to Input PIN Numbers into the ACU-T Database

- Enter the "SETUP MODE" by entering * 9 9.

- PIN numbers are entered into a database for the ACU-T globally; therefore, it is not necessary to select a particular extension.

- Enter the "Program PIN" command * 3 0 n n n n x, where n n n n is the four digit pin and x is the desired security level of the PIN from 0 to 9. Example: if the PIN chosen is 1234 and the associated security level desired is 8, enter the command * 3 0 1234 8 and listen for the "READY" prompt.

- Repeat the previous step as necessary to input all PIN numbers to be used by the system.

- To save the configuration enter * #, and listen for prompt "SAVING CONFIGURATION', followed by "CONFIGURATION HAS BEEN SAVED".

Raytheon
JPS Communications

3.6.6 How to Delete PIN Numbers from the Database

- Enter "SETUP MODE" with * 9 9.

- Enter the DELETE PIN command * 3 1 n n n n, where n n n n is the four digit number of the PIN to be deleted.

To save configuration enter * #, listen for prompt "SAVING CONFIGURATION", followed by "CONFIGURATION HAS BEEN SAVED".

3.6.7 How To Use The Pin Security Feature

- Input security levels for each of the ACU-T extensions. If a security level is not entered, that extension will have the factory default of 0 (see Section 3.6.4 above).

- Input PIN numbers into the database (see Section 0 above).

- Enable PIN security in either the Exclusive or the Priority mode (see Section 3.6.2 above).

- PIN security will now be functioning. Users without correct PIN numbers will not be able to access any extension that has a security level above 0.

3.7 ACU-T Operation

Basic operation and control of the ACU-T are discussed in the following paragraphs. These instructions assume the ACU-T has already been correctly configured per Section 2. Scenarios assume most configuration options are at default settings. If not, there may be some changes in how the scenarios progress .

3.7.1 Unit Power-Up

Prior to initial power-up, ensure the ACU-T has proper power applied, either by a fully charged +12 VDC battery or by using the AC to DC power module provided. This will be indicated by LED indication at the top of the module by either the Power On LED or Charger On LED. The ACU-T will run internal start-up tests, ensure all modules installed have correct revision software installed, and then begin operation. If incorrect revision software is detected in any one of the modules installed, the module's front panel LEDs will flash from bottom to top.

Raytheon
JPS Communications
3.7.2 Basic Operation Scenarios
Refer to Figure 3-1 when studying the following operational scenarios.
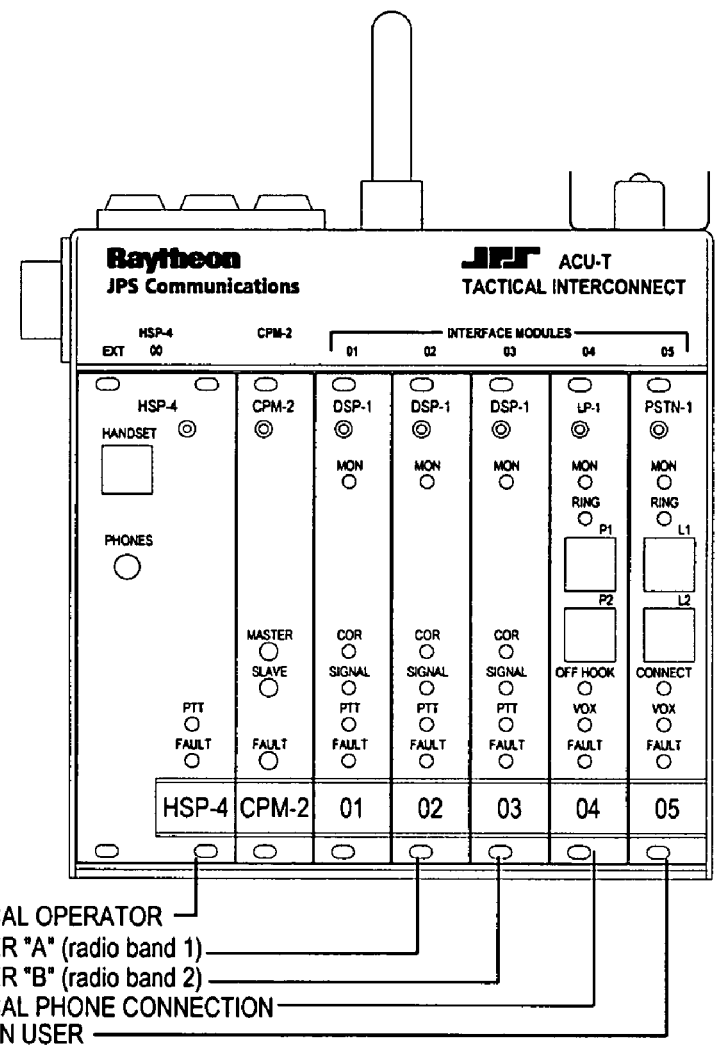
Figure 3-1    Pictorial Layout for Operating Scenarios

3.7.2.1 Radio to Radio

3.7.2.1.1 Conditions:

1) User A (with hand held radio on band 1) wants to talk to hand-held radio user B who is operating on band 2.

2) User B's radio is not busy. The radio connected to Extension Slot 03 is not currently in use.

3.7.2.1.2 Operation Steps:

1) User of hand-held radio A enters * 0 3 to establish a connection with the User B's radio which is associated to the DSP module at extension 03.

2) The ACU-T enables the connection between the two radios and issues a voice prompt indicating the connection has been successfully completed. The System Connection Status Display indicates the net as shown in Figure 3-2.

3) Users A and B are now free to talk. At end of conversation, *either* user can terminate the link by entering * #.

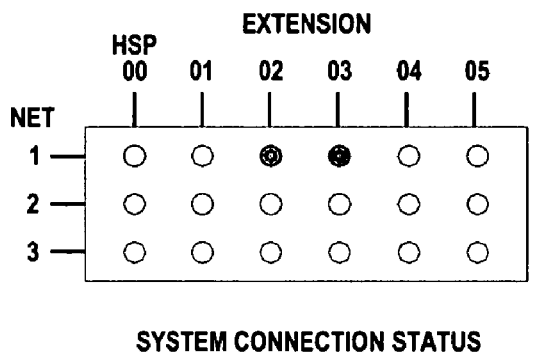

SYSTEM CONNECTION STATUS

*Figure 3-2     Connection Status #1*

Raytheon
JPS Communications

3.7.2.2 PSTN to Radio

3.7.2.2.1 Conditions:
1) PSTN user wants to talk to hand-held radio User A.
2) User A's radio is not busy.

3.7.2.2.2 Operation Steps:
1) PSTN user calling from distant phone via the public telephone network dials the phone number associated with the ACU-T's PSTN-1 module.

2) ACU-T greets the PSTN caller and prompts him to enter the "star" and two-digit number of the extension that caller would like to converse with. In our example, User A resides at extension 02, so PSTN caller enters * 0 2.

3) The ACU-T enables the connection to the radio and issues the voice prompt "02 CONNECTED" to the PSTN caller indicating the connection has been successfully completed.

4) PSTN caller and User A talk. At end of conversation, either user can terminate the link by entering * #. In links involving more than two modules, all users should terminate the link by using * #.

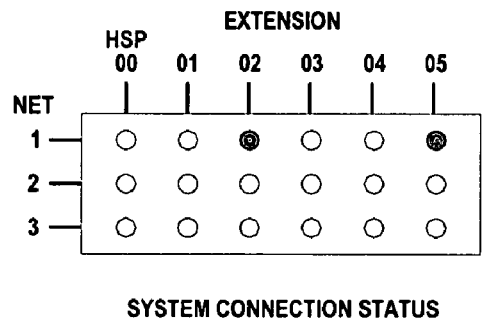

SYSTEM CONNECTION STATUS

Figure 3-3    Connection Status #2

3.7.2.3 Local Operator to Radio

3.7.2.3.1 Conditions:
1) Local operator wants to talk over band 1 to hand-held radio User A.
2) User A's radio is not busy.

3.7.2.3.2 Operation Steps:
1) The Local Operator (using HSP-4 handset and keypad) enters * 0 2 to link with User A.
2) The ACU-T makes the connection between the local operator and the band 1 radio, then issues the voice prompt "02 CONNECTED".
3) Local operator and User A talk. At end of conversation, either user can terminate the link by entering * #. Note: In links involving more than two modules, a users who enters * # only removes himself from the link.

3.7.2.4 Radio to Local Operator

3.7.2.4.1 Conditions:
1) Hand-held radio User A wants to talk to local operator at the ACU-T.

3.7.2.4.2 Operation Steps:
1) The Local Operator Extension number is '00', so hand-held radio User A enters * 0 0 on his DTMF keypad.
2) The ACU-T enables the connection between the radio the local operator and issues the "00 CONNECTED" voice prompt to User A, indicating the connection has been successfully completed.
3) User A can be heard at the HSP-4 speaker and handset. User A and local operator talk. At end of conversation, either user can terminate the link by entering * #.

The System Connection Status Display as shown below is the same whether the call is initiated by the radio user or by the local operator.

Raytheon
JPS Communications
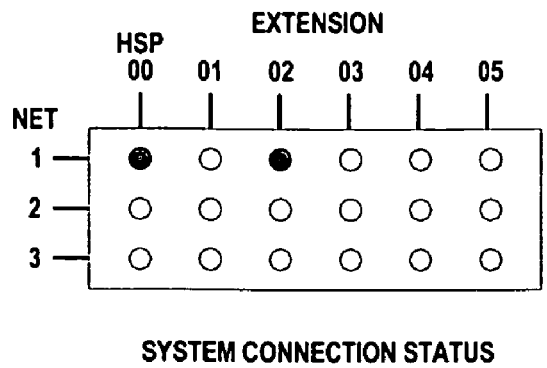
Figure 3-4    Connection Status #3

3.7.2.5 Radio to PSTN

3.7.2.5.1 Conditions:
1) Hand-held radio User A wants to be connected to PSTN and make call to 555-1234.
2) PSTN module is not busy, and phone at 555-1234 is not busy.

3.7.2.5.2 Operation Steps:
1) PSTN-1 Module Extension number is '05', so User A enters * 0 5 on keypad.
2) The ACU-T prompts the user A to *"ENTER PHONE NUMBER"*.

> NOTE: All phone number entries must be terminated by the # key, so the ACU-T can determine the end of the number.

3) User enters 5 5 5 1 2 1 2 #, and the ACU-T PSTN-1 module initiates the call. Prompts advise User A of the progress in making the call. When the link is established, the phone at 555-1212 rings.
4) User A and the person he's called on telephone now talk. At end of conversation, *either* user can terminate the link by entering * #. In links involving more than two modules, all users should terminate the link by using * #.

> NOTE: If no one answers the telephone, the attempt to connect will be terminated when the set Ringing Time expires (Factory default setting is 30 seconds).

Raytheon
JPS Communications

3.7.2.6 Local Phone to Radio

3.7.2.6.1 Conditions:

1) Local Phone user wants to talk to hand-held radio User B.
2) User B's radio is not busy.

3.7.2.6.2 Operation Steps:

1) Local Phone user picks up handset and hears dial tone. User B resides at extension 03, so Local Phone user enters * 0 3.

2) The ACU-T enables the connection to the radio and issues the "03 CONNECTED" voice prompt to the Local Phone user.

3) Local Phone User and User B talk. At end of the conversation, either user can terminate the link by entering * #.

The figure below shows the System Connection Status display during this conversation.

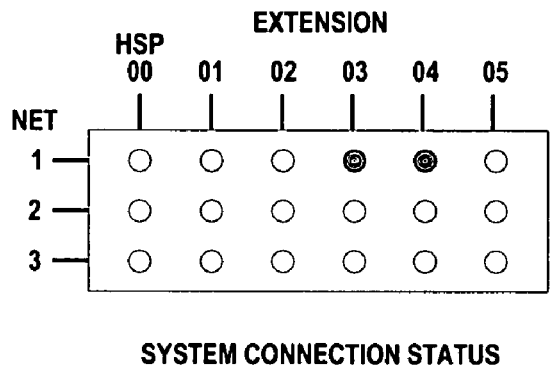

SYSTEM CONNECTION STATUS

*Figure 3-5    Connection Status #4*

3.7.2.7 Conference Call

3.7.2.7.1 Conditions:

1) Local Operator has already established a conversation with hand-held radio user A (see Section 3.7.2.3). He now wants to turn the conversation into a conference call with a third party located at telephone number 555-1234.

2) PSTN module is not busy, and phone at 555-1234 is not busy.

3.7.2.7.2 Operation Steps:

a) PSTN-1 Module Extension is '05', so local operator enters * 0 5 on the HSP-4's keypad on the top panel of the ACU-T.

b) The ACU-T then prompts the local operator to "ENTER PHONE NUMBER". Note: all phone number entries must be terminated by the # key, so the ACU-T can determine the end of the number.

c) Local operator enters 5 5 5 1 2 3 4 #, and the ACU-T PSTN-1 module initiates the call. Prompts are given to the local operator advising him of the progress in making the call. (For example if the line is busy or there is no answer, the caller is informed.) When the link is established, ACU-T sends ringback audio to Local Operator and User A until the phone is answered.

d) All users can now converse & be heard.

e) Additional parties can be added to the call if required.

f) Any user can terminate his connection to the link by entering * #; all other connections will be maintained. When only two parties remain in the conference call, and either of these users enter * #, the link will be terminated.

Raytheon
JPS Communications
The figure below shows the System Connection Status display during this conversation, assuming that the previous interconnection between User B and the Local Phone User at extension 04 has not yet been terminated.
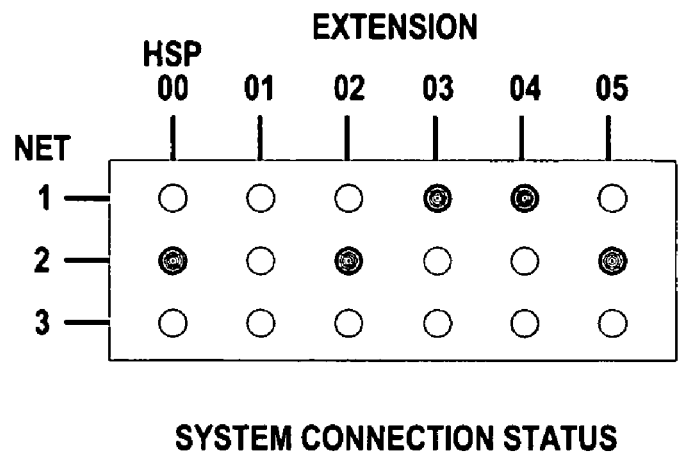
SYSTEM CONNECTION STATUS

3.8 SERIAL Remote Control (RS-232)

The ACU-T may be controlled and monitored remotely via its RS-232 interface. JPS offers the ACU Controller software that runs under Windows 95/98, NT, or XP on a PC and controls the ACU-T system. The software is the easiest way to check and modify module setups. This software is currently supplied free of charge with new systems; an upgrade kit can be ordered to use the ACU Controller with older systems that were shipped prior to its completion. Consult JPS for details regarding the purchase of an ACU Controller upgrade kit or for RS-232 protocol information if you wish to create your own remote control application.

3.9 Removal and Replacement of Modules

The ACU-T Modules can be "Hot-Plugged"; they can be removed and inserted while the unit's main power is on without resulting in damage. If a module that is presently communicating with a second module is removed, that link will be lost. If the CPM-2 module is removed, all system operation ceases and the new CPM-2 module must be reconfigured. The CPM-2 will not be damaged by the Hot Swapping process; however, the power must then be turned on and off to reboot the CPM-2. Therefore, it is advised to turn the power off when replacing the CPM-2.

Raytheon
JPS Communications

*End of Section 3*

4 ACU-T Technical Information

4.1 Scope

This section contains technical information for the ACU-T system and its various plug-in modules. Specifications and block diagrams are provided for each of the interface modules. This information is intended to provide a basic understanding of each module to allow troubleshooting to the module level and to allow the development of applications for the ACU-T.

4.2 General Description

JPS' ACU-T system is the "tactical" version of the ACU-1000. It's a transportable, modular interface/interconnect system packaged in a Eurocard chassis modified for improved protection from the elements. With this product, an intelligent interconnect system can be configured to meet almost any interface application involving telephones and radios of any sort. The ACU-T system is suitable for HF, LMR, Nextel, and Satcom systems and offers essentially unlimited applications and expandability. A system consists of a chassis, backplane, top panel, modules, module software and system control software.

4.3 Card Cage and Backplane

The Card Cage is a 6.25" wide transportable Eurocard cage equipped with a backplane board that the modules are plugged into. A DC input module and battery power system is located at the back of the module. The DC module is a combination DC line filter, power cable connector, input voltage selector and fuse holder. The backplane interfaces the outside world via circular plastic CPC connectors, and internally to the plug-in modules via 60-pin card edge connectors. No active or passive electrical components reside on the backplane board.

Raytheon
JPS Communications

4.4 CPM-2 Control Processor Module

The ACU-T Control Processor Module has an 80186 processor with one MB of flash EPROM that stores the operating software for the ACU and controls the entire chassis via an internal high-speed serial bus. It requests and receives status and information from each module and sends commands to each module, and instructs modules to connect to one or more of the sixteen audio buses on the ACU backplane. The CPM provides an RS-232 serial port allowing programming and monitoring of all ACU-T functions via an external computer or serially interfaced console. The front panel of the CPM Module contains a Fault LED, along with Master and Slave LEDs that indicate the unit's status in an expanded system.

Raytheon
JPS Communications

4.5 HSP-4 Handset/Speaker Module

4.5.1 General Description HSP-4

The HSP-4 Module provides a means to locally monitor, configure and control an ACU-T system. The user can monitor audio via an internal speaker, plug in external headphones, or use the handset that comes with the HSP-4. The handset includes a PTT switch so the user can key an associated radio from the HSP-4. Module control and configuration is via a 3x4 keypad on the top panel (standard telephone layout) that enables the user to select a module in the system and enter control/configuration data. For example, if the system contains a PSTN-1 module, the user may place telephone calls manually using the HSP-4 keypad and handset.

In addition to the front-panel handset and phones jacks, the HSP-4 has an audio line (0 dBm nominal) input and output, and external microphone input and external speaker output. There are three uncommitted auxiliary parallel inputs and three uncommitted auxiliary parallel outputs.

Raytheon
JPS Communications

4.5.2 Block Diagram Description HSP-4

(Refer to )

The HSP-4 contains its own microprocessor that performs all the local control of the module. It communicates with the system's CPM-2 module over the control and data buses on the main chassis backplane via I/O latches and drivers U14 through U17. The microprocessor referred to in this description is the local one on the HSP-4 module.

The HSP-4 houses a plug-in voice prompt generator board, which receives its instructions from the system CPM-2 via the microprocessor on the HSP-4 board. The voice prompt generator routes its prompts audio over one of the system audio buses via audio gates U14 through U17.

Another function of the HSP-4 module is to connect four-wire speaker and microphone audio to the 16-line audio bus structure on the ACU main chassis backplane board. Microphone audio is routed to the audio buses by audio gates U1 through U4, and speaker audio is brought in from the audio buses by audio gates U5 through U8. These audio gates are controlled directly by audio bus latches U19 through U22, which receive their instructions directly from the microprocessor on the HSP-4. The microprocessor, in turn, receives its instructions from the system CPM-2 module via I/O latches and drivers U16 through U18. Thus, the connections to and from any audio bus are controlled ultimately by the CPM-2 module, which decides which buses to assign to the HSP-4 module depending on a number of system parameters. The CPM-2 passes connect information to the HSP-4 microprocessor, which controls the audio gates.

Audio from an interconnected interface module is picked off of the ACU-T backplane and inserted on one of the HSP-4 audio buses. Next, it's routed to the speaker output through amplifier U10A then through speaker driver U11, where the output volume is set by pot R72. Monitor output audio is routed to the back panel connector via amplifier U10B at a fixed zero dBm level. Microphone audio is routed through preamp U12A, through an AGC circuit, then through amplifier U14B onto an audio bus through audio gates U1 through U4. A line-level audio input is mixed into the input of U14B.

Raytheon
JPS Communications

The /AuxO1, /AuxO2, and /AuxO3 digital outputs are generated by transistors Q1, Q2 and Q3 which are driven by the microprocessor. Digital inputs /AuxI1, /AuxI2, and /AuxI3 are routed to gates U44C, U44D, and U44E, which are read by the microprocessor.

The top-panel mounted keypad, interfaced to the HSP-4 microprocessor allows the user to enter system commands and programming parameters. The microprocessor then formats the keypad data and sends it to the system's CPM-2 for action.

Raytheon
JPS Communications

4.5.3 HSP-4 Specifications

| Table 4-1 HSP-4 Specifications ||
|---|---|
| Telephone Handset / Keypad | |
| Microphone/Handset Interface | ALC (Automatic Level Control) with 30 dB dynamic range. |
| Handset | Electret microphone, dynamic receiver, PTT switch. |
| Headphone Interface | Drives high, medium, or low impedance headphones. Delivers NLT 10mW into 600-Ohm headphones. |
| Dialing Modes | DTMF or Pulse at 10 or 20 pps. |
| Dialing and Programming Keypad (Top Panel Mounted) | 3x4, Standard Telephone Layout. |
| Audio Line Input / Output | |
| Input Impedance | Unbalanced 15k Ohms. |
| Input Level | 0 dBm nominal (not adjustable). |
| Output Impedance | Unbalanced 600 Ohms. |
| Output Level | 0 dBm fixed into 600 Ohms nominal. |
| Digital Inputs (/AUXI1, /AUXI 2, /AUXI 3) | |
| Standard Polarity | Active Low. |
| Threshold | 2.5V nominal. |
| Input Impedance | 47k Ohms to +5V. |
| Protection | ±100V. |

| Digital Outputs (/AUXO1, /AUXO2, /AUX O3) | |
|---|---|
| Standard Polarity | Active Low. |
| Type | Open Drain, weak pullup 47kΩ to +5V. |
| Maximum Voltage | +60V. |
| On Resistance | 5 Ohms, nominal. |
| Maximum Current Sink | 50 mA. |
| Voice Prompts | Capable of up to 255 voice prompts, as needed. |
| General | |
| Distortion | Less than 0.5%. |
| Noise Floor | -65 dBm. |
| Frequency Response | 100 to 3200 Hz, ±2 dB. |
| Speaker Driver Power | 0.5W min @ 10% Distortion. |
| Internal Speaker (Top Mounted) | 3.5-inch square, 3.2 Ohms |
| Top Panel Controls | Volume, Spkr On/Off, 3x4 Keypad. |
| Front Panel Indicators | PTT and Fault LEDs. |
| Front Panel Connectors | Phones: 1/8" stereo jack, Handset: RJ-12C Jack. |
| Audio Line Connections | J0 CPC Connector on side of ACU-T. |
| Rear | 60 Pin PC edge connector for backplane. |
| Input Power | +12V, +Bus Voltage supplied by the backplane. |
| Size | 16 HP-Wide Eurocard Module: 5"H x 1.6"W x 9"D. |
| Weight | 1.0 lb. (0.5kg). |

Raytheon
JPS Communications

4.6 DSP-1 Module

4.6.1 General Description DSP-1

The DSP-1 module is a 4-wire interface module used to interface radios and other 4-wire devices. It contains three types of COR sensing: hardwired signal, VMR, and VOX. It offers a DSP noise reduction mode. Its VMR and noise reduction capability make it an ideal interface for HF radios.

4.6.2 Block Diagram Description DSP-1

(Refer to )

The DSP-1 contains a DSP processor that performs all of the local control of the module. It communicates with the system's CPM-2 module over the control and data buses on the main chassis backplane via I/O latches and drivers U14 through U17.

One function of the DSP-1 module is to connect four-wire transmit and receive audio to the 16-line audio bus structure on the ACU main chassis backplane board. Receive audio is routed to the audio buses by audio gates U1 through U4, and transmit audio is brought in from the audio buses by audio gates U5 through U8. These audio gates are controlled directly by audio bus latches U10 through U13, which receive their instructions directly from the DSP processor on the DSP-1. The DSP-1, in turn, receives its instructions from the CPM-2 module in the system via I/O latches and drivers U14 through U17. Thus, the connections to and from any audio bus are controlled ultimately by the CPM-2 module, which decides which buses to assign to the DSP-1 module depending on a number of system parameters. The CPM-2 passes connect information to the DSP processor on the DSP-1, which controls the audio gates.

Raytheon
JPS Communications

Audio from an audio bus is routed to the transmit output through amplifier U10A then through amplifier U10B, where the output level is set by digital pot U13. Receive audio in is routed through amplifier U11A then through amplifier U11B, which is gain-controlled by digital pot U13 and into the DSP A/D input. The DSP-1 processes the audio and outputs its signal onto an audio bus through audio gates U1 through U4. The DSP processor also runs a DTMF receiver, which decodes the DTMF digits that may come in from a receiver and passes them digitally on to the system's CPM-2 for processing. Under instructions from the CPM-2, the DSP-1 generates DTMF signals, which are routed to the transmit output through amplifier U10B.

The /PTT, /AuxO1, and /AuxO2 digital outputs are generated by transistors Q1, Q2 and Q4 which are driven by the DSP. Digital inputs /COR, /AuxI1 and /AuxI2 are routed to gates U24A, U24B, and U24D, which are read by the DSP.

An RS-232 interface chip, U25, changes RS-232 voltage levels into TTL voltage levels for processing by the DSP module (not supported in current software).

Raytheon
JPS Communications

4.6.3 DSP-1 Specifications

| Table 4-3 | DSP-1 Specifications |
|---|---|
| RX Audio Input | |
| Input Impedance | Balanced /Unbalanced 600 Ω; Unbalanced 47kΩ. |
| Input Level | -26 to +12 dBm, programmable. |
| Frequency Response | 100 Hz to 3200 Hz ±2 dB. |
| TX Audio Output | |
| Output Impedance | Balanced or Unbalanced 600Ω. |
| Output Level | -26 to +12 dBm, programmable. |
| Frequency Response | 100 Hz to 3200 Hz ± 2dB. |
| Distortion | Less than 0.5%. |
| Noise Floor | -65 dBm. |
| VOX/VMR | |
| VOX/VMR Thresholds | Low, MED1, MED2, High; Programmable. |
| VOX Hangtime | 175 ms to 1.575 sec; Programmable in 200 ms steps. |
| VMR Hangtime | 775 ms to 1.575 sec; Programmable in 200 ms steps. |
| Audio Delay, VOX and COR Modes | 20 ms to 300 ms; Programmable in 40 ms steps. |
| Audio Delay, VMR Mode | 220, 260, or 300 ms; Programmable. |
| Transmit Key Tones | None, 1950 Hz, or EIA keying sequence; Programmable. |
| Equalizer | |
| Cut Settings at 3 kHz | 5 dB, 3.5 dB, 2dB, 0 dB; Programmable. |
| Boost Settings at 3 kHz | 5 dB, 3.5 dB, 2 dB, 0 dB; Programmable. |
| Time Domain DSP Noise Reduction | Eight programmable levels. |
| Digital Inputs | |
| COR Input Polarity | Active Low or Active High, Programmable. |

| Table 4-3 | DSP-1 Specifications |
|---|---|
| AUX Inputs Polarity | Active Low. |
| Threshold | 2.5V nominal. |
| Input Impedance | 47kΩ to +5V. |
| Protection | ±100V. |
| Digital Outputs | |
| Standard Polarity | Active Low. |
| Type | Open Drain, weak pull-up 47kΩ to +5V. |
| Maximum Voltage | +60V. |
| On Resistance | 5 Ω nominal. |
| Maximum Current Sink | 50 mA. |
| General | |
| Front Panel | Monitor, Signal, COR, PTT, and Fault LEDs. |
| Rear | 60 Pin PC edge connector for backplane. |
| Audio Line Connections | J1 to J5 CPC Connectors on side of ACU-T. |
| Input Power | ±12V, +Bus Voltage supplied by the backplane. |
| Size | 5"H x 0.8"W x 9"D. |
| Weight | 1lb. (0.5kg). |

Raytheon
JPS Communications

4.7 PSTN-1 Module

4.7.1 General Description PSTN-1

The PSTN Module is the 2-wire interface between the ACU system and a telephone system (as opposed to a telephone set). A telephone system is an entity that accepts dialing information and processes calls, such as a PSTN line, PABX line, Inmarsat Terminal, or cellular phone. (A telephone set is a device that generates dialing information. It is interfaced to the ACU system via the LP-1 Module.) The PSTN-1 contains one 4-wire port for interfacing to 4-wire phone lines or other devices, and two 2-wire ports with front-panel RJ-11C jacks for interfacing with PSTN lines or satellite equipment. The module contains ring detect circuitry. The interface signal levels are programmable via the HSP-4 module.

The module has a DSP hybrid and VOX with programmable sensitivity and hangtime. It has a DTMF receiver/generator for control and call progress recognition. There are two uncommitted auxiliary parallel inputs and two uncommitted auxiliary parallel outputs. The two 2-wire ports are permanently connected to front-panel RJ-11C jacks, but may be routed to the backplane connector by means of internal jumpers. The side panel connections are useful when no front-panel connections are wanted in a system.

4.7.2 Block Diagram Description PSTN-1

(Refer to )

The PSTN-1 contains its own small, plug-in DSP module that does all of the local control of the PSTN-1 module as well as running hybrid, call progress, and DTMF algorithms. It communicates with the system's CPM-2 module over the control and data buses on the main chassis backplane via I/O latches and drivers U14 through U17. In the following description, the DSP module referred to is the one located on the PSTN-1 module itself, not a DSP-1 Module in the ACU-T system.

Raytheon
JPS Communications

The function of the PSTN-1 module is to connect telephone line send tand receive audio to the 16-line audio bus structure on the ACU main chassis backplane board. Receive audio is routed to the audio buses by audio gates U1 through U4, and send audio is brought in from the audio buses by audio gates U5 through U8. These audio gates are controlled directly by audio bus latches U10 through U13, which receive their instructions directly from the DSP module on the PSTN-1. The DSP module, in turn, receives its instructions from the CPM-2 module in the system via I/O latches and drivers U14 through U17. Thus, the connections to and from any audio bus are controlled ultimately by the CPM-2 module, which decides which buses to assign to the PSTN-1 module depending on a number of system parameters. The CPM-2 passes connect information to the DSP module on the PSTN-1, which controls the audio gates.

Audio from an audio bus is routed to the telephone line through amplifier U20A, where DTMF signals generated by the DSP module are mixed in, then routed through amplifier U20B, where the output level is set by gates U22, which are controlled by the DSP module. The four-wire output is driven by amplifier U24A, whose output level is set by the gain of U20B. Audio in from the telephone line is routed through amplifier U21B, which is gain-controlled by gates U25 (controlled by the DSP module) and into the DSP module A/D input. Four-wire input audio is routed through audio gate U27B, controlled by the DSP module. The DSP module may enable either the 4W input or the telephone input, but not both at the same time. The DSP module runs an adaptive hybrid, which outputs its signal through amplifier U23B and onto an audio bus through audio gates U1 through U4. The hybrid's function is to separate the two-wire audio from the telephone line into four-wire send and receive audio paths from use by other modules in the ACU-T. The DSP module runs a DTMF receiver, which decodes the DTMF digits that may come in from the telephone line and passes them digitally on to the system's CPM-2 for processing. Under instructions from the CPM-2, the DSP module generates DTMF dialing signals, which are routed to the telephone line through amplifier U20A.

Ring voltage on the telephone line is detected by U26, which informs the DSP module that a ring is being received. The DSP module can then operate hook relay K1, which closes to seize the telephone line and create an off-hook condition. Upon receiving a ring signal, the DSP activates ring tone generator U22/U23 at the incoming ring cadence, which generates an audible ring signal using the piezo audio transducer in the PSTN-1 module.

Raytheon
JPS Communications

The /AuxO1 and /AuxO2 digital outputs are generated by transistors Q5 and Q6 which are driven by output latches U35 through U37. These latches, in turn, are driven by the DSP module. The /Aux01 and /AUX02 Digital Outputs can sink up to 50 mA. Digital inputs /AuxI1 and /AuxI2 are routed to gates U30D and U30E, which are read by the DSP module.

The Line 1 or Line 2 telephone line connections are selected by the line select relay, K2, which is operated by the DSP module under instructions from the system's CPM-2 module. The L1 line can be accessed by the HSP-4 via DTMF, and by the Console Interface Software to dial out of the system. The ACU-T will auto-answer the L1 line connection when users are dialing into the unit. The L2 line can be accessed only by the Console Interface Software to dial out, and the L2 line does not auto-answer. The telephone line connections are permanently routed to the RJ-11C connectors on the front panel, but may be routed to pins in the side panel CPC connector by means of jumpers JP1 through JP4.

4.7.3 PSTN-1 Specifications

| Table 4-5 PSTN-1 Specifications | |
|---|---|
| Telephone Line Interface | |
| 2-Wire Audio Interface | |
| Phone line Input/Output Levels | -24 to 0 dBm; Programmable in 3 dB steps. |
| Input/Output Impedance to Phone Line | 600 Ω Nominal. |
| 4-Wire Audio Input/Output | |
| Input Impedance | Unbalanced 10k Ω. |
| Input Level | Adjustable -18 to +6 dBm in 3 dB steps. |
| Output Impedance | Unbalanced 600 Ω. |
| Output Level | Adjustable -18 to +6 dBm in 3 dB steps. |
| 2-Wire and 4-Wire Interfaces | |
| Distortion | Less than 0.5%. |
| Noise Floor | -65 dBm. |
| VOX Thresholds | Four selectable VOX thresholds of 19, 16, 13, and 10 dB below input level setting. The default setting is -16 dB (-25 dBm @ -9 dBm level setting, for example). |
| VOX Hangtime | 0.5, 1.0, 1.5, or 2.0 Seconds; Programmable. |
| Hybrid Balance/Adaptation Speed | -30 dB over 300 to 3200 Hz BW within 1.25 seconds; measured with white noise source into 600 Ohms. |
| Ultimate Hybrid Balance | -50 dB typical over 300 to 3200 Hz BW; measured with a single tone into 600 Ohms. |
| Hybrid Impedance Matching Capability | 0 to infinite Ohm complex impedance. |

Raytheon
JPS Communications

| Digital Inputs (/AUXI1, /AUXI 2) | |
|---|---|
| Standard Polarity | Active Low. |
| Threshold | 2.5V nominal. |
| Input Impedance | 47kΩ to +5V. |
| Protection | ±100V. |
| Digital Outputs (/AUXO1, /AUXO2) | |
| Standard Polarity | Active Low. |
| Type | Open Drain, weak pull-up 47kΩ to +5V. |
| Maximum Voltage | +60V. |
| On Resistance | 5 Ω nominal. |
| Maximum Current Sink | 50 mA. |
| General | |
| Front Panel | Monitor, Ring, Connect, VOX, and Fault LEDs. |
| Rear | 60 Pin PC edge connector for backplane. |
| Input Power | +12V, +Bus Voltage supplied by the backplane. |
| Size | 4HP-Wide Eurocard Module: 5"H x 0.8"W x 9"D. |
| Weight | 1.0 lb. (0.5kg). |

4.8 LP-1 Module

4.8.1 General Description LP-1

The Local Phone Module is the interface to the ACU system for 2-wire devices that generate dialing information such as a standard telephone set or FAX machine. This module contains a loop current generator, ring voltage generator, dial and busy tone generators, a DSP hybrid with VOX and a DTMF generator/receiver.

4.8.2 Block Diagram Description LP-1

(Refer to )

The LP-1 contains its own small, plug-in DSP module that does all of the local control of the LP-1 module as well as running hybrid, call progress, and DTMF algorithms. It communicates with the system's CPM-2 module over the control and data buses on the main chassis backplane via I/O latches and drivers U14 through U17. In the following description, the DSP module referred to is the one located on the LP-1 module itself, not a DSP-1 Module in the ACU-T system.

The function of the LP-1 module is to connect telephone set send and receive audio to the 16-line audio bus structure on the ACU main chassis backplane board. Receive audio is routed to the audio buses by audio gates U1 through U4, and sendaudio is brought in from the audio buses by audio gates U5 through U8. These audio gates are controlled directly by audio bus latches U10 through U13, which receive their instructions directly from the DSP module on the LP-1. The DSP module, in turn, receives its instructions from the CPM-2 module in the system via I/O latches and drivers U14 through U17. Thus, the connections to and from any audio bus are controlled entirely by the CPM-2 module, which decides which buses to assign to the LP-1 module depending on a number of system parameters. The CPM-2 passes connect information to the DSP module, which controls the audio gates.

Raytheon
JPS Communications

Audio from an audio bus is routed to the telephone set through amplifier U21A, where busy and dial tones generated by the DSP module are mixed in, and then routed through amplifier U21B, where the output level is set with jumper JP2. Audio in from the telephone set is routed through amplifier U22A, then through level set jumper JP3, enable jumper JP7, through amplifier U23B into the DSP module. Four-wire input audio is routed through level set jumper JP4 and through enable jumper JP8. Either the 4W input or the telephone input (or both at the same time) may be enabled by jumpers JP7 and JP8. The DSP module runs an adaptive hybrid, which outputs its signal through amplifier U23A and onto an audio bus through audio gates U1 through U4. The hybrid's function is to separate the two-wire send/receive audio from the telephone set into four-wire send and receive audio paths from use by other modules in the ACU-T. The DSP module runs a DTMF receiver, which decodes the DTMF dialing digits generated by the telephone set and passes them digitally on to the system's CPM-2 for processing. Under instructions from the CPM-2, the DSP module can generate DTMF signals, which are routed to the telephone set output through amplifier U21A.

Loop current is supplied to the telephone set by loop current generator Q4, which can generate a 20 mA or 50 mA loop current depending on the setting of jumper JP5. Transistor Q3 senses loop current draw to detect an off-hook condition, and passes this information to the DSP module.

Ring voltage is generated by U20, which supplies the ring voltage to the telephone set through ring relay K1, which operates at the ring cadence rate. The ring generator is turned on and off at the proper cadence by transistor Q2, which is controlled by the DSP module. The ring generator circuit detects an off-hook condition if it occurs during a ring cycle, and passes this information to the DSP module.

The /VOX, /AuxO1, and /AuxO2 digital outputs are generated by transistors Q6, Q7, and Q8 which are driven by output latches U35 through U37. The DSP module drives these latches, in turn. Digital inputs /PTT, /AuxI1, and /AuxI2 are routed to gates U26A, U26B, and U26D, which are read by the DSP module.

The line 1 or line 2 telephone set connections are selected by the line select relay, K2, which is operated by the DSP module under instructions from the system's CPM-2 module. The telephone set connections are routed to the RJ-11C front panel connectors and to pins in the side panel CPC connector.

4.8.3 LP-1 Specifications

| Table 4-7 LP-1 Specifications | |
|---|---|
| 2-Wire Telephone Set Interface | |
| Telephone Set Input/Output Levels | Jumper-selectable to -9, -12, or -15 dBm. |
| Input/Output Impedance to Telephone Set | 600 Ω Nominal. |
| Loop Current | Jumper-selectable 20 mA or 50 mA. |
| Loop Voltage | -12V standard. |
| Ring Voltage | 20 Hz, 80V p-p square wave. |
| 4-Wire Audio Input/Output | |
| Input Impedance | Unbalanced 15kΩ or greater. |
| Input Level | Jumper-selectable to -9, -12, or -15 dBm. |
| Output Impedance | Unbalanced 0Ω. |
| Output Level | -12 dBm fixed. |
| 2-Wire and 4-Wire Interfaces | |
| Distortion | Less than 0.5%. |
| Noise Floor | -65 dBm. |
| VOX Thresholds | Off, Low, Medium, High; Programmable. |
| VOX Hangtime | 0.5, 1.0, 1.5, 2.0 sec, Programmable. |
| Hybrid Balance/Adaptation Speed | -30 dB over 300 to 3200 Hz BW within 1.25 seconds; measured with white noise source into 600 Ohms. |
| Ultimate Hybrid Balance | -50 dB typical over 300 to 3200 Hz BW; measured with a single tone into 600 Ohms. |

Raytheon
JPS Communications

| Digital Inputs (/AUXI1, /AUXI 2, /PTT) | |
|---|---|
| Standard Polarity | Active Low. |
| Threshold | 2.5V nominal. |
| Input Impedance | 47kΩ to +5V. |
| Protection | ±100V. |
| Digital Outputs (/AUXO1, /AUXO2, /VOX) | |
| Standard Polarity | Active Low. |
| Type | Open Drain, weak pull-up 47kΩ to +5V. |
| Maximum Voltage | +60V. |
| On Resistance | 5 Ω nominal. |
| Maximum Current Sink | 50 mA. |
| General | |
| Front Panel | Monitor, Ring, Off-hook, VOX, and Fault LEDs. |
| Rear | 60 Pin PC edge connector for backplane. |
| Input Power | +12V, +Bus Voltage supplied by the backplane. |
| Size | 4HP-Wide Eurocard Module: 5"H x 0.8"W x 9"D. |
| Weight | 1.0 lb. (0.5kg). |

Raytheon
JPS Communications

4.9 AP-1 Module

4.9.1 AP-1 General Description

The AP-1 module is a general-purpose 4-wire module that can provide a variety of DSP operations. Unlike other ACU-T modules, the AP-1 does not communicate with the system audio and control bus structures on the ACU-T backplane. The AP-1 is "In Series" with the audio signal that is routed through it via the associated rear panel connector. The ACU-T chassis merely provides to the AP-1s DC power and a place to reside. The DSP functions of the AP-1 can operate either on the audio and control signal coming into the ACU-T module that it is associated with it (AP-1 RX Option Assembly), or on the audio and control signal that is exiting the associated ACU-T module (AP-1 TX Option Assembly). Alternatively, the AP-1's DSP features can be used to modify signals not associated at all with the ACU-T. In this case, the customer can manufacture custom cabling to suit the application.

See Table 2-15.

Raytheon
JPS Communications

4.9.2 Block Diagram Description (Refer to )

The AP-1 contains its own DSP processor that does all of the local control of the AP-1 module. It operates alone and does not communicate with the system's CPM-2 module over the control and data buses, as do the other ACU-T modules.

The function of the AP-1 module is to connect four-wire input audio to its internal DSP processor and route processed four-wire output audio back to the outside world. The audio processing performed by the AP-1 depends on the software installed in the module. Different versions of software are available that perform a variety of specific applications. Since this software may vary from unit to unit it will not be described here.

Input audio is routed through amplifier U11A then through amplifier U11B, which is gain-controlled by potentiometer R21, and then into the DSP module A/D input. The DSP module processes the audio and outputs its signal from the D/A through amplifier U12A, U10A then through amplifier U10B, where the output level is set by pot R3.

The /AuxO1, /AuxO2, and /PTT digital outputs are generated by transistors Q1, Q2 and Q4 which are driven by the DSP module. Digital inputs /AuxI1, /AuxI2, and COR, are routed to gates U24A, U24B, and U24D, which are read by the DSP module. Transistor Q3 switches the COR input to accommodate either and active-low or active-high input signal. An RS-232 interface chip, U25, changes RS-232 voltage levels into TTL voltage levels for processing by the DSP module. This is functional only when the AP-1 contains software that utilizes RS-232 processing.

4.9.3 AP-1 Specifications

| Table 4-9 | AP-1 Specifications |
|---|---|
| RX Audio Input | |
| Input Impedance | Balanced /Unbalanced 600 Ω; Unbalanced 47kΩ. |
| Input Level | -20 to +12 dBm, adjustable. |
| Frequency Response | 100 Hz to 3200 Hz ± 2 dB. |
| TX Audio Output | |
| Output Impedance | Balanced or Unbalanced 600Ω. |
| Output Level | -26 to +5 dBm, adjustable. |
| Frequency Response | 100 Hz to 3200 Hz ±2dB. |
| Distortion | Less than 0.5%. |
| Noise Floor | -60 dBm. |
| Digital Inputs | |
| Standard Polarity | Active Low. |
| Threshold | 2.5V nominal. |
| Input Impedance | 47kΩ to +5V. |
| Protection | ±100V. |
| Digital Outputs | |
| Standard Polarity | Active Low. |
| Type | Open Drain, with weak pull-up 47kΩ to +5V. |
| Maximum Voltage | +60V. |
| On Resistance | 5 Ω nominal. |
| Maximum Current Sink | 50 mA. |
| General | |
| Front Panel | Bypass Switch & LED; PTT, Normal and Peak LEDs. |
| Rear | 60 Pin PC edge connector for backplane. |
| Input Power | ±12V; +Bus voltage supplied by the backplane. |
| Size | 5"H x 0.8"W x 9"D. |
| Weight | 1lb. (0.5kg). |

Raytheon
JPS Communications

The following pages give these block diagrams:

*Figure 4-1*     *HSP-4 Block Diagram*

*Figure 4-2*     *DSP-1 Block Diagram*

*Figure 4-3*     *PSTN-1 Block Diagram*

*Figure 4-4*     *LP-1 Block Diagram*

*Figure 4-5*     *AP-1 Block Diagram*

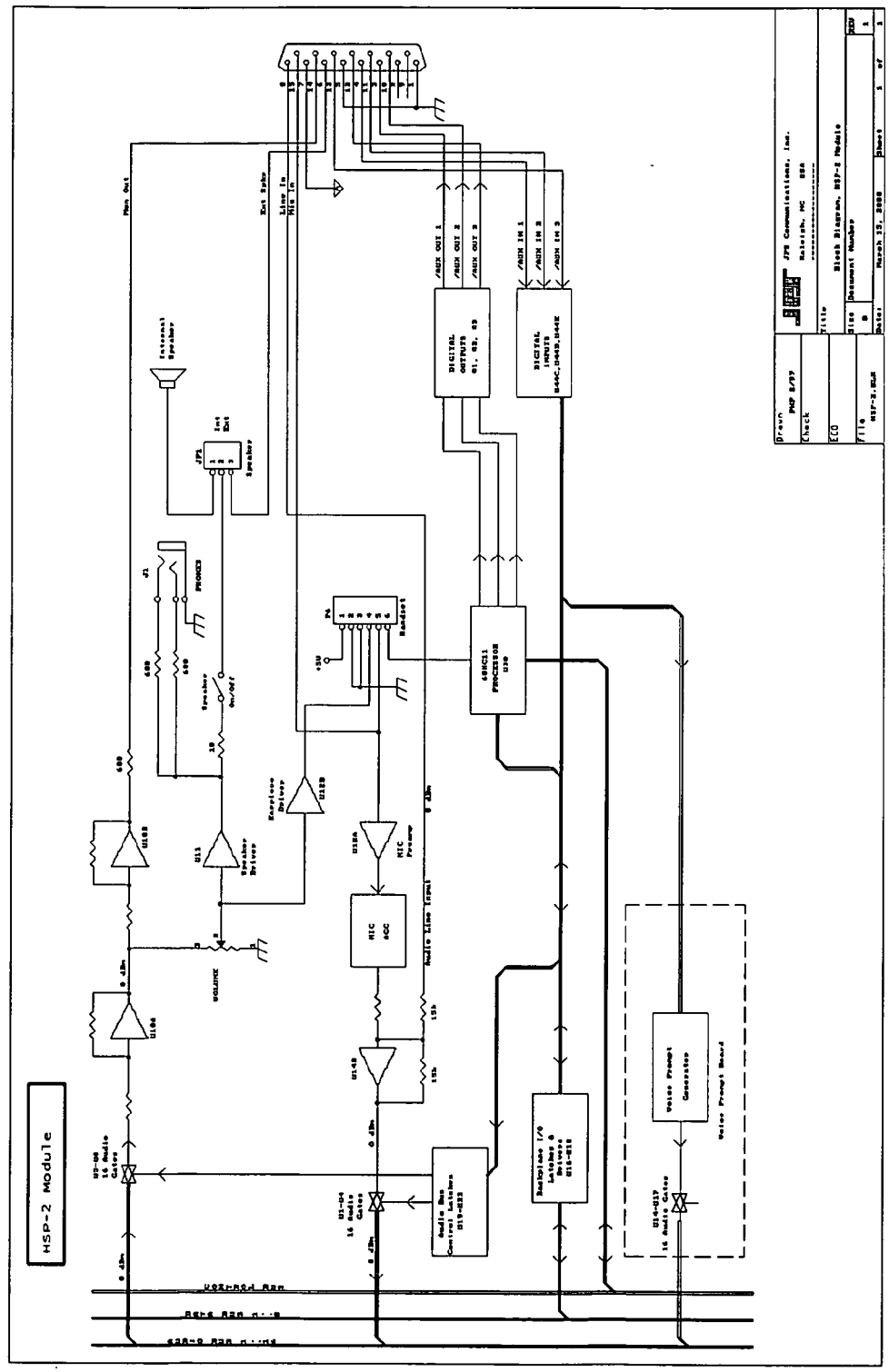

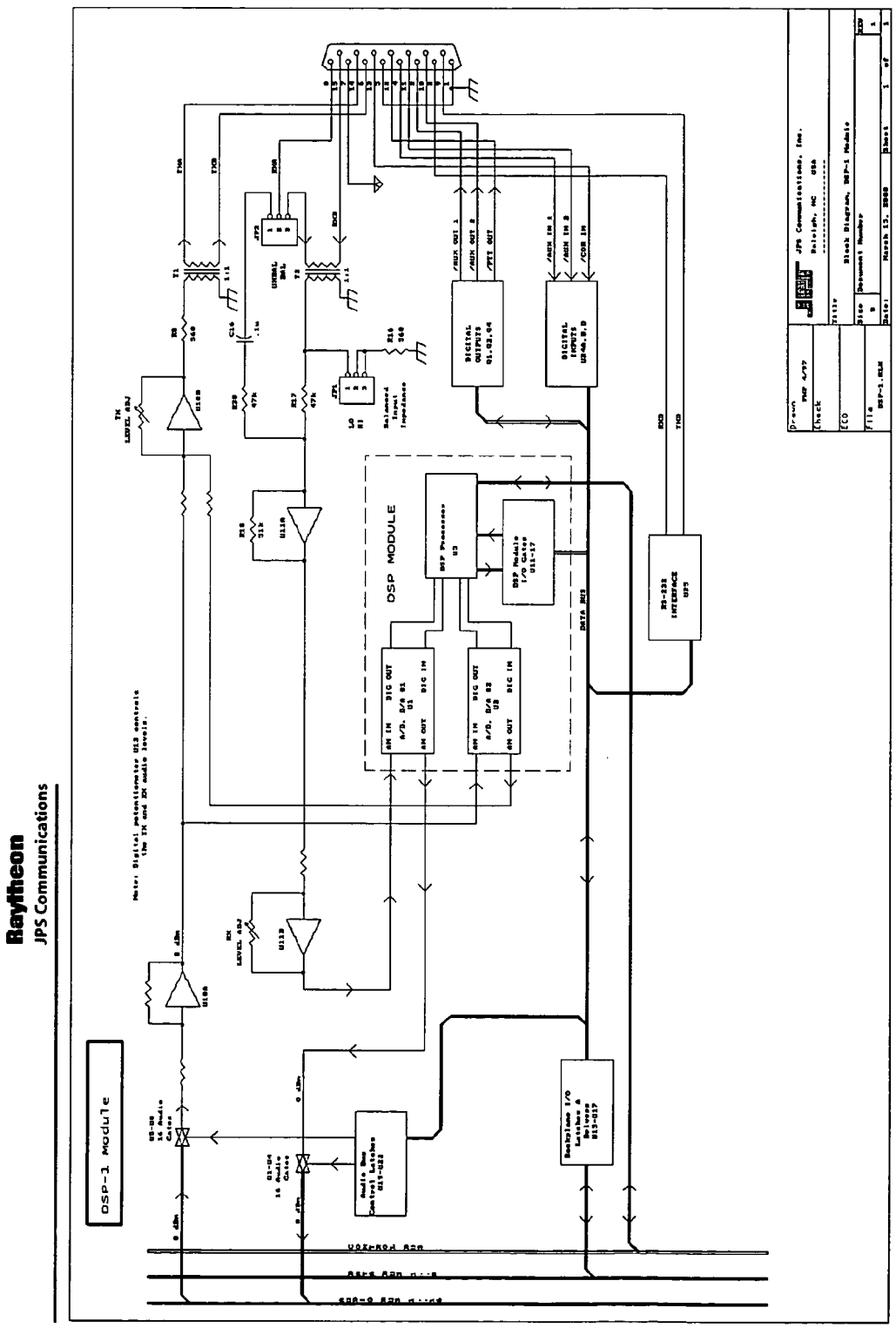

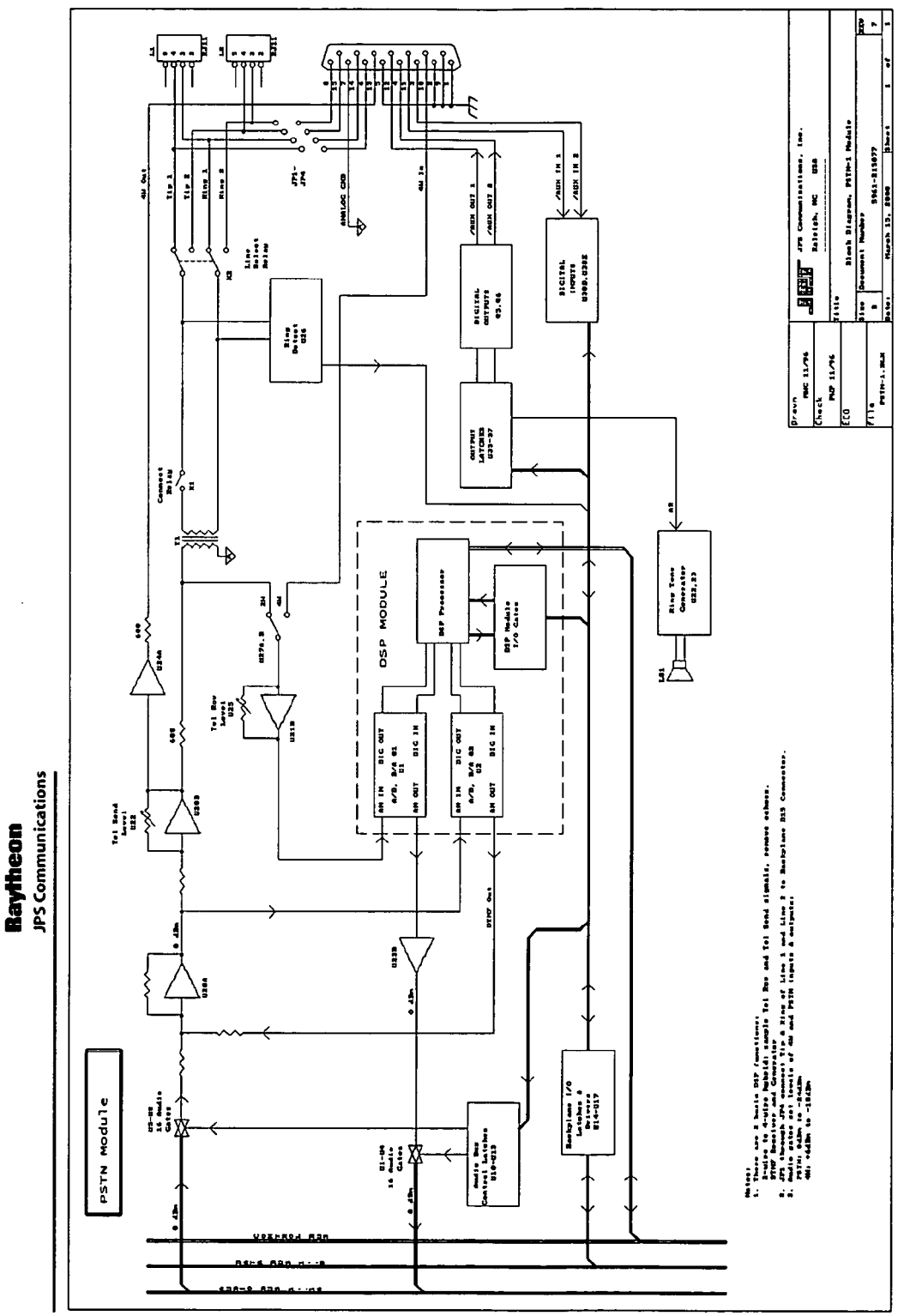

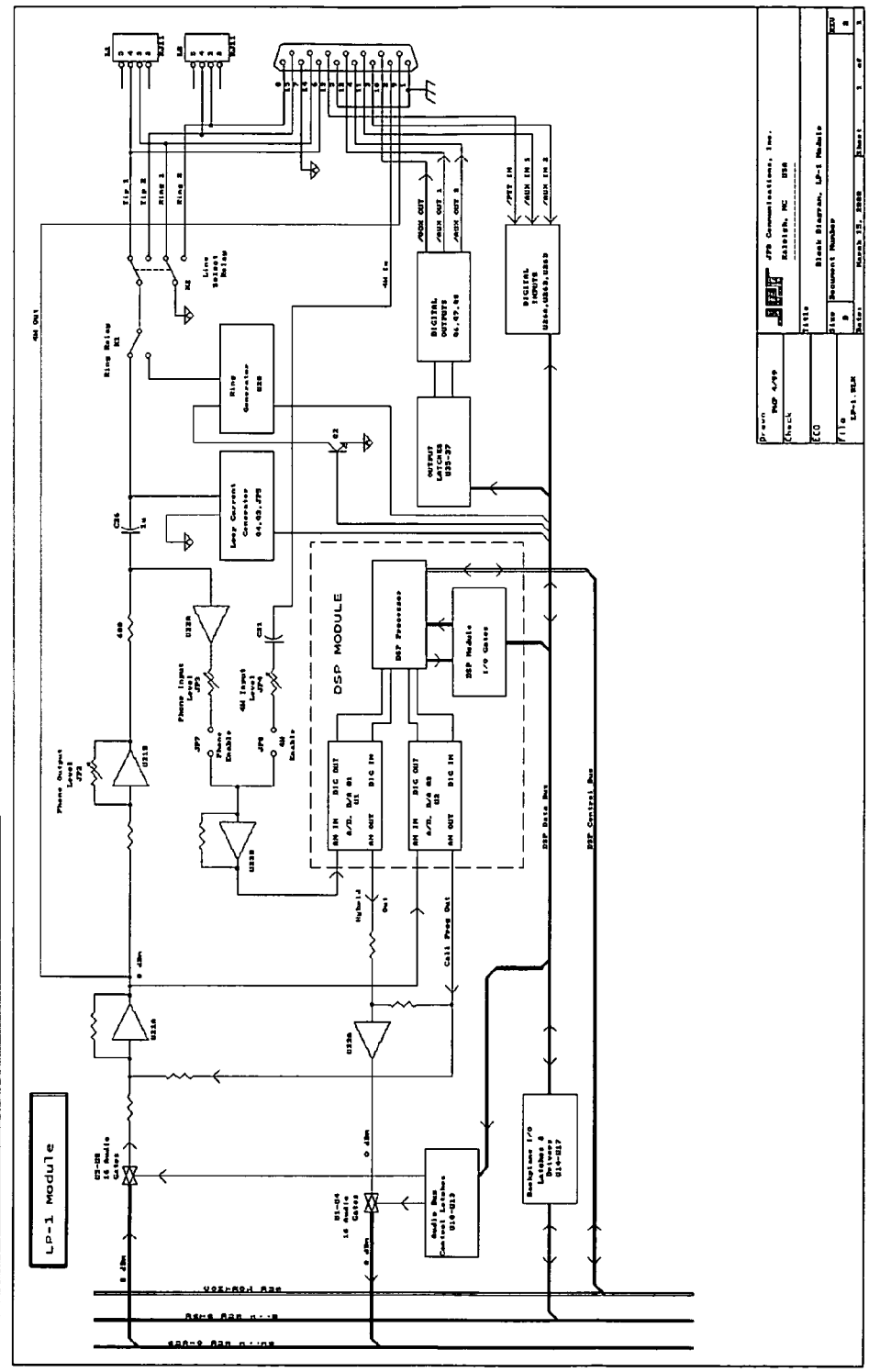

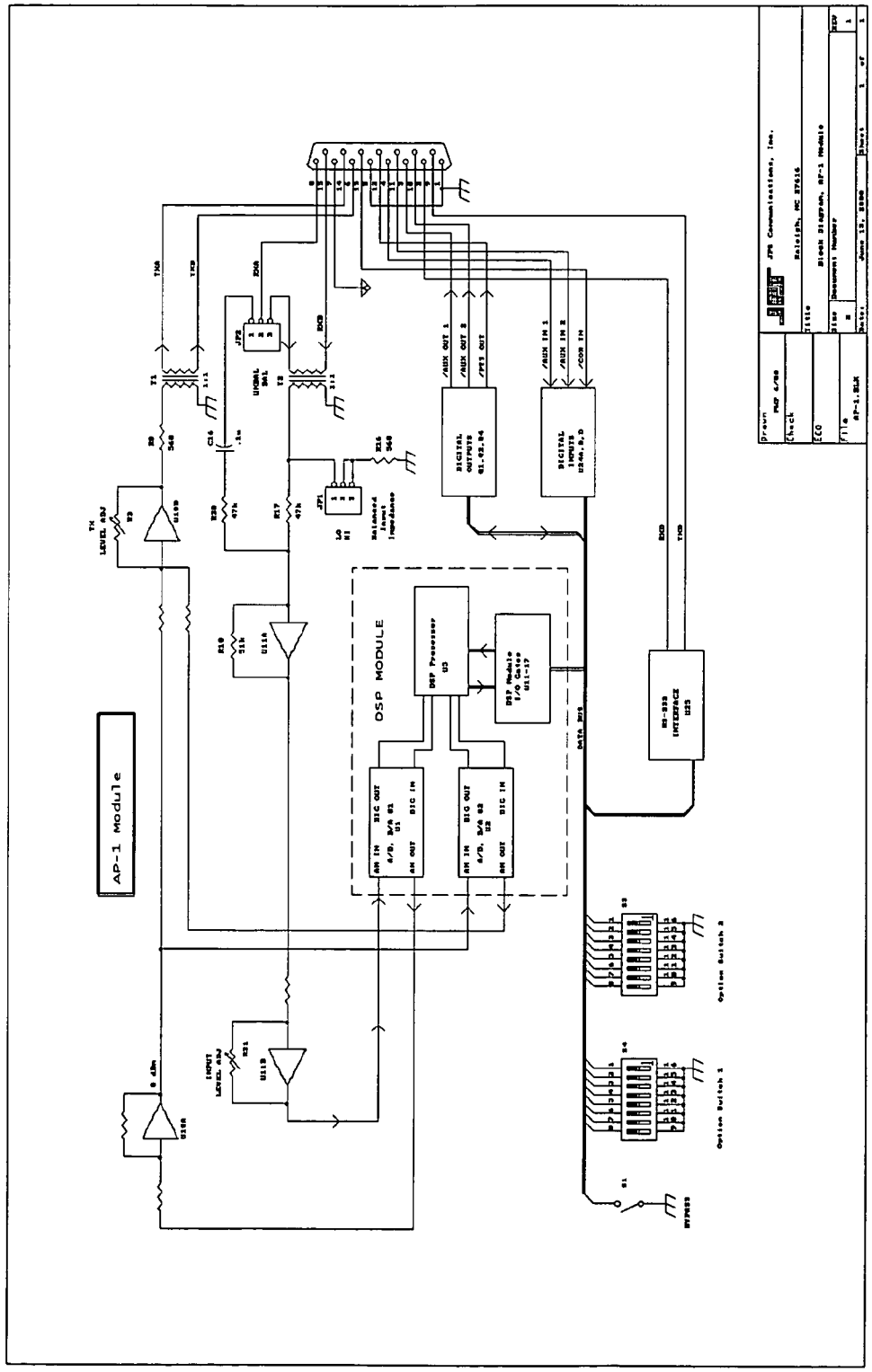

5 Index

A

ACU-T
- Card Cage ................................. 1-1
- General ..................................... 1-1
- General Information ................. 1-1
- Power Supply ........................... 1-2

ACU-T Operation .......................... 3-31
ACU-T Technical Information ............ 4-1

AP-1
- Block Diagram ........................ 4-33
- Block Diagram Description ........ 4-22
- Cable Information ................... 2-19
- Control Tone Detection ............ 2-30
- Control Tone Generation .......... 2-29
- Digital Delay ........................... 2-27
  2-27
- Digital SW-4 ........................... 2-27
- DSP Function Enable, SW4 ....... 2-29
- Function Enable Switches, SW4  2-28
  4-21
- General Information ................ 2-26
- Installation Notes ................... 2-30
  2-21
- Module .................................. 2-18
- Options ................................... 1-6
- RX Option .............................. 2-28
- Specifications ........................ 4-23
- SW3 ...................................... 2-27

Attention Command
- HSP-4 Operational Command Items
  ............................................. 3-8
- HSP-4 ................................... 3-12
- Interface Module Operational
  Commands ................... 3-20, 3-23

B

Basic Chassis Modules - Functions and
Operation ...................................... 3-6
Battery Power for the ACU-T ............ 2-9
Break a Connection
- HSP-4 ................................... 3-12
- Interface Module Operational
  Commands ......................... 3-22

Break the Current Connections
- HSP-4 Operational Command Items
  ............................................. 3-8
- Interface Module Operational
  Commands ........................ 3-20

Bypass Mode ............................... 2-26

C

Charge Switch ............................... 2-9
Chassis Slots, Extensions, Connectors,
and Modules ............................... 2-13
Configuration Programming Items .. 2-35
Connect LED (PSTN-1) .................. 3-5
Cooling ......................................... 2-4
COR LED (RDI-1, DSP-1) ............... 3-5

CPM-2
- Baud Rate ............................. 2-23
- Functions and Operation ......... 3-6
- Manufacturing Test SW1-8 ...... 2-25
- Remote Control Enable .......... 2-24
- Serial Sync Character ............ 2-24
- Store Configuration SW2-1 ..... 2-25
- SW1-5, 6, 7 .......................... 2-25
- SW2-1 through SW2-8 ........... 2-25
- Switch Settings .................... 2-23

CPM-2 Module ............................... 1-4

D

Data / Command Modes
- HSP-4 ................................... 3-14
- Interface Module Operational
  Commands ........................ 3-23

Data /Command Mode
- Interface Module Operational
  Commands ........................ 3-21

Data/Command Mode
- HSP-4 Operational Command Items
  ............................................. 3-9

Delete PIN Numbers from the Database
.................................................. 3-30

Disconnect Another Extension
- HSP-4 Operational Command Items
  ............................................. 3-9
- HSP-4 ................................... 3-12

DSP-1

Raytheon
JPS Communications

Block Diagram ............................ 4-27
Block Diagram Description ........... 4-8
Functions and Operation ............ 3-18
DSP-1 and RDI-1 Programming
   Audio Muted When Squelched ... 2-66
   Auxiliary Output Control .............. 2-71
   COR Inhibit Time After PTT ........ 2-67
   COR Polarity .............................. 2-53
   COR Sampling ........................... 2-63
   COR Type, VOX/VMR Threshold,
      Hangtime, and Audio Delay ... 2-56
   DTMF Command Enable ............ 2-68
   DTMF Mute Timer ...................... 2-54
   DTMF Pre-emphasis .................. 2-70
   Full/Half Duplex ......................... 2-54
   High Frequency Equalizer .......... 2-70
   Module Security Level Selection 2-68
   Noise Reduction Value ............... 2-65
   PTT or COR Priority ................... 2-67
   Receive Level ............................ 2-52
   Transmit Keying Tones/Keying Tone
      Amplitude ............................. 2-66
   Transmit Level ........................... 2-53
   Voice Prompt Initiation Delay ..... 2-71
2-52
DSP-1 Module ................................ 1-4
DSP-1 Module Connections ........... 2-15
DSP-1 Programming Items ............. 2-37
DSP-1 Specifications ..................... 4-10

E

Equipment and Accessories Supplied 1-9
External Interconnect Information ... 2-12

F

Fault LEDs (HSP-4, DSP-1, PSTN-1, LP-1) ............................................ 3-3
Front And Top Panel Controls and Indicators ..................................... 3-1

G

General
   Operation ................................... 3-1
Glossary ........................................ xii
   COR ........................................... xii
   COS ........................................... xii
   CPM-2 ........................................ xii
   CTCSS ....................................... xii
   DTMF .......................................... xii
   Extension ................................... xii
   Hangtime ................................... xii HSP-4 ........................................ xiii
   LP-1 ........................................... xiii
   Slot ............................................ xiii
   SNR ........................................... xiii
   Squelch ...................................... xiii
   VMR ........................................... xiii
   VOX ........................................... xiii

H

Hardware Configuration Settings 2-20, 2-21
Headphones Output Jack (HSP-4) .... 3-2
HOW TO USE THE PIN SECURITY FEATURE ................................. 3-30
HSP-4
   Block Diagram .......................... 4-25
HSP-4
   Block Diagram Description .......... 4-4
   Functions and Operation ............. 3-7
   General Description ..................... 4-3
HSP-4 Module ................................ 1-3
HSP-4 Module Connections ........... 2-13
HSP-4 Operational Command Items. 3-8
HSP-4 Specifications ..................... 4-6
HSP-4 Squelch Type ..................... 2-51
HSP-4 Programming Items ............ 2-51

I

Index ............................................ 4-1
Installation ..................................... 2-1
Installation Checklist ..................... 2-11
Installation Considerations ............. 2-3
Installation Overview ...................... 2-3
Interface Module Operational
   Commands ............................. 3-20
Interface Modules ........................ 1-10
Interface Modules – Functions and
   Operation ................................ 3-17

J

J0 3-16

L

List of Figures ................................. x
List of Tables ................................. xi
LP-1
   Block Diagram .......................... 4-31
   Block Diagram Description ........ 4-17
   Functions and Operation ........... 3-19
   General Description ................... 4-17
   Jumper Settings ....................... 2-31

Raytheon
JPS Communications

Specifications .............................. 4-19
LP-1 Module................................. 1-5
LP-1 Module Connections.............. 2-17
LP-1 Programming Items ....... 2-46, 2-81
   Audio Delay ............................... 2-83
   Aux Output Control..................... 2-86
   Dial and Busy Tone Style ........... 2-84
   Dial Tone Enable........................ 2-84
   DTMF Command Enable............ 2-86
   DTMF Mute Timer ...................... 2-81
   Module Security Level Selection 2-84
   Ring Cadence............................. 2-84
   Ringback Enable ........................ 2-85
   Ringing Time .............................. 2-85
   Voice Prompt Initiation Delay ..... 2-86
   VOX Hang Time ......................... 2-83
   VOX Threshold........................... 2-83

M

Make a Connection
   HSP-4........................................ 3-11
   Interface Module Operational
      Commands............................ 3-22
Make A Connection
   HSP-4 Operational Command Items
   ................................................. 3-8
   Interface Module Operational
      Commands............................ 3-20
Master/Slave LEDs (CPM-2)............ 3-3
Mon (Monitor) LED (DSP-1, PSTN-1,
   LP-1)............................................ 3-3
Monitor Function
   HSP-4 Operational Command Items
   ................................................. 3-9
   HSP-4........................................ 3-13
   Interface Module Operational
      Commands.................... 3-20, 3-23

O

Off Hook LED (LP-1)........................ 3-5
Operation
   Conference Call......................... 3-39
   Local Phone to Radio................ 3-38
   Radio to Local Operator ............ 3-35
   Radio to PSTN........................... 3-37
Operation ........................................ 3-1
   Basic Operation Scenarios......... 3-32
   Local Operator to Radio ............ 3-35
   PSTN to Radio........................... 3-34
   Radio to Radio........................... 3-33
   Unit Power-Up ........................... 3-31
Optional Equipment - Not Supplied. 1-11

P

2-21
Pictorial Layout for Operating Scenarios
   ................................................. 3-32
Pin Security
   Exclusive Operation Mode......... 3-27
   How PIN Security Works ........... 3-26
   3-27
   How to Set................................. 3-29
   Input PIN Numbers into the ACU-T
      Database............................... 3-29
   Priority Operation Mode............. 3-27
   The Two Different PIN Security
      Modes .................................. 3-27
PIN Security.................................... 3-26
   How to Delete PIN Numbers from the
      Database............................... 3-30
PIN SECURITY FEATURE ............. 3-30
Power Requirements........................ 2-8
Programming Configuration Settings .. 2-32
PSTN-1
   Block Diagram ........................... 4-29
   Block Diagram Description ......... 4-12
   Functions and Operation ............ 3-18
   General Description................... 4-12
PSTN-1 Module................................ 1-4
   Technical Information ................. 4-12
PSTN-1 Module Connections ......... 2-16
PSTN-1 Programming Items .. 2-44, 2-72
   2-Wire/4-Wire Operation............ 2-76
   Audio Delay ............................... 2-75
   Auxiliary Output Control.............. 2-78
   Dial Mode .................................. 2-73
   DTMF Command Enable............ 2-77
   DTMF Mute Timer ...................... 2-74
   Inactivity Disconnect Timer......... 2-78
   Module Security Level Selection 2-76
   PSTN Type ................................. 2-73
   Ringing Time .............................. 2-77
   Telephone Line Level................. 2-72
   Telephone Receive Level Boost. 2-72
   Voice Prompt Initiation Delay ..... 2-79
   VOX Hang Time ......................... 2-75
   VOX Threshold........................... 2-75
PSTN-1 Specifications.................... 4-15
PTT LED (DSP-1), VOX LED (PSTN-1,
   LP-1)............................................ 3-3

R

Rear Panel Connectors.................... 3-6
Regain Control

HSP-4 Operational Command Items .................................................. 3-9
Regain Control from Console Program
 HSP-4 .......................................... 3-14
Removal and Replacement of Modules ................................................. 3-41
Report Connections
 HSP-4 Operational Command Items .................................................. 3-8
 HSP-4 .......................................... 3-12
Reshipment of Equipment ................. 2-2
Ring LED (PSTN-1, LP-1) ................. 3-5

S

Serial Remote Connector ....... 2-19, 2-21
Serial Remote Control (RS-232) ..... 3-41
Signal LED (DSP-1) ........................... 3-3
Speaker Switch (Top panel) .............. 3-2
Specifications .................................... 1-8
Store Connection Table in Memory
 HSP-4 .......................................... 3-13
Store Connections
 HSP-4 Operational Command Items .................................................. 3-9
System Programming
 Console Override ....................... 2-48
 Delete Pin's ................................ 2-50
 Enter Programming Mode .......... 2-48
 Exit Programming Mode ............. 2-49
 Module Security Level Selection 2-51
 Pin Numbers .............................. 2-50
 Program Pins .............................. 2-50
 Reset Modules to Factory Settings. 2-49
 Select a Module to Program ....... 2-49
System Programming and Operating
 Items .......................................... 2-48

System Programming Item .............. 2-35
System Reset
 HSP-4 Operational Command Items .................................................. 3-10
 Interface Module Operational
  Commands ............................ 3-21
System Reset Feature
 HSP-4 .......................................... 3-15
 Interface Module Operational
  Commands ............................ 3-25
System Software ............................... 1-5

T

Table of Contents ............................. iii
Technical Information
 Card Cage and Backplane ........... 4-1
 CPM-2 Control Processor Module:4-2
 DSP-1 Module .............................. 4-8
 General Description ..................... 4-1
 HSP-4 Handset/Speaker Module . 4-3
 HSP-4 Specifications ................... 4-6
 LP-1 Module ............................... 4-17

U

Unpacking and Inspection ................ 2-1
Use of Radio at HSP Connector J0. 3-16

V

Volume Control (Top Panel) ............. 3-3

W

Warranty ............................................ ii

Raytheon
JPS Communications

*This Page Intentionally Left Blank*

What is claimed is:

1. A portable interconnection system, comprising:
a housing having an integral externally accessible user interface and a plurality of communications ports adapted for connection to a plurality of audio communication networks;
electronics substantially enclosed by said housing; said electronics including at least interconnection electronics operative to selectively establish a plurality of independent connection sets, each connection set interconnecting at least a plurality of said communications ports for communications between a plurality of audio communication units operating in at least two different and incompatible ones of said audio communication networks;
said user interface connected to said interconnection electronics and operative to control said interconnection electronics;
wherein a combined weight of said housing and said electronics is not more than fifteen pounds.

2. The portable interconnection system of claim 1 wherein said housing further comprises a display operative to show at least one interconnection status of said plurality of audio communication units.

3. The portable interconnection system of claim 2 wherein said display is operative to show an interconnection status of said plurality of audio communication units for a plurality of said independent connection sets simultaneously.

4. The portable interconnection system of claim 3 wherein said display displays said interconnection status in an array format.

5. The portable interconnection system of claim 1 further comprising a carrying handle connected to said housing and operative to supply the entirety of the vertical support necessary for a user to carry said housing.

6. The portable interconnection system of claim 1 wherein said electronics further comprises a power supply having a battery charger.

7. The portable interconnection system of claim 1 wherein at least a portion of said interconnection electronics are contained in a plurality of interface cards removably supported by said housing.

8. The portable interconnection system of claim 1 wherein said interconnection electronics are further operative to be responsive to commands supplied via DTMF tones to alter at least one of said connection sets.

9. The portable interconnection system of claim 1 wherein said interconnection electronics are further operative to digitally enhance audio communication signals supplied to said interconnection electronics via said connection ports.

10. The portable interconnection system of claim 1 wherein said combined weight of said housing and said electronics is not more than ten pounds.

11. The portable interconnection system of claim 1 wherein said housing has a volume of 750 cubic inches or less.

12. The portable interconnection system of claim 1 wherein said plurality of communication ports comprise at least four of said communication ports and wherein said housing has a volume of 600 cubic inches or less.

13. A portable interconnection system, comprising:
a housing having an integral externally accessible user interface and at least four communications ports adapted for connection to a plurality of audio communication networks;
electronics substantially enclosed by said housing; said electronics including at least a power supply and interconnection electronics operative to selectively establish a plurality of independent connection sets, each connection set interconnecting at least a plurality of said communications ports for communications between a plurality of audio communication units operating in at least two different and incompatible ones of said audio communication networks; wherein at least a portion of said interconnection electronics are contained in a plurality of interface cards removably supported by said housing;
said user interface connected to said interconnection electronics and operative to control said interconnection electronics;
said housing further comprising a display operative to show an interconnection status of said plurality of audio communication units for a plurality of said independent connection sets simultaneously; and
wherein a combined weight of said housing and said electronics is not more than ten pounds and wherein said housing has a volume of 600 cubic inches or less.

14. The portable interconnection system of claim 13 further comprising a carrying handle connected to said housing and operative to supply the entirety of the vertical support necessary for a user to carry said housing.

15. The portable interconnection system of claim 13 wherein said interconnection electronics are further operative to be responsive to commands supplied via DTMF tones to alter at least one of said connection sets.

16. The portable interconnection system of claim 13 wherein said interconnection electronics are further operative to digitally enhance audio communication signals supplied to said interconnection electronics via said connection ports.

17. A portable interconnection system, comprising:
a housing having an integral externally accessible user interface and at least first, second, and third communications ports;
a first audio communication unit connecting to said housing at said first communications port and operating in a first audio communications network;
a second audio communication unit connecting to said housing at said second communications port and operating in a second audio communications network; said second audio communications network different from, and incompatible with, said first audio communication network;
a third audio communication unit connecting to said housing at said third communications port and operating in a third audio communications network; said third audio communications network different from, and incompatible with, both said first and second audio communication networks;
electronics substantially enclosed by said housing; said electronics including at least interconnection electronics operative to selectively establish a plurality of independent connection sets including a first connection set and a second connection set;
said first connection set comprising said first and second audio communication units, and excluding said third audio communication unit, said interconnection electronics operative to enable audio communications between audio communication units in said first connection set via said interconnection electronics;
said second connection set comprising said first and third audio communication units, and excluding said second audio communication unit, said interconnection electronics operative to enable audio communications between audio communication units in said second connection set via said interconnection electronics;

said user interface connected to said interconnection electronics and operative to control said interconnection electronics;

wherein a combined weight of said housing and said electronics is not more than fifteen pounds;

wherein said housing has a volume of 750 cubic inches or less.

* * * * *